United States Patent
Hino et al.

(10) Patent No.: US 11,088,601 B2
(45) Date of Patent: Aug. 10, 2021

(54) METHOD FOR PRODUCING ARMATURE, METHOD FOR PRODUCING DYNAMO-ELECTRIC MACHINE, ARMATURE, DYNAMO-ELECTRIC MACHINE, AND DEVICE FOR PRODUCING ARMATURE

(71) Applicant: Mitsubishi Electric Corporation, Tokyo (JP)

(72) Inventors: Tatsuro Hino, Tokyo (JP); Yuichiro Ikeuchi, Tokyo (JP); Kohei Egashira, Tokyo (JP); Tetsuya Yokogawa, Tokyo (JP); Masashi Nakamura, Tokyo (JP); Masaya Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 385 days.

(21) Appl. No.: 16/097,900

(22) PCT Filed: Apr. 27, 2017

(86) PCT No.: PCT/JP2017/016807
§ 371 (c)(1),
(2) Date: Oct. 31, 2018

(87) PCT Pub. No.: WO2017/195637
PCT Pub. Date: Nov. 16, 2017

(65) Prior Publication Data
US 2019/0149022 A1  May 16, 2019

(30) Foreign Application Priority Data
May 13, 2016 (JP) .............................. JP2016-097040

(51) Int. Cl.
*H02K 15/02* (2006.01)
*H02K 3/48* (2006.01)
(Continued)

(52) U.S. Cl.
CPC .............. *H02K 15/026* (2013.01); *H02K 1/16* (2013.01); *H02K 1/165* (2013.01); *H02K 1/18* (2013.01);
(Continued)

(58) Field of Classification Search
CPC ........ H02K 15/026; H02K 15/02; H02K 1/16; H02K 1/165; H02K 1/18; H02K 1/185; H02K 3/48
See application file for complete search history.

(56) References Cited

U.S. PATENT DOCUMENTS 5,778,512 A * 7/1998 Ichikawa ........... H02K 15/0414
29/598
8,164,229 B2 * 4/2012 Yamamoto ............... H02K 3/12
310/179
(Continued)

FOREIGN PATENT DOCUMENTS

CN   102160266 A    8/2011
JP   S60-237828 A   11/1985
(Continued)

OTHER PUBLICATIONS

Office Action dated Dec. 2, 2019, issued in corresponding Chinese Patent Application No. 201780028199.0, 10 pages including 6 pages of English translation.
(Continued)

*Primary Examiner* — Forrest M Phillips
(74) *Attorney, Agent, or Firm* — Buchanan Ingersoll & Rooney PC

(57) ABSTRACT

This method includes: a coil assembly step of combining a plurality of coil units to form a coil basket; a core insertion step of inserting inner cores of in the radial direction to the coil basket; and a fixation member insertion step of inserting a fixation member to the outer circumference of the inner
(Continued)

core. In the core insertion step, the radial-direction position of the coil basket is retained at a core insertion time position shifted outward in the radial direction relative to a normal position after armature completion, and the inner cores are inserted in the radial direction to the coil basket. After the core insertion step, the radial-direction positions of the coil basket and the inner cores are moved inward in the radial direction to the normal position after armature completion.

20 Claims, 48 Drawing Sheets

(51) Int. Cl.
    *H02K 15/085*     (2006.01)
    *H02K 1/16*     (2006.01)
    *H02K 1/18*     (2006.01)

(52) U.S. Cl.
    CPC .............. *H02K 1/185* (2013.01); *H02K 3/48* (2013.01); *H02K 15/02* (2013.01); *H02K 15/085* (2013.01)

(56) References Cited

U.S. PATENT DOCUMENTS

| | | | |
|---|---|---|---|
| 9,887,599 B2 * | 2/2018 | Sakaue | H02K 3/28 |
| 2006/0001327 A1 * | 1/2006 | Ossenkopp | H02K 15/0081 |
| | | | 310/201 |
| 2007/0261229 A1 * | 11/2007 | Yamaguchi | H02K 15/066 |
| | | | 29/596 |
| 2010/0187938 A1 | 7/2010 | Yamamoto et al. | |
| 2012/0181893 A1 | 7/2012 | Ikuta et al. | |
| 2014/0021823 A1 * | 1/2014 | Kitamura | H02K 15/066 |
| | | | 310/208 |
| 2017/0040859 A1 * | 2/2017 | Langlard | H02K 15/0068 |
| 2017/0141659 A1 * | 5/2017 | Hashimoto | H02K 15/066 |
| 2017/0264173 A1 * | 9/2017 | Koga | H02K 15/024 |
| 2017/0373570 A1 * | 12/2017 | Muto | H02K 15/0031 |

FOREIGN PATENT DOCUMENTS

| | | |
|---|---|---|
| JP | 2008-301599 A | 12/2008 |
| JP | 2010-239680 A | 10/2010 |
| JP | 5557058 B2 | 12/2011 |
| JP | 5352979 B2 | 11/2013 |
| WO | 2010/087078 A1 | 8/2010 |

OTHER PUBLICATIONS

International Search Report (PCT/ISA/210) dated Jul. 11, 2017, by the Japan Patent Office as the International Searching Authority for International Application No. PCT/JP2017/016807.
Written Opinion (PCT/ISA/237) dated Jul. 11, 2017, by the Japan Patent Office as the International Searching Authority for International Application No. PCT/JP2017/016807.
Office Action (Notice of Reasons for Refusal) dated Jun. 11, 2019, by the Japanese Patent Office in corresponding Japanese Patent Application No. 2018-516948 and English translation of the Office Action. (7 pages).

* cited by examiner

DETAILED VIEW A

METHOD FOR PRODUCING ARMATURE, METHOD FOR PRODUCING DYNAMO-ELECTRIC MACHINE, ARMATURE, DYNAMO-ELECTRIC MACHINE, AND DEVICE FOR PRODUCING ARMATURE

TECHNICAL FIELD

The present invention relates to an armature producing method, a rotary electric machine producing method, an armature, a rotary electric machine, and an armature producing device, and in particular, relates to an armature producing method, a rotary electric machine producing method, an armature, a rotary electric machine, and an armature producing device that enable the slot opening width to be narrowed.

BACKGROUND ART

In recent years, rotary electric machines such as an electric motor and an electric generator have been required to be downsized and have higher outputs. As means for solving the requirements, it is known that an armature of distributed winding type in which the space factor of coils is increased using rectangular conductive wires is used. Coils that have been shaped in advance are combined to form a coil basket, and a core is inserted into the coil basket, thereby obtaining effects of decreasing welded parts of the coils and improving productivity.

However, in this type of armature, if the slot opening width of the armature is narrowed, the coils interfere with the core. Therefore, it is difficult to narrow the slot opening width. If the slot opening width is expanded, there is a problem that magnetic resistance increases, efficiency of the rotary electric machine reduces, and the size of the rotary electric machine increases. In addition, if the slot opening width is expanded, it is impossible to mechanically prevent the coils from protruding toward the inner circumferential side, so that it is necessary to fix the coils by fixation means such as adhesion.

For solving such problems, there is known a configuration that, after core insertion, tooth end portions are opened from the tooth center toward the slot sides which are outer sides in the circumferential direction, to narrow the slot opening width (see, for example, Patent Document 1 below). In Patent Document 1, slits are provided to the tooth end portions, thereby obtaining an effect of decreasing the deformation amount of the end portions and improving a magnetic characteristic. In addition, an effect of improving the material yield is obtained as compared to a conventional case in which stamping is performed with circumferential-direction protrusions of tooth end portions protruding inward in the radial direction, and after assembly, the protrusions protruding inward in the radial direction are bent in the circumferential direction.

On the other hand, Patent Document 2 below discloses a structure in which divided cores having circumferential-direction protrusions at shoe ends are inserted from the inner side in the radial direction. Owing to the insertion from the inner side in the radial direction, it is possible to avoid interference between the protrusions of the tooth end portions and coils. However, on the back yoke side of the tooth, a circumferential-direction gap is formed between a rectangular coil and a tooth portion. Accordingly, magnetic powder is put in the gap, whereby magnetic path areas are ensured and heat dissipation from a coil to the core is improved, and thus an effect of size reduction and output increase is obtained.

CITATION LIST

Patent Document

Patent Document 1: Japanese Patent No. 5557058
Patent Document 2: Japanese Patent No. 5352979

SUMMARY OF THE INVENTION

Problems to be Solved by the Invention

However, in the armature of the rotary electric machine in Patent Document 1, since slits are present at the tooth end portions, magnetic resistance increases and output decreases, leading to a problem of size increase of the rotary electric machine. In addition, since the tooth end portions are plastically deformed after divided cores are inserted, there is a problem that a magnetic characteristic at the plastically deformed part is deteriorated. In addition, if electromagnetic steel sheets containing a large amount of silicon are used to reduce iron loss, the breaking elongation amount is greatly decreased. Therefore, great deformation is impossible and it is difficult to ensure a sufficient amount of protrusion in the circumferential direction.

In the armature of the rotary electric machine in Patent Document 2, it is necessary to put magnetic powder after core insertion, and thus there is a problem that productivity is deteriorated. In addition, magnetic powder has a lower saturation magnetic flux density than electromagnetic steel sheets. Therefore, output decreases as compared to the case of forming tooth portions with only electromagnetic steel sheets, leading to a problem that the size of the rotary electric machine is increased. In addition, it is necessary to fix the coil basket by an adhesive agent before core insertion, and thus there is a problem that the cost required for materials and production increases.

The present invention has been made to solve the above problems, and an object of the present invention is to provide an armature producing method, a rotary electric machine producing method, an armature, a rotary electric machine, and an armature producing device that enable the slot opening width to be narrowed and that are downsized, highly efficient, low in cost, and excellent in productivity.

Solution to the Problems

An armature producing method according to the present invention is a method for producing an armature including: a plurality of inner cores arranged in an annular shape, and each having a tooth portion protruding in a radial direction from a back yoke portion, and a circumferential-direction protrusion portion extending in a circumferential direction at an end of the tooth portion; a coil basket formed by combining a plurality of coil units each having slot portions to be stored in slots between the tooth portions, and a turn portion connecting the slot portions; and a fixation member having an annular shape and fixing an outer circumference of the plurality of inner cores. The slot portions of the coil units are arranged in each slot between the tooth portions so as to be aligned in the radial direction. The method includes: a coil assembly step of combining the plurality of coil units to form the coil basket having an annular shape; a core insertion step of inserting the inner cores from a radially outer side or a radially inner side of the coil basket; and a fixation member insertion step of inserting the fixation member to the outer circumference of the inner cores. In the core insertion step, in a state in which the slot portions of the coil units are kept being aligned in the circumferential direction, a radial-direction position of the coil basket is retained at a core insertion time position shifted outward in the radial direction relative to a normal position after completion of the armature, and the inner cores are inserted from the radially outer side or the radially inner side of the coil basket, and after the core insertion step, radial-direction positions of the coil basket and the inner cores are moved inward in the radial direction or outward in the radial direction to the normal position after completion of the armature.

A rotary electric machine producing method according to the present invention includes: rotatably providing a rotor fixed to a rotary shaft, on an inner circumferential side of the armature produced by the method for producing the armature as described above.

An armature according to the present invention includes: a plurality of inner cores arranged in an annular shape, and each having a tooth portion protruding in a radial direction from a back yoke portion, and a circumferential-direction protrusion portion extending in a circumferential direction at an end of the tooth portion; a coil basket formed by combining a plurality of coil units in parallel at an equal pitch in the circumferential direction, the coil units each having at least three slot portions to be stored in slots between the tooth portions, and a turn portion connecting the slot portions with no connection parts; and a fixation member having an annular shape and fixing an outer circumference of the plurality of inner cores. Of each coil unit, at least the slot portions are formed of a rectangular conductive wire. The slot portions are arranged in each slot between the tooth portions, so as to be aligned in the radial direction, and in close contact with the inner cores via an insulating member having an equal thickness. An inner circumferential surface of the circumferential-direction protrusion portion at the end of each tooth portion is formed in a smooth arc or straight shape. Where $X1$ is a circumferential-direction width of each slot portion of the coil units and $X2$ is a circumferential-direction distance between the circumferential-direction protrusion portions at the ends of the tooth portions, $X1>X2$ is satisfied. Where $Y1$ is a circumferential-direction distance between the adjacent slot portions located on a radially innermost side of the coil units and $Y3$ is a circumferential-direction width of the back yoke portion of each inner core, $Y3>Y1$ is satisfied.

A rotary electric machine according to the present invention includes: the above armature; and a rotor fixed to a rotary shaft and rotatably provided on an inner circumferential side of the armature.

An armature producing device according to the present invention is a device for producing an armature including: a plurality of inner cores arranged in an annular shape, and each having a tooth portion protruding in a radial direction from a back yoke portion, and a circumferential-direction protrusion portion extending in a circumferential direction at an end of the tooth portion; a coil basket formed by combining a plurality of coil units each having slot portions to be stored in slots between the tooth portions, and a turn portion connecting the slot portions; and a fixation member having an annular shape and fixing an outer circumference of the plurality of inner cores. The slot portions of the coil units are arranged in each slot between the tooth portions so as to be aligned in the radial direction. The device includes: a coil radial-direction position regulating member for regulating a radial-direction position of the coil basket; a coil axial-direction position regulating member for regulating an axial-direction position of the coil basket; a movement member for, at a time of inserting each inner core from a radially outer side of the coil basket, expanding a circumferential-direction distance between the slot portions to which the inner core is to be inserted; a core inserting member for moving the inner core inward in the radial direction; and a core inner-side regulating member for regulating a radially-inner-side position of the inner core. The movement member has such a wedge shape that a circumferential-direction width thereof increases toward a radially outer side.

Effect of the Invention

The armature producing method and the rotary electric machine producing device according to the present invention can provide an armature and a rotary electric machine that have a narrowed slot opening width and that are downsized, highly efficient, low in cost, and excellent in productivity.

The armature and the rotary electric machine according to the present invention have the circumferential-direction protrusion portions at the ends of the tooth portions. Thus, magnetic resistance between the rotor and the armature is reduced, whereby rotor iron loss can be reduced. In addition, the coil space factor can be increased, and thus a rotary electric machine having high efficiency and high output can be obtained.

The armature producing device according to the present invention can produce an armature for a rotary electric machine having high efficiency and high output, with use of simple equipment and with excellent productivity.

DESCRIPTION OF EMBODIMENTS

Embodiment 1

Hereinafter, embodiment 1 of the present invention will be described with reference to the drawings.

Figure 1:
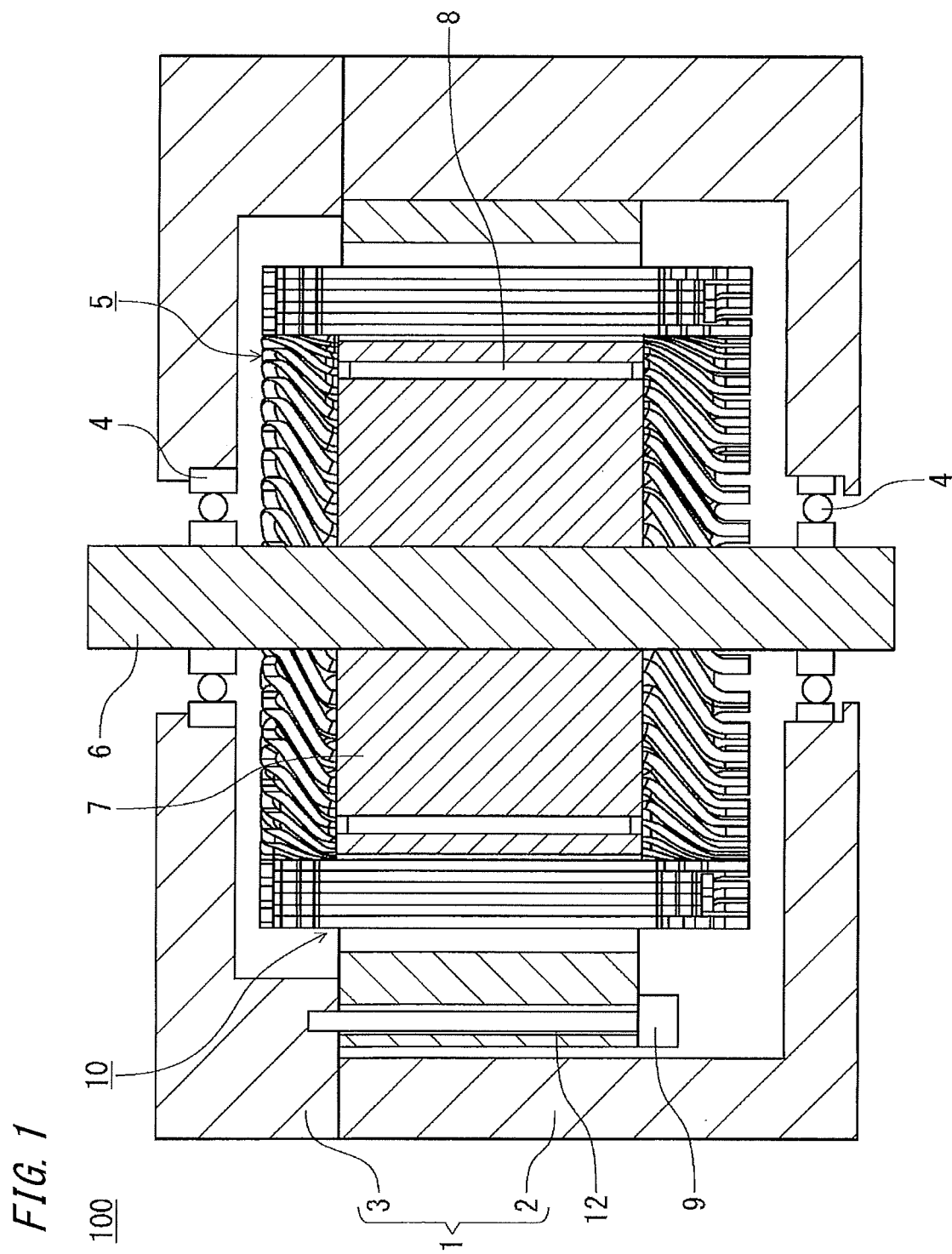
FIG. 1 is a sectional view showing a rotary electric machine according to embodiment 1 of the present invention.
Figure 2:
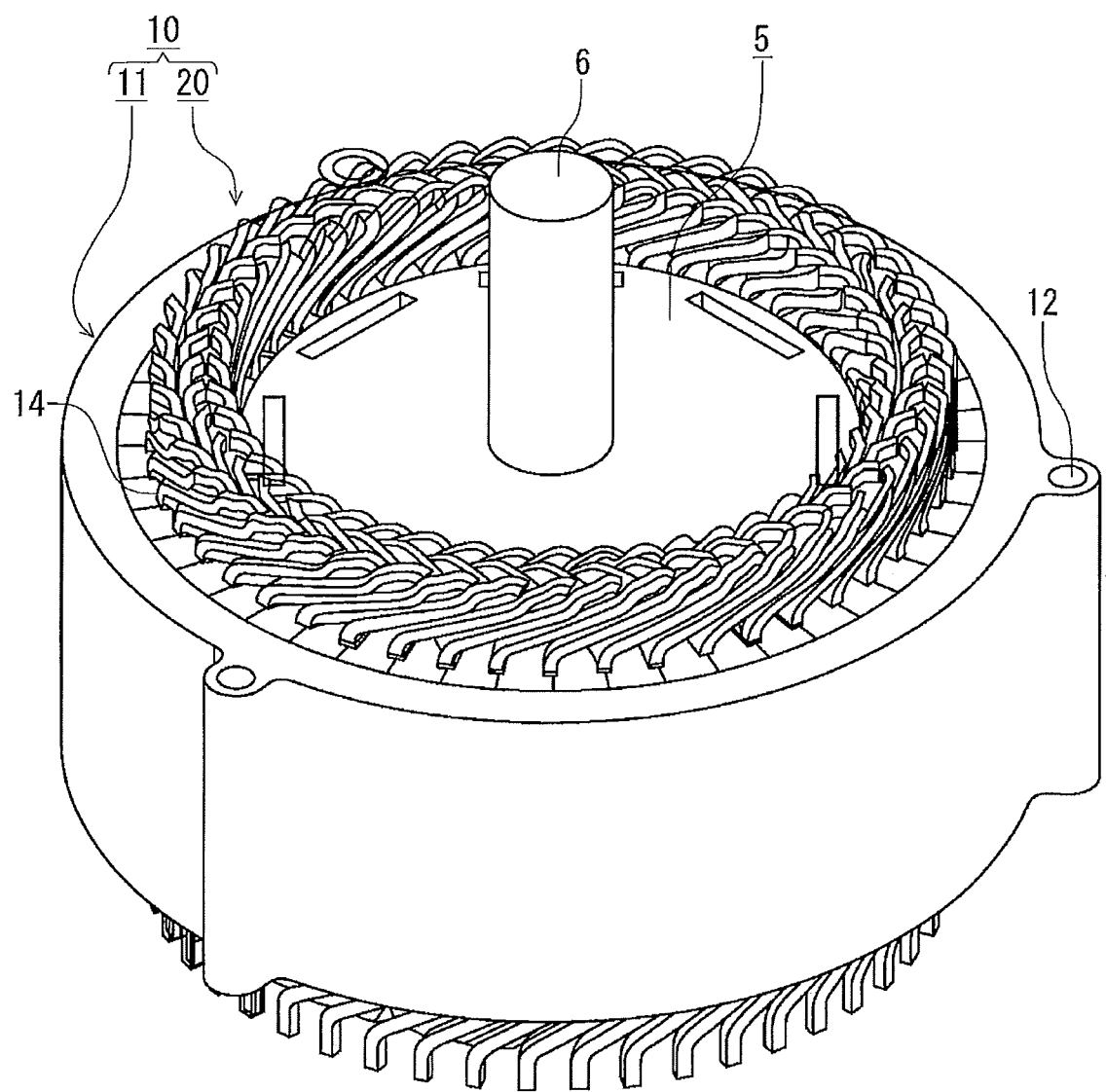
FIG. 2 is a perspective view showing an armature of a rotary electric machine according to embodiment 1 of the present invention.

FIG. 1 is a sectional view showing a rotary electric machine according to embodiment 1 of the present invention, and FIG. 2 is a perspective view showing an armature of the rotary electric machine shown in FIG. 1. In the following description, a rotary shaft direction (vertical direction in FIG. 1) is defined as an axial direction, a rotary shaft center direction (horizontal direction in FIG. 1) is defined as a radial direction, and a rotational direction about the rotary shaft is defined as a circumferential direction.

In the drawings, a rotary electric machine 100 includes: a housing 1 having a bottomed cylindrical frame 2 and a bracket 3 closing an opening of the frame 2; an armature 10 fastened to the bracket 3 with bolts 9 through attachment holes 12; a rotary shaft 6 rotatably supported to a bottom portion of the frame 2 and the bracket 3 via bearings 4; and a rotor 5 fixed to the rotary shaft 6 and rotatably provided on the inner circumferential side of the armature 10.

The rotor 5 is a permanent magnet type rotor including: a rotor core 7 fixed to the rotary shaft 6 inserted at the axial position; and permanent magnets 8 embedded on the outer circumferential surface side in the rotor core 7, arranged at a predetermined pitch in the circumferential direction, and forming magnetic poles. It is noted that the rotor 5 is not limited to a permanent magnet type rotor but may be a squirrel-cage rotor in which non-insulated rotor conductors are stored in slots of a rotor core and short-circuited at both sides by short-circuit rings, or a wound rotor in which insulated conductive wires are mounted to slots of a rotor core.

Figure 3:
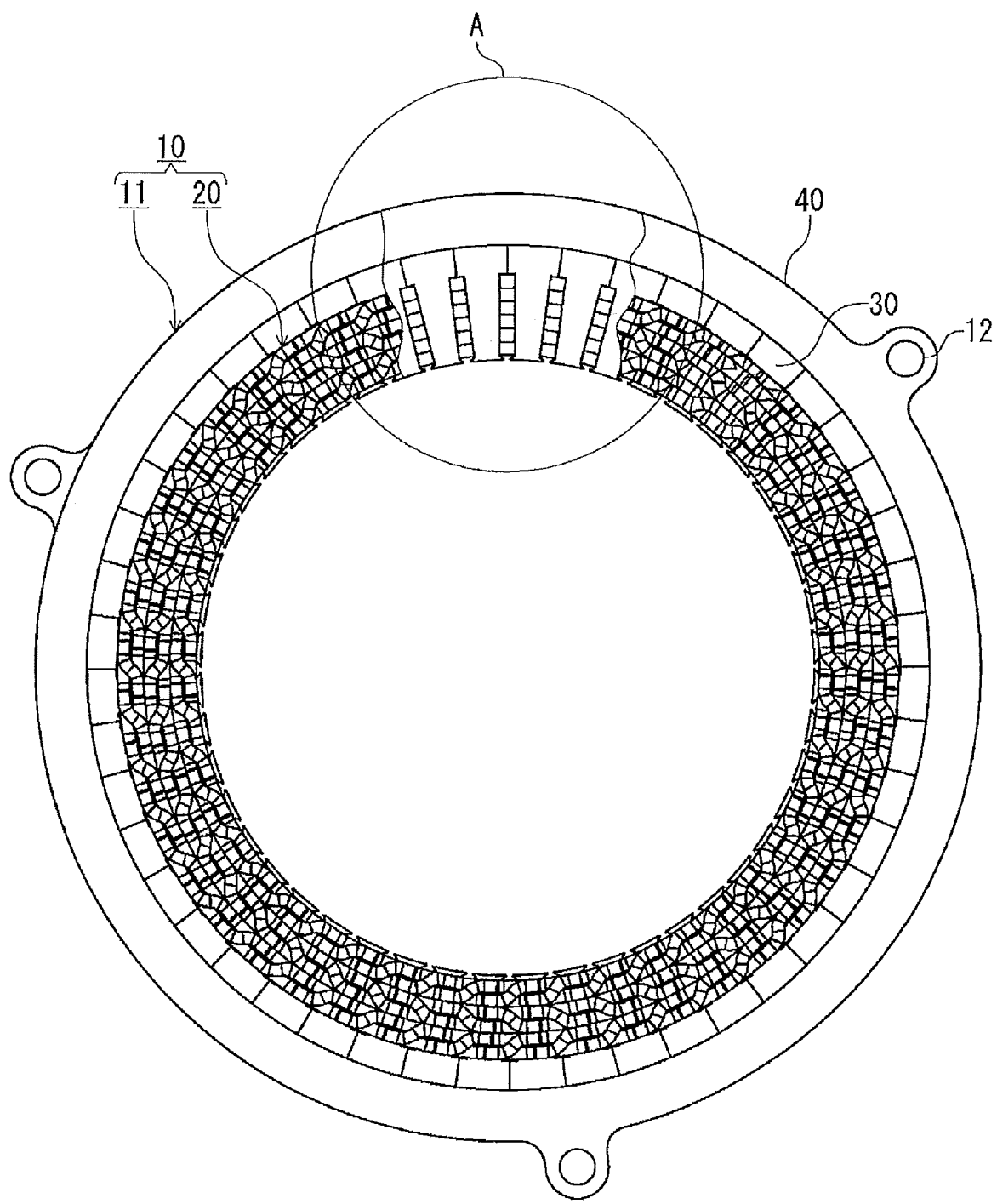
FIG. 3 is a plan view and a partial sectional view of the armature according to embodiment 1 of the present invention.

Next, the configuration of the armature according to embodiment 1 of the present invention will be specifically described. FIG. 3 is a plan view and a partial sectional view of the armature according to embodiment 1 of the present invention, and FIG. 4 is a detailed sectional view of part A of the armature shown in FIG. 3.

As shown in FIG. 2 and FIG. 3, the armature 10 includes: an armature core 11; an armature winding 20 mounted to the armature core 11; and insulation sheets 14 which are insulating members electrically separating the armature winding 20 and the armature core 11 from each other. Here, in the rotary electric machine of the present embodiment, the number of poles is eight, the number of slots of the armature core 11 is forty-eight, and the armature winding 20 is a three-phase winding. That is, two slots are formed per pole per phase in the armature core 11.

Figure 4:
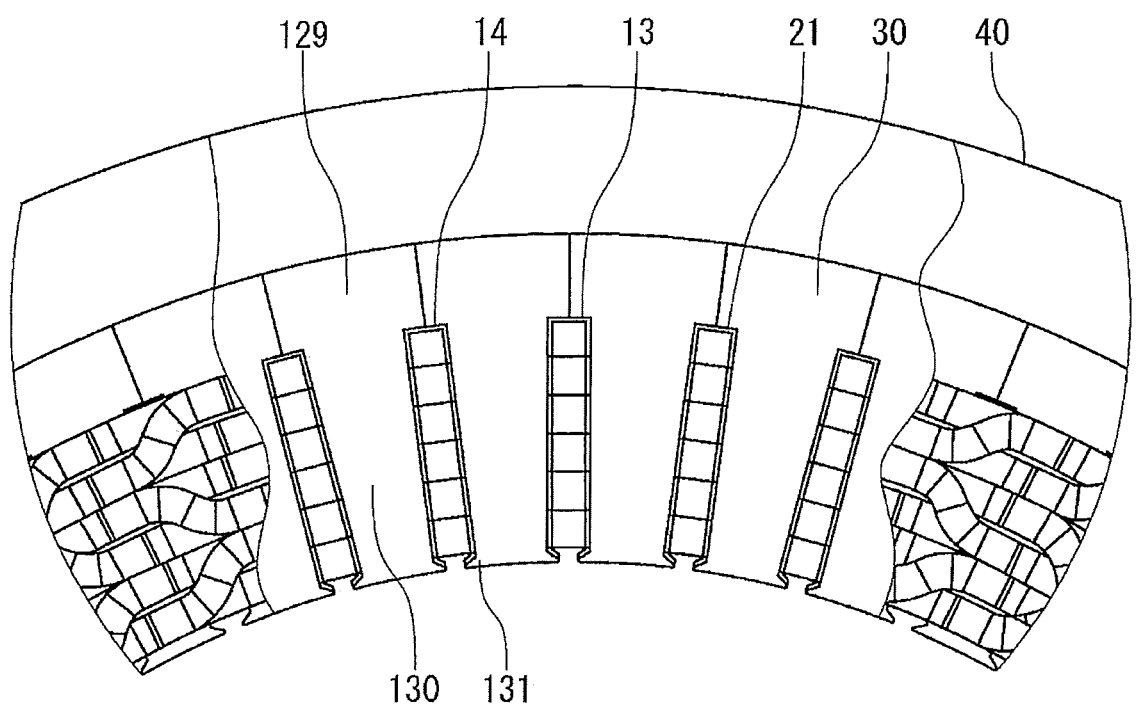
FIG. 4 is a detailed sectional view of part A of the armature shown in FIG. 3.

As shown in FIG. 3 and FIG. 4, the armature core 11 includes an outer core 40 arranged on the outer circumferential side, and inner cores 30 arranged on the inner circumferential side. Each inner core 30 has a back yoke portion 129, a tooth portion 130 extending radially inward from the back yoke portion 129, and a circumferential-direction protrusion portion 131 extending in the circumferential direction from the end of the tooth portion 130. The armature core 11 is formed by arranging a plurality of inner cores 30 in an annular shape such that the back yoke portions 129 adjacent in the circumferential direction are in contact with each other, and then fixing the outer circumference of the inner core 30 by the outer core 40. The armature core 11 has slots 13 which are spaces partitioned in the circumferential direction by the tooth portions 130 of the inner core 30. A coil unit 21 composing the armature winding 20 and the insulation sheet 14 which is an insulating member electrically insulating the coil unit 21 and the armature core 11 from each other, are stored in each slot 13. It is noted that the insulation sheets 14 which are insulating members are attached to the inner cores 30 before a core insertion step described later.

As described above, slot portions S1 to S6 of the coil unit 21 which are to be stored in the slots 13 between the tooth portions 130 are formed from a rectangular conductive wire. In each slot 13, the slot portions S1 to S6 are arranged, so as to be aligned in the radial direction, and in close contact with the inner cores 30 via an insulation sheet 14 which is an insulating member having an equal thickness. The inner circumferential surface of the circumferential-direction protrusion portion 131 at the end of each tooth portion 130 is formed in a smooth arc or straight shape.

The inner cores 30 and the outer core 40 of the armature core 11 are formed by stacking and integrating a predetermined number of electromagnetic steel sheets. The armature core 11 may be formed as an integrated type core using any magnetic material such as a powder core. The inner core 30 may be fixed using a ring-shaped fixation member, instead of the outer core 40. In claims, the outer core 40 or the ring-shaped fixation member is referred to as fixation member.

The outer core 40 is provided with the attachment holes 12 for fixing the armature core 11. Since the attachment holes 12 are provided to the armature core 11, it is not necessary to use fixation means such as shrink fit or press fit for fixing the armature core 11 to the frame. Thus, an effect of improving productivity is obtained. In addition, since a compressive stress due to fitting is not applied to the outer core 40, a stress to be applied to the outer core 40 is reduced and hysteresis loss due to an AC magnetic field is reduced, whereby an effect of enhancing efficiency is obtained. Without limitation to fixation using the attachment holes 12, as a matter of course, fixation by fitting to the frame is possible.

Figure 5:
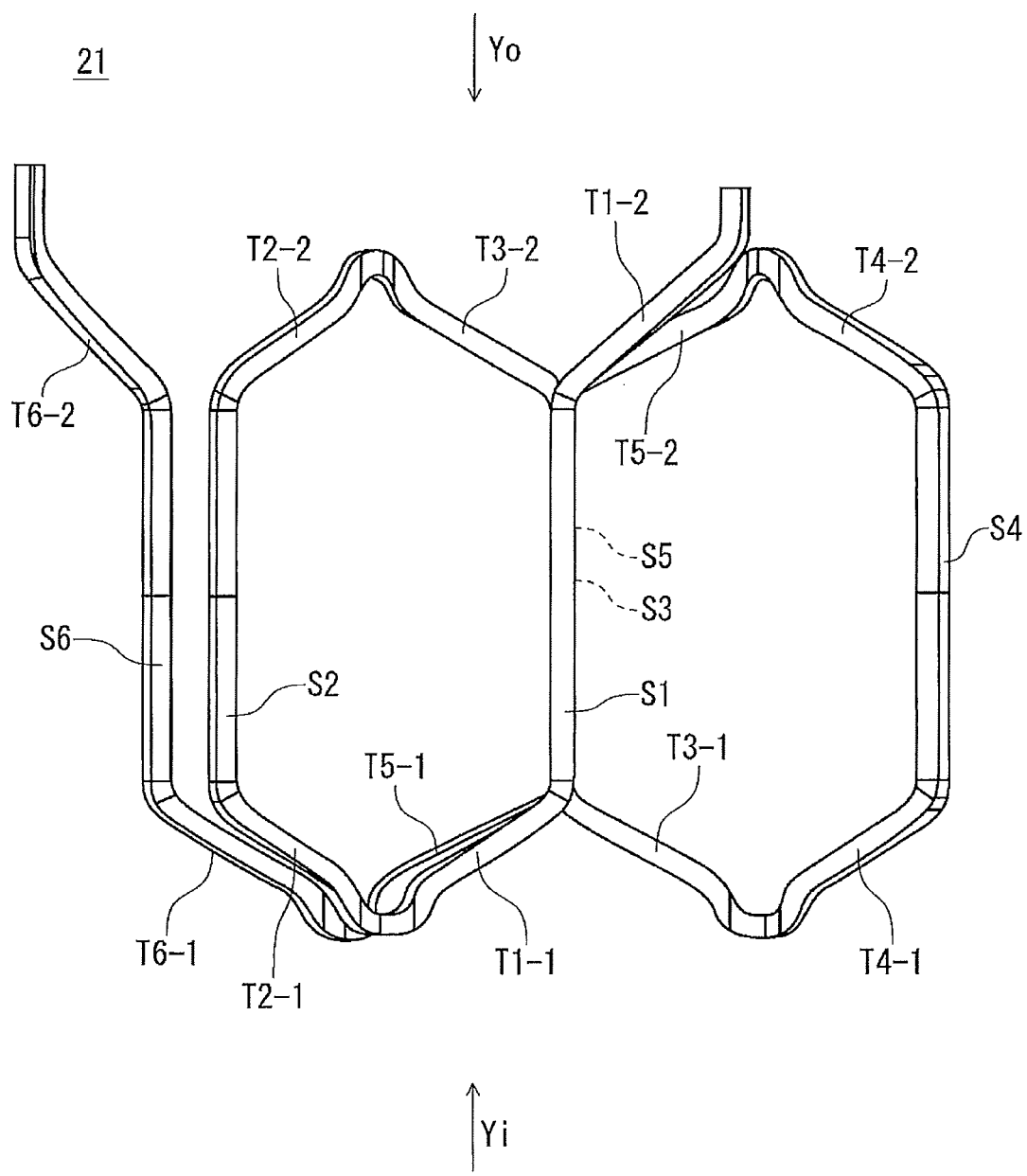
FIG. 5 is a schematic front view of a coil unit composing an armature winding according to embodiment 1 of the present invention.
Figure 6:
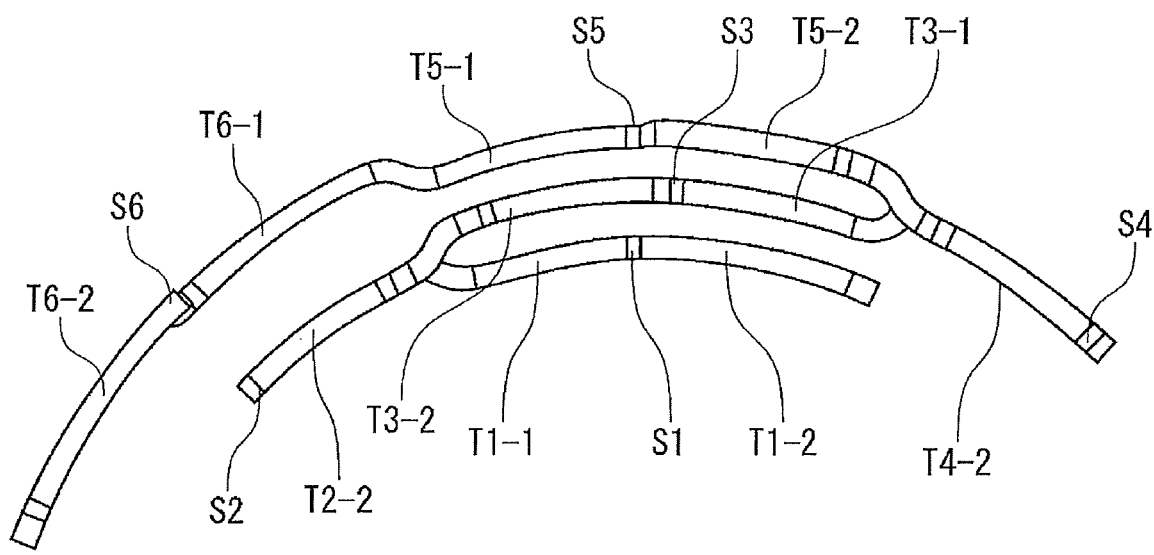
FIG. 6 is a schematic view of the coil unit shown in FIG. 5, as seen from the direction of arrow Yo.
Figure 7:
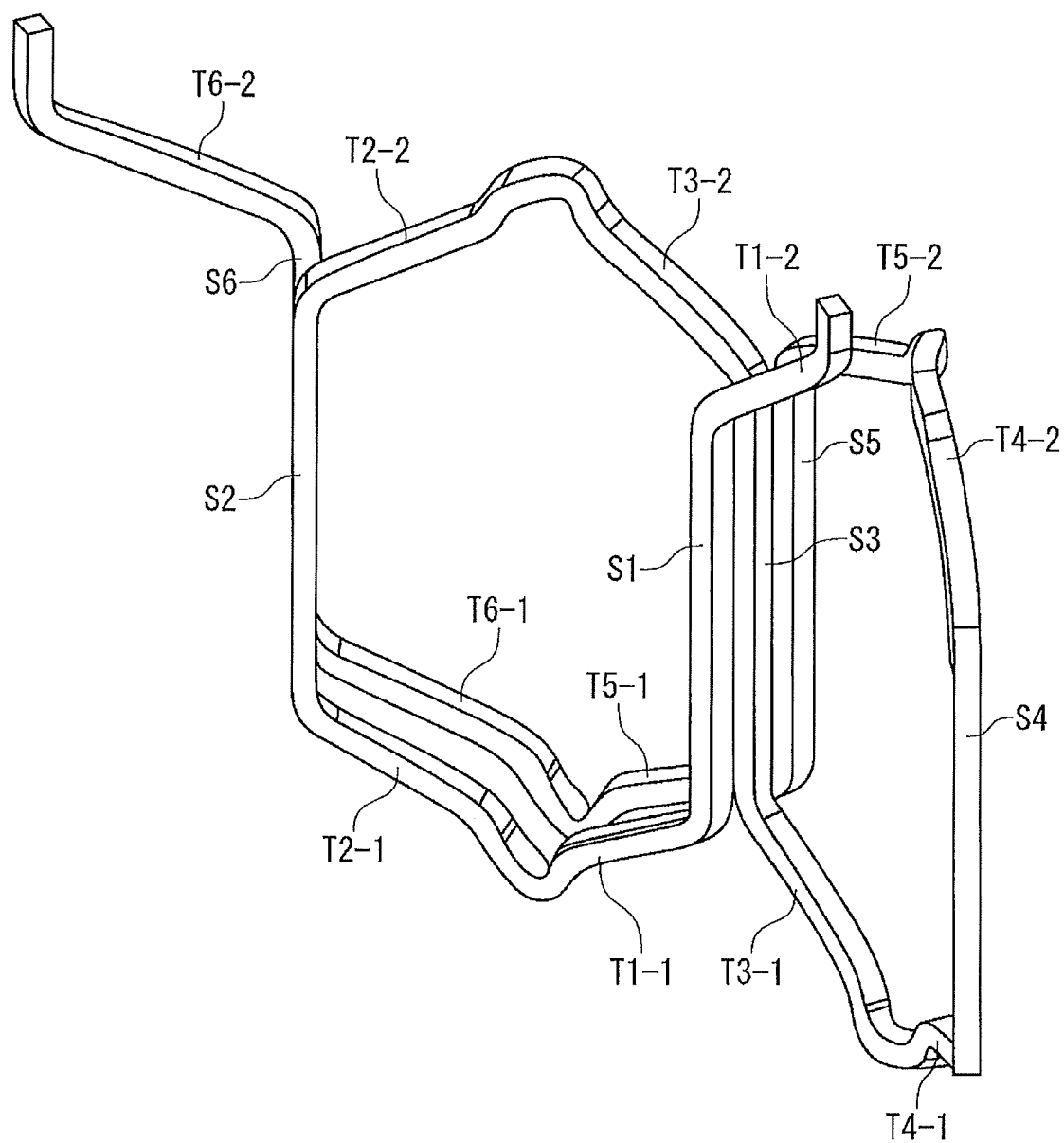
FIG. 7 is a schematic perspective view of the coil unit shown in FIG. 5.

Next, the structure of the armature winding of the present embodiment will be described. FIG. 5 to FIG. 7 show the coil unit 21 composing the armature winding.

FIG. 5 is a schematic front view of the coil unit composing the armature winding according to the present embodiment. FIG. 6 is a schematic view of the coil unit shown in FIG. 5, as seen from the direction of arrow Yo. FIG. 7 is a schematic perspective view of the coil unit shown in FIG. 5.

As shown in FIG. 5 and FIG. 7, the coil unit 21 of the present embodiment is formed from one conductive wire that is continuous with no connection parts, and is formed of a copper wire or an aluminum wire having an insulation coat of, for example, an enamel resin. The coil unit 21 of the present embodiment is formed by bending one rectangular conductive wire having a substantially rectangular sectional shape, so as to form such a shape that two hexagonal parts are arranged side by side in the width direction. In the present embodiment, the armature winding 20 is formed by continuously arranging forty-eight coil units 21 in the circumferential direction.

The coil unit 21 has six slot portions S1 to S6 having a straight bar shape and to be stored in the slots 13, which are composed of a first slot portion S1 for a first layer, a second slot portion S2 for a second layer, a third slot portion S3 for a third layer, a fourth slot portion S4 for a fourth layer, a fifth slot portion S5 for a fifth layer, and a sixth slot portion S6 for a sixth layer.

The first slot portion S1, the third slot portion S3, and the fifth slot portion S5 are at the same position in the circumferential direction.

The second slot portion S2 is separated from the first slot portion S1 toward one side in the circumferential direction by a six-slot angular interval corresponding to one magnetic pole pitch, and the sixth slot portion S6 is separated from the fifth slot portion S5 toward the one side in the circumferential direction by a six-slot angular interval corresponding to one magnetic pole pitch.

The fourth slot portion S4 is separated from the third slot portion S3 toward the other side in the circumferential direction by a six-slot angular interval corresponding to one magnetic pole pitch.

The coil unit 21 has turn portions that are continuous with no connection parts and respectively connect integrally: the first slot portion S1 and the second slot portion S2; the second slot portion S2 and the third slot portion S3; the third slot portion S3 and the fourth slot portion S4; the fourth slot portion S4 and the fifth slot portion S5; and the fifth slot portion S5 and the sixth slot portion S6.

The first slot portion S1 and the second slot portion S2 are connected via turn portions T1-1 and T2-1.

The second slot portion S2 and the third slot portion S3 are connected via turn portions T2-2 and T3-2.

The third slot portion S3 and the fourth slot portion S4 are connected via turn portions T3-1 and T4-1.

The fourth slot portion S4 and the fifth slot portion S5 are connected via turn portions T4-2 and T5-2.

The fifth slot portion S5 and the sixth slot portion S6 are connected via turn portions T5-1 and T6-1.

In addition, turn portions T1-2, T6-2 are formed which respectively extend from the first and sixth slot portions S1 and S6 and are bent toward outer sides opposite to each other in the circumferential direction. Terminal parts of the turn portions T1-2, T6-2 are connected to other coil units, or a neutral point or a power feed portion, by joining means such as welding.

Figure 8:
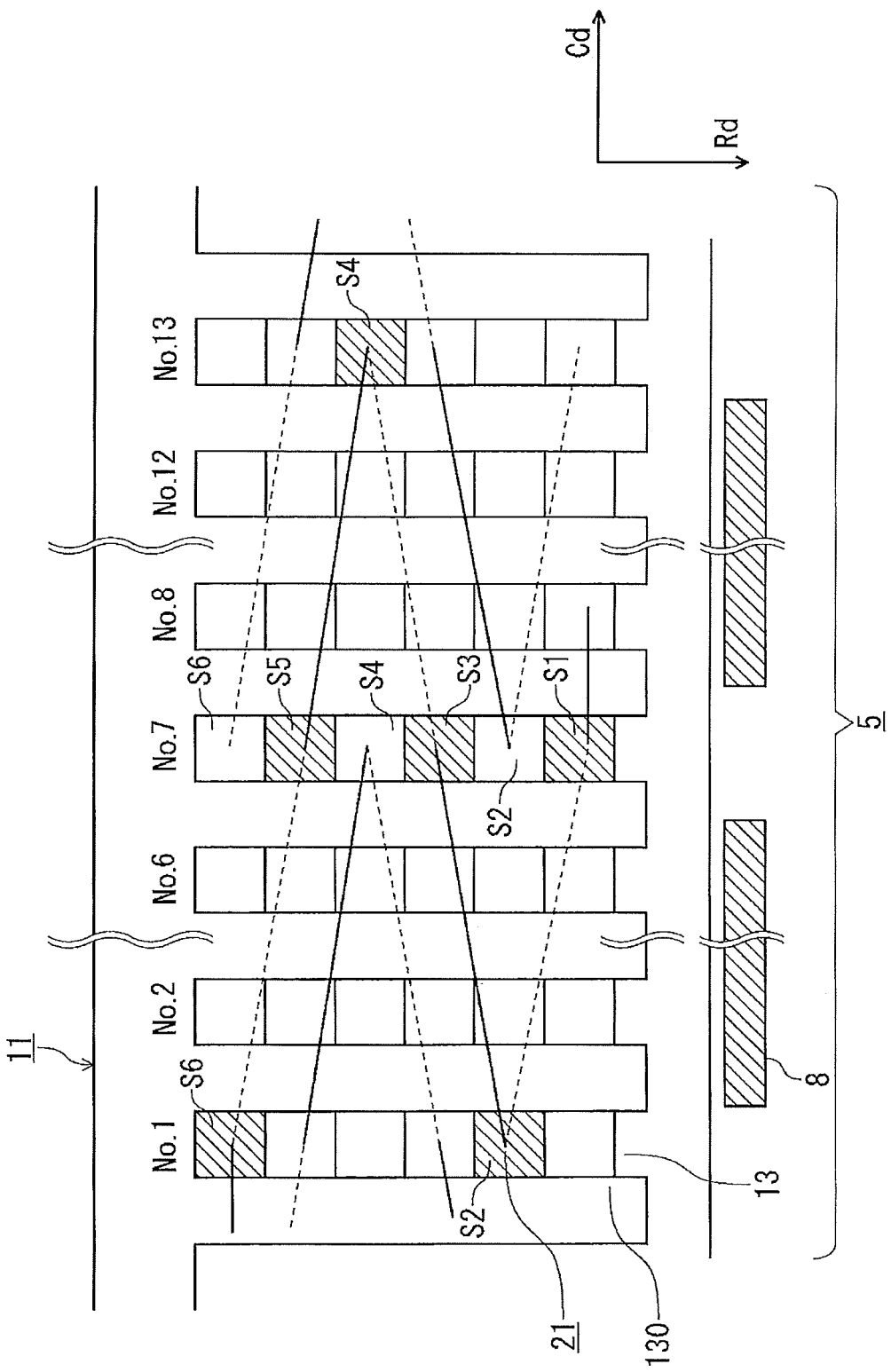
FIG. 8 is a schematic plan view showing a state in which a plurality of coil units are arranged in slots of an armature core in the armature according to embodiment 1 of the present invention.

FIG. 8 is a schematic plan view showing a state in which a plurality of the coil units are arranged in the slots of the armature core, at the wire-connection-side coil end, in the armature according to the present embodiment. It is noted that, in FIG. 8, arrow Cd indicates the circumferential direction of the rotary electric machine, and arrow Rd indicates the radially inward direction.

In FIG. 8, for convenience of description, the tooth portions 130 and the slots 13 arranged in an annular shape in the armature core 11 are developed to be arranged in a straight line. In addition, for convenience of description, the slots 13 are serially numbered with No. 1 to No. 13 from left to right in the drawing.

In FIG. 8, for example, the coil unit 21 of which the first slot portion S1, the third slot portion S3, and the fifth slot portion S5 are located in the seventh (No. 7) slot, is provided such that the second slot portion S2 and the sixth slot portion S6 are located in the first (No. 1) slot separated from the seventh slot toward one side in the circumferential direction by a six-slot angular interval corresponding to one magnetic pole pitch, and the fourth slot portion S4 is located in the thirteenth (No. 13) slot separated from the seventh slot toward the other side in the circumferential direction by a six-slot angular interval corresponding to one magnetic pole pitch.

In this seventh (No. 7) slot, the second slot portion S2 and the sixth slot portion S6 of another coil unit 21 on the other side in the circumferential direction are located, and the fourth slot portion S4 of still another coil unit 21 on the one side in the circumferential direction is located.

That is, in the seventh (No. 7) slot, from the back yoke portion side of the armature core 11 toward the opening side, the slot portions are arranged in order of the sixth slot portion S6, the fifth slot portion S5, the fourth slot portion S4, the third slot portion S3, the second slot portion S2, and then the first slot portion S1. Also in the other slots, the slot portions are arranged in the same manner.

In the present embodiment, the case where the coil unit 21 has six slot portions S1 to S6 is described. However, any coil unit that has at least three slot portions and at least two elastic turn portions connecting the slot portions, may be used, and a plurality of the coil units may be arranged so as to be combined in parallel at an equal pitch in the circumferential direction.

In the case of using the coil units having the above configuration, the tooth portions of the inner core are inserted into the already shaped and assembled coil units as described later, and therefore, as compared to the case where turn portions with no connection parts are formed on only one side in the axial direction of an armature and assembly is performed by moving the coil in the axial direction toward tooth portions of the armature from the side opposite to the turn portions so as to be inserted to the tooth portions of the armature, an effect of decreasing the number of welded parts and improving productivity is obtained because the turn portions with no connection parts can be continuously formed in the coil.

In the armature producing method described later according to the present embodiment, not only such coil units as described above but also coil units that are used in general may be used.

Next, the armature producing method of the present embodiment will be described with reference to FIG. 9 to FIG. 15.

Figure 9:
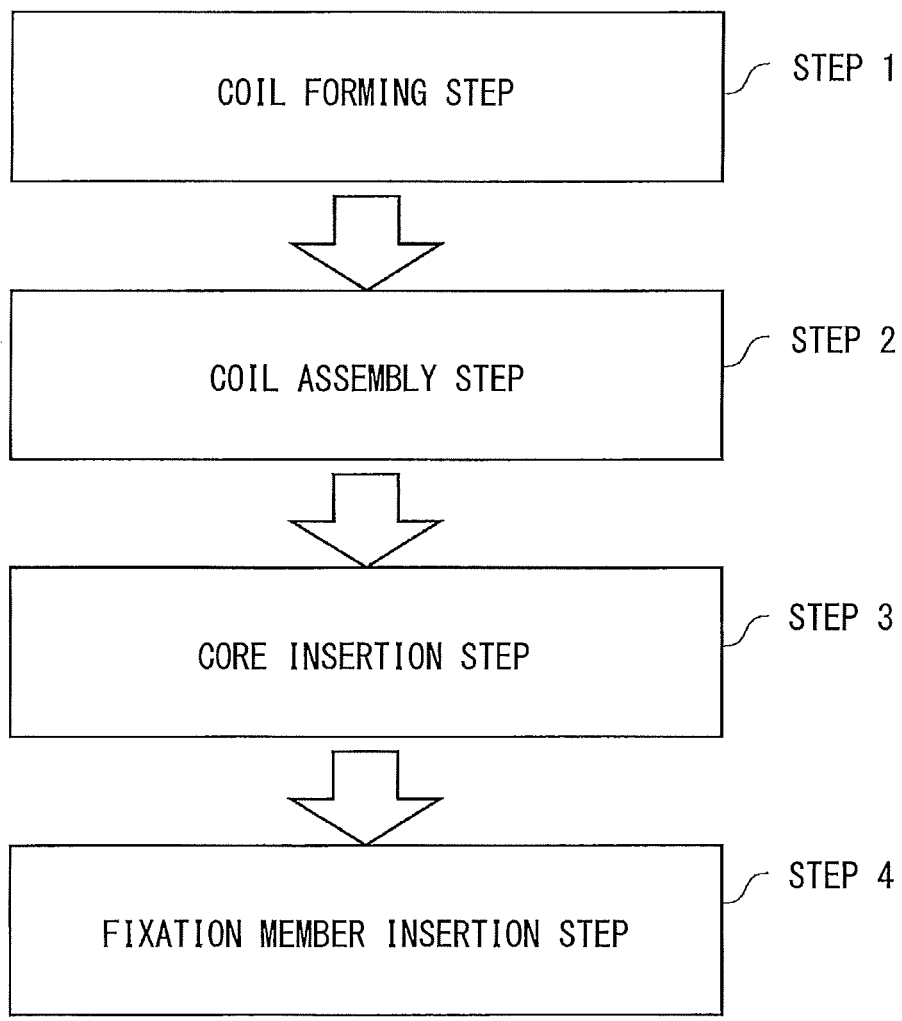
FIG. 9 shows a flowchart of an armature producing method according to embodiment 1 of the present invention.
Figure 10:
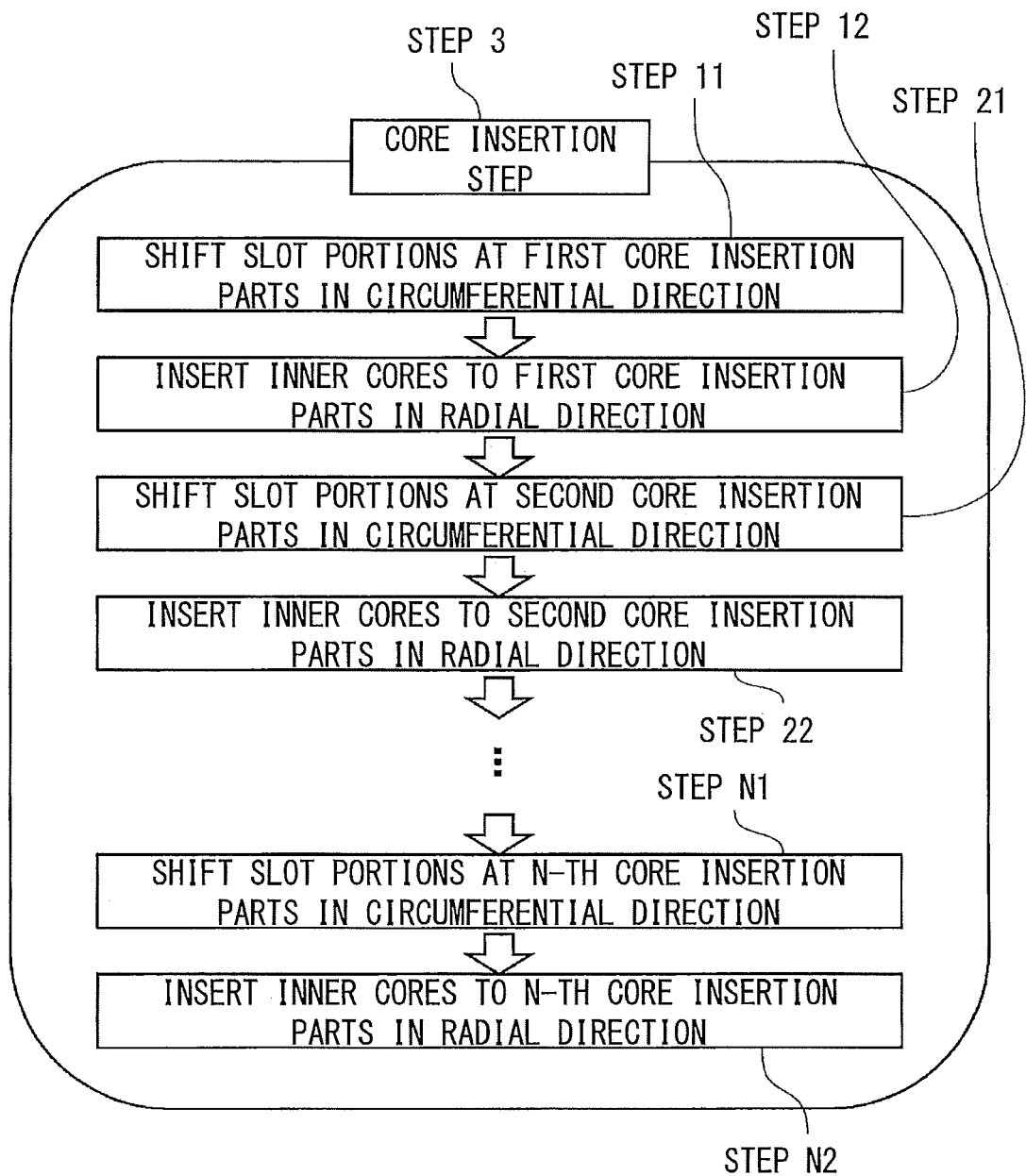
FIG. 10 shows a flowchart of a core insertion step according to embodiment 1 of the present invention.
Figure 11:
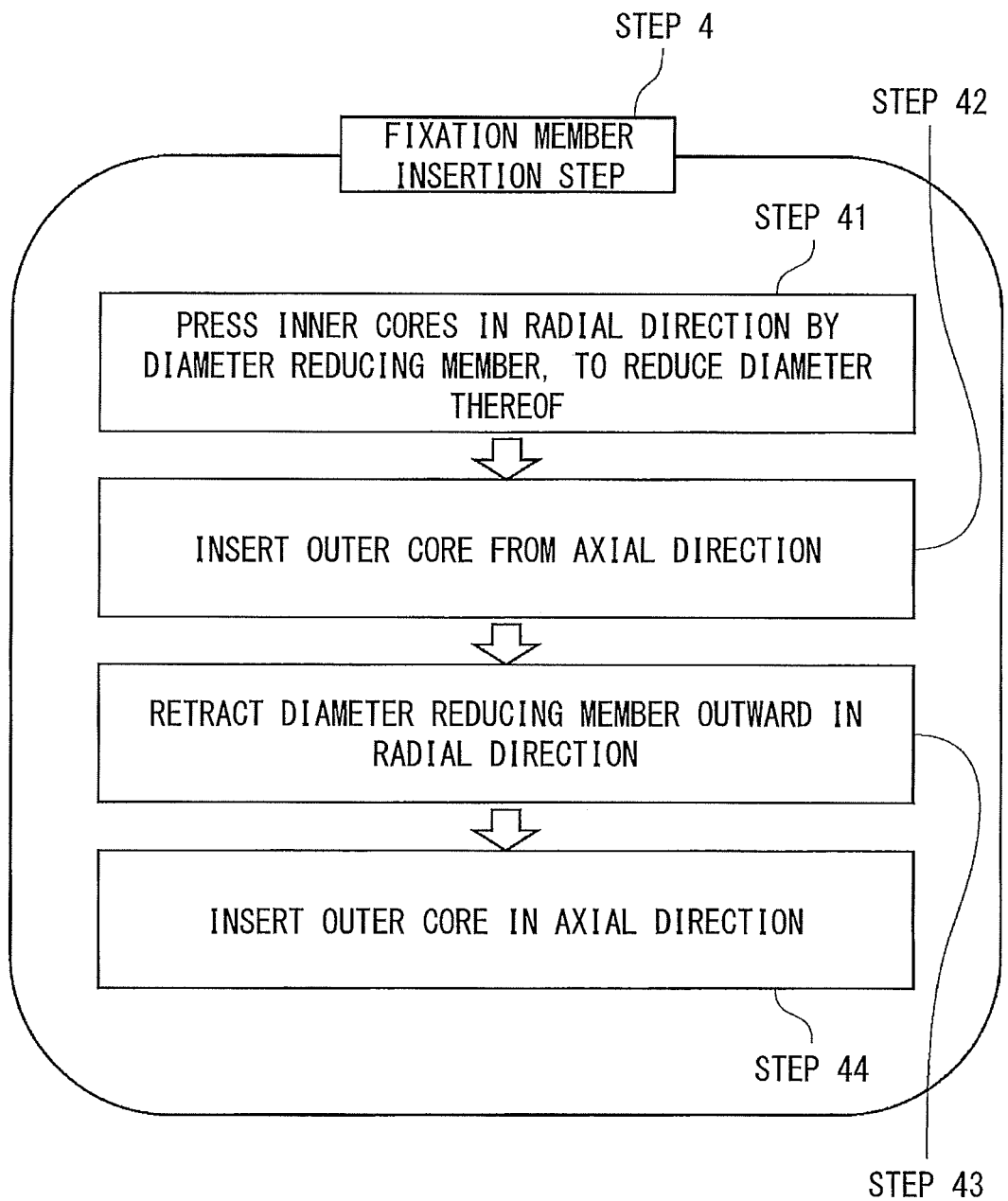
FIG. 11 shows a flowchart of a fixation member insertion step according to embodiment 1 of the present invention.
Figure 12:
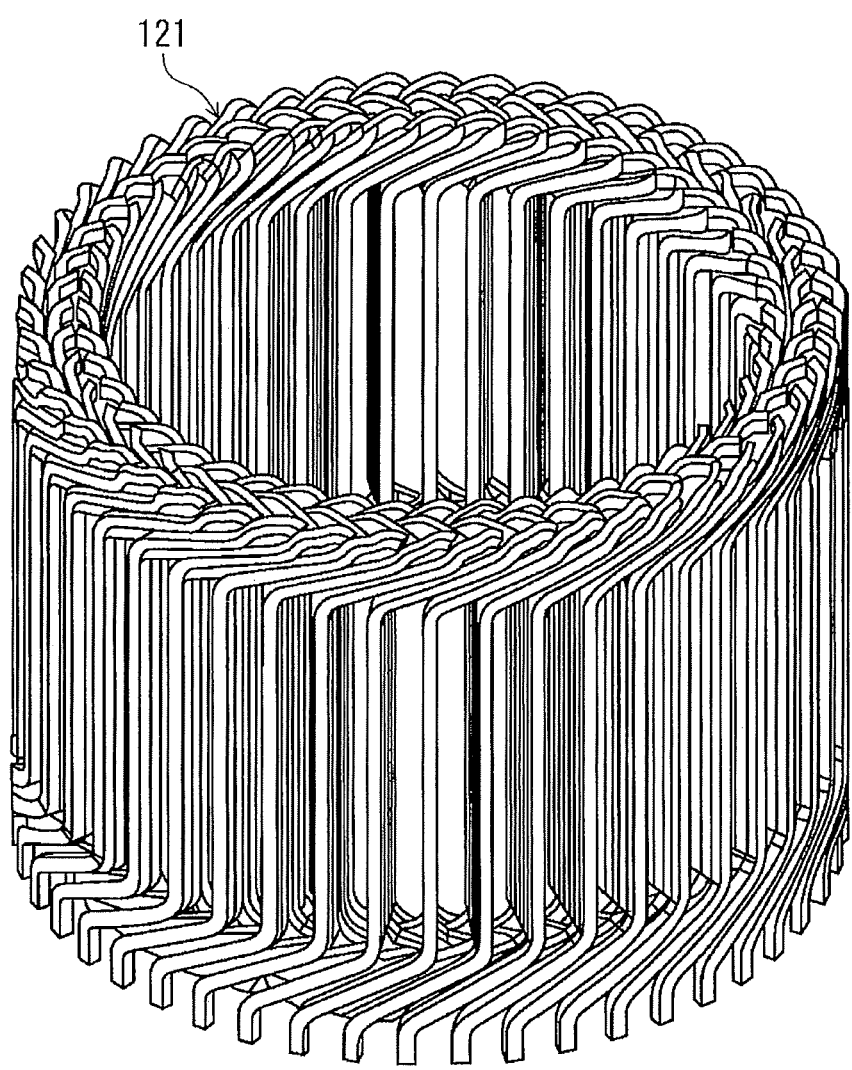
FIG. 12 is a perspective view showing a coil basket to be the armature winding according to embodiment 1 of the present invention.
Figure 13:
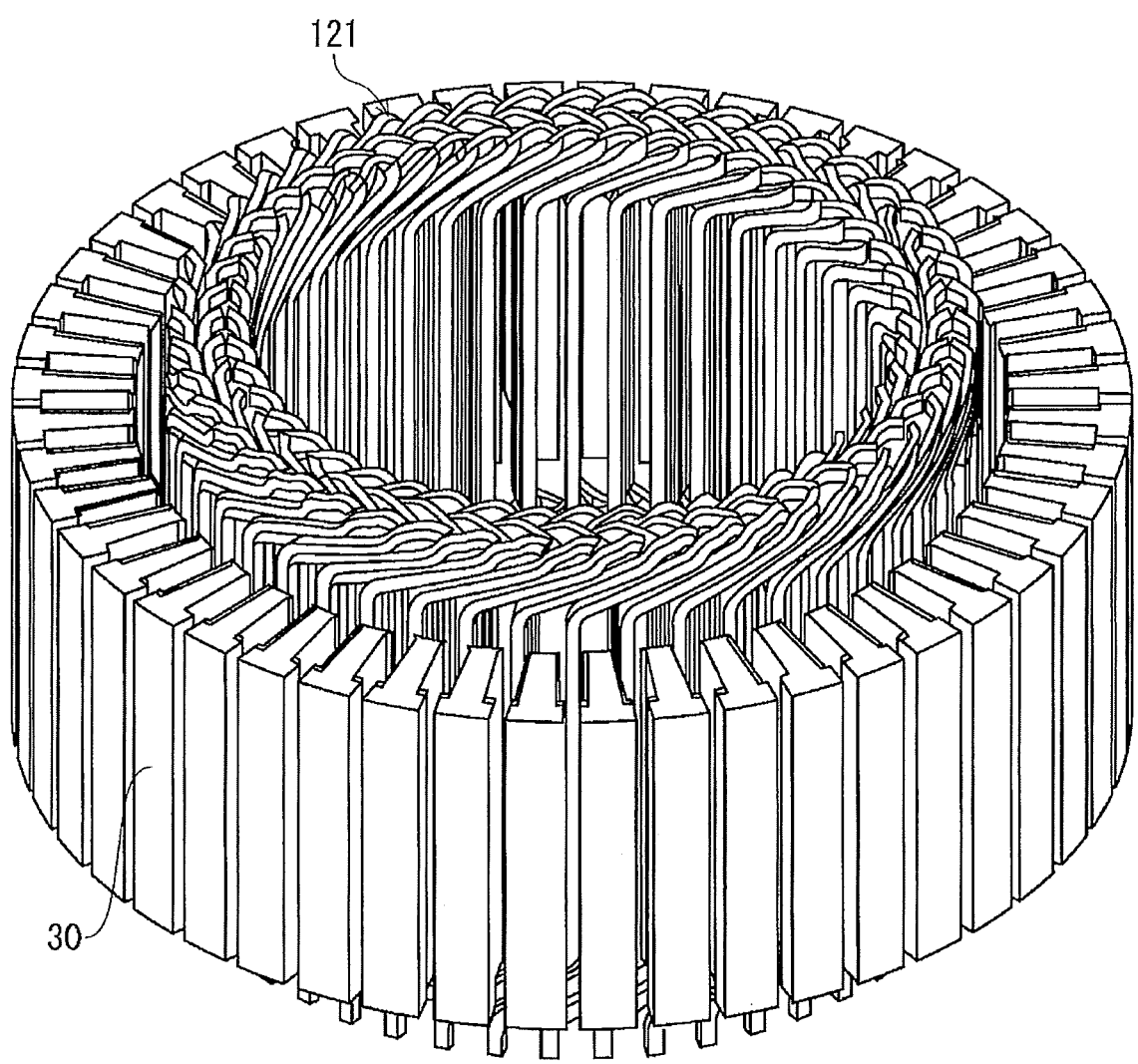
FIG. 13 is a perspective view showing a state in which inner cores are arranged on the outer side of the coil basket to be the armature winding according to embodiment 1 of the present invention.
Figure 14:
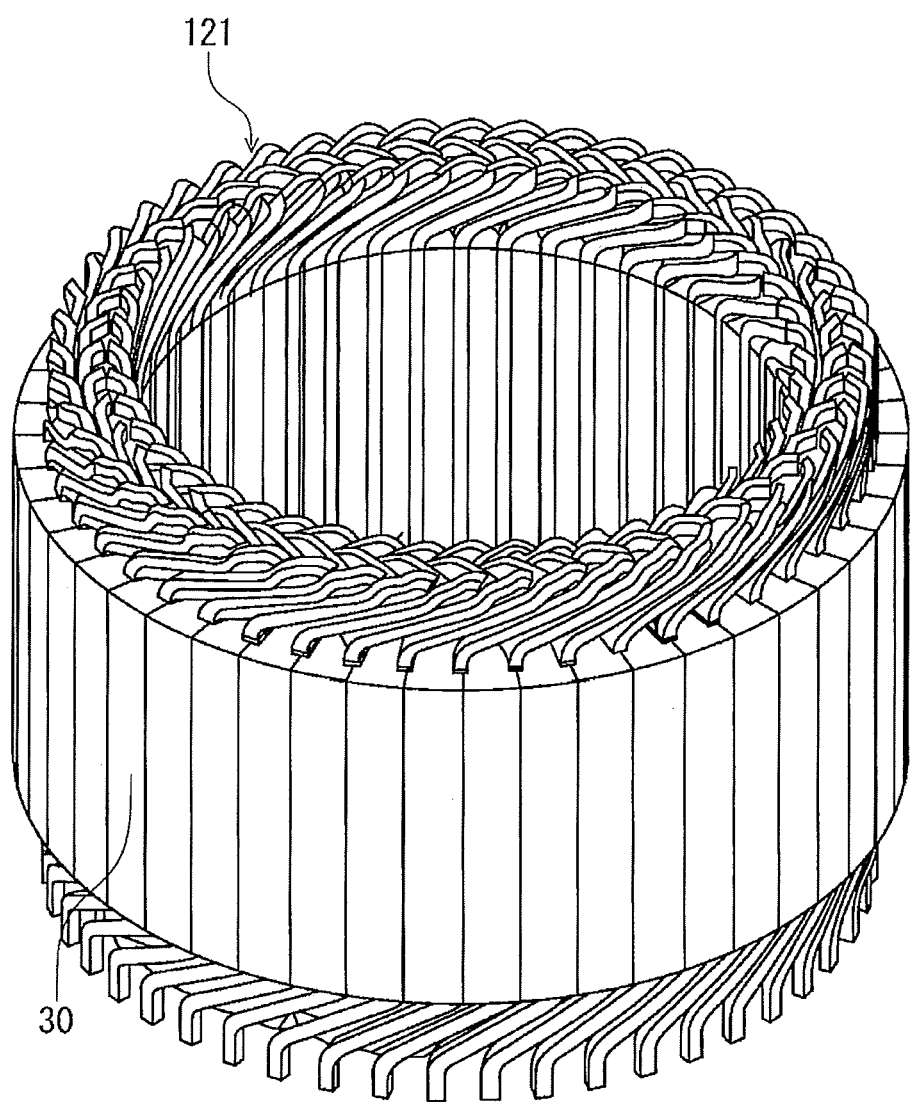
FIG. 14 is a perspective view showing a state after the inner cores are inserted into the coil basket to be the armature winding according to embodiment 1 of the present invention.
Figure 15:
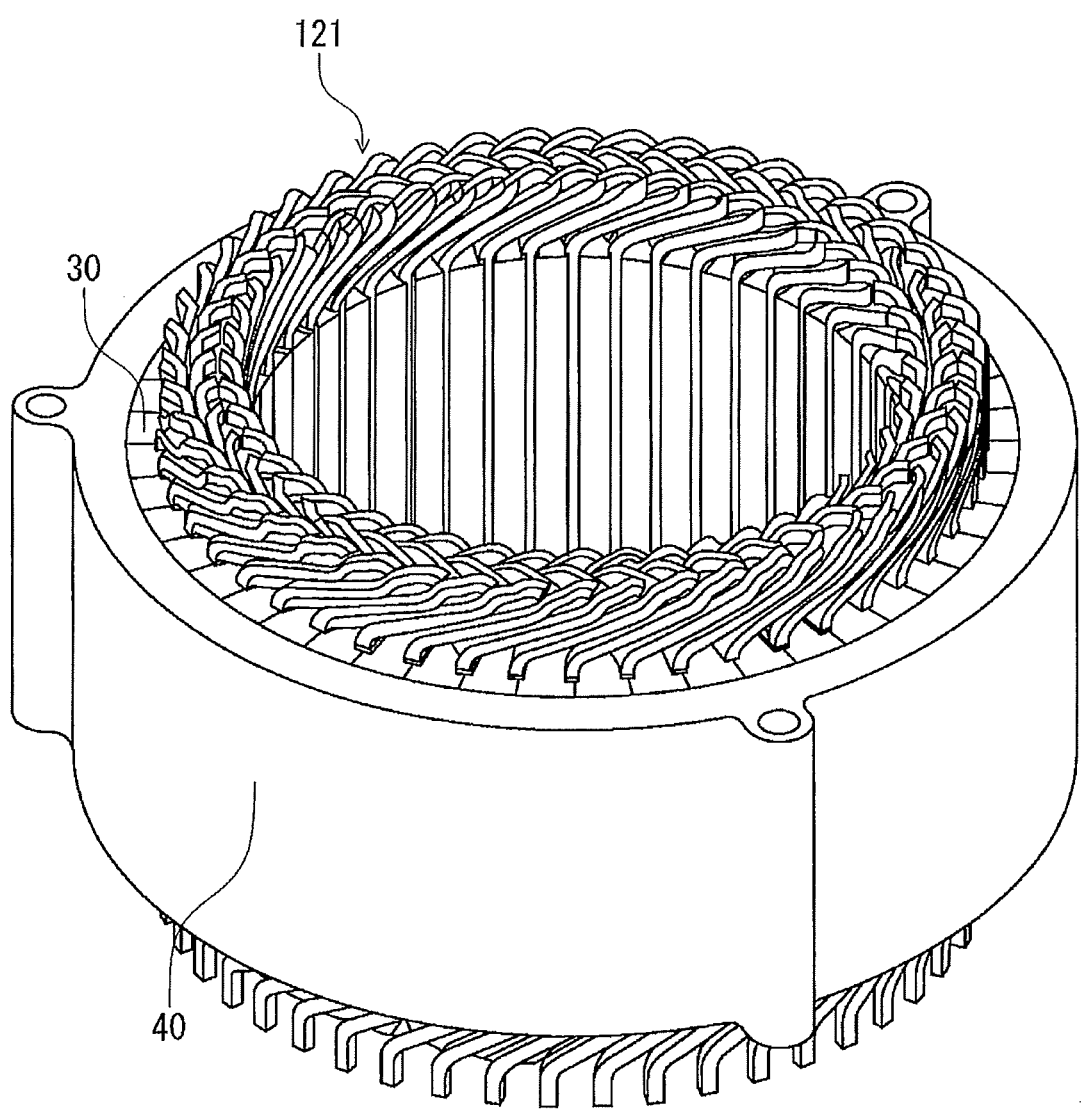
FIG. 15 is a perspective view showing the armature after an outer core is inserted according to embodiment 1 of the present invention.

FIG. 9 is a flowchart of the armature producing method according to embodiment 1 of the present invention. FIG. 10 is a flowchart of a core insertion step shown in FIG. 9. FIG. 11 is a flowchart of a fixation member insertion step shown in FIG. 9. FIG. 12 is a perspective view showing a coil basket to be the armature winding. FIG. 13 is a perspective view showing a state in which the inner cores are arranged around the outer circumference of the coil basket to be the armature winding. FIG. 14 is a perspective view after the inner cores are inserted into the coil basket to be the armature winding. FIG. 15 is a perspective view showing the armature after the outer core is inserted.

First, the outline of the armature producing method will be described with reference to the flowchart shown in FIG. 9.

In a coil forming step in step 1, as shown in FIG. 5 to FIG. 7, one conductive wire that is continuous with no connection parts and having an insulation coat is bent to form the coil unit 21. It is noted that, as described above, the coil unit is not limited to the one having six slot portions, but may be the one having at least three slot portions and elastic turn portions connecting the slot portions.

Figure 46:
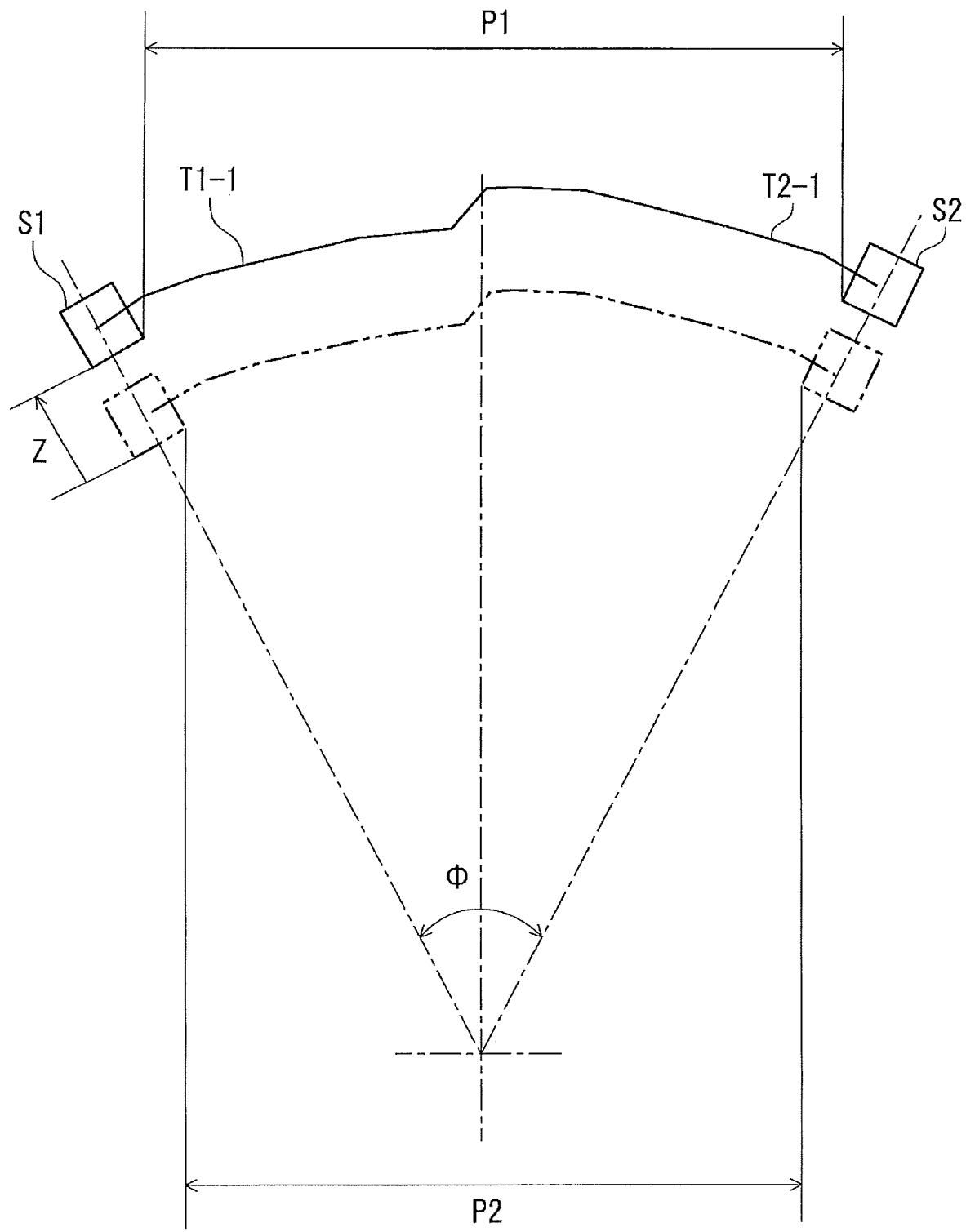
FIG. 46 is a schematic view of the coil unit shown in FIG. 5, as seen from the direction of arrow Yi.

Here, a circumferential-direction pitch P of the turn portions connecting the slot portions of the coil unit 21 in the coil forming step will be described. FIG. 46 is a schematic view of the coil unit shown in FIG. 5, as seen from the direction of arrow Yi, and shows only the slot portion S1, the turn portion T1-1, the turn portion T2-1, and the slot portion S2. In FIG. 46, it is desired that a circumferential-direction pitch P1 of the turn portions when the coil is shaped, which is indicated by a solid line, is designed to be greater than a circumferential-direction pitch P2 of the turn portions after completion of the armature, which is indicated by a broken line. A desirable circumferential-direction pitch P of the turn portions will be described later.

Next, in a coil assembly step in step 2, a predetermined number of, forty-eight in the present embodiment, coil units 21 are continuously arranged in the circumferential direction, to form an annular coil basket 121 as shown in FIG. 12.

Next, in a core insertion step in step 3, as shown in FIG. 13 and FIG. 14, the inner core 30 is inserted from the radially outer side of the coil basket 121. The details of the core insertion step in step 3 will be described later.

Next, in a fixation member insertion step in step 4, as shown in FIG. 15, the outer core 40 is inserted in the axial direction, to obtain the armature 10. The details of the fixation member insertion step in step 4 will be described later.

Figure 16:
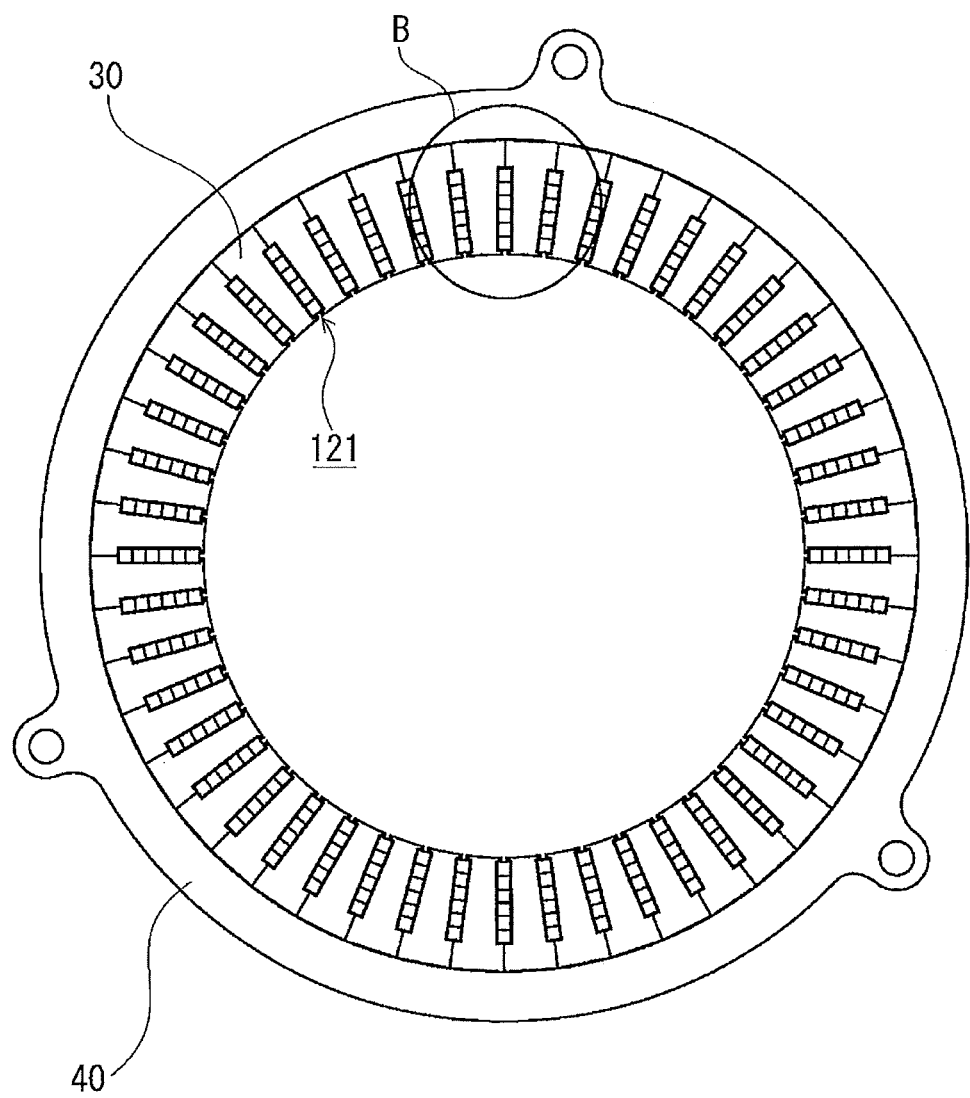
FIG. 16 is a plan sectional view showing the armature after the outer core is inserted according to embodiment 1 of the present invention.
Figure 17:
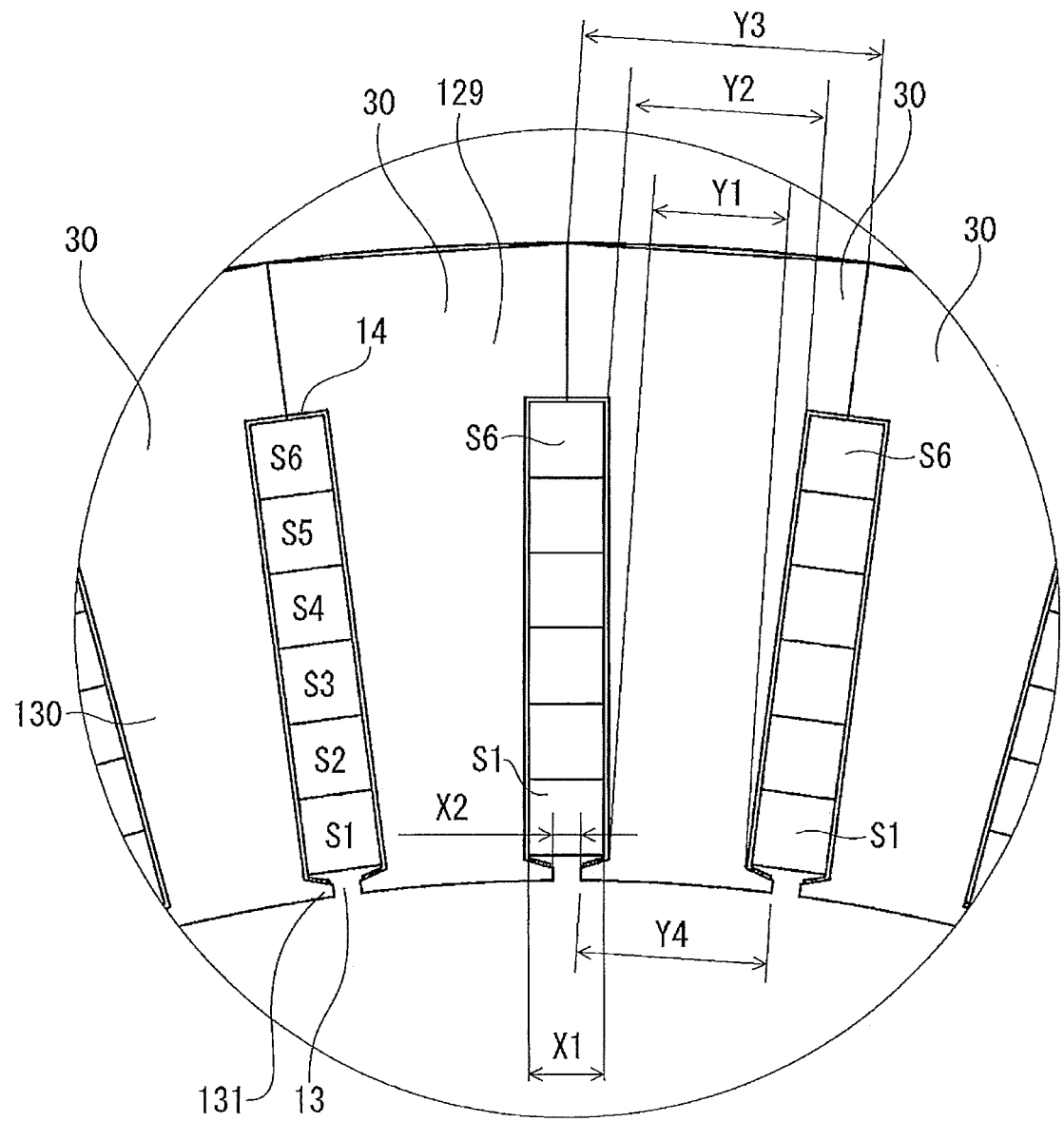
FIG. 17 is a detailed sectional view of part B of the armature in FIG. 16.

FIG. 16 is a plan sectional view showing the armature after the outer core is inserted, according to the present embodiment 1, and FIG. 17 is a detailed sectional view of part B of the armature shown in FIG. 16. As shown in the drawings, the slot portions S1 to S6 of the coil units 21 are stored in an aligned state in each slot 13 formed between the tooth portions 130 of the adjacent inner cores 30.

In FIG. 17, X1 indicates the circumferential-direction width of the slot portions S1 to S6, X2 indicates the circumferential-direction distance between the adjacent circumferential-direction protrusion portions 131, Y1 indicates the circumferential-direction distance between the adjacent slot portions S1 and S1 located on the radially innermost side, Y2 indicates the circumferential-direction distance between the adjacent slot portions S6 and S6 located on the radially outermost side, Y3 indicates the circumferential-direction width of the back yoke portion 129 of the inner core 30, and Y4 indicates the circumferential-direction width of the circumferential-direction protrusion portion 131.

As shown in FIG. 17, the circumferential-direction width Y4 of the circumferential-direction protrusion portion 131 at the tooth portion end of the inner core 30 is greater than the circumferential-direction distance Y1 between the adjacent slot portions S1 and S1 located on the radially innermost side. Therefore, if the inner core 30 is simply inserted into the coil units 21 in the radial direction, each circumferential-direction protrusion portion 131 interferes with the slot portions S1 to S6 and thus it is impossible to assemble the armature.

Therefore, in the present embodiment, the armature is assembled by an armature producing method described below.

First, with reference to the schematic views in FIG. 18 to FIG. 23, the principle of the core insertion step in the present embodiment will be described.

Figure 18:
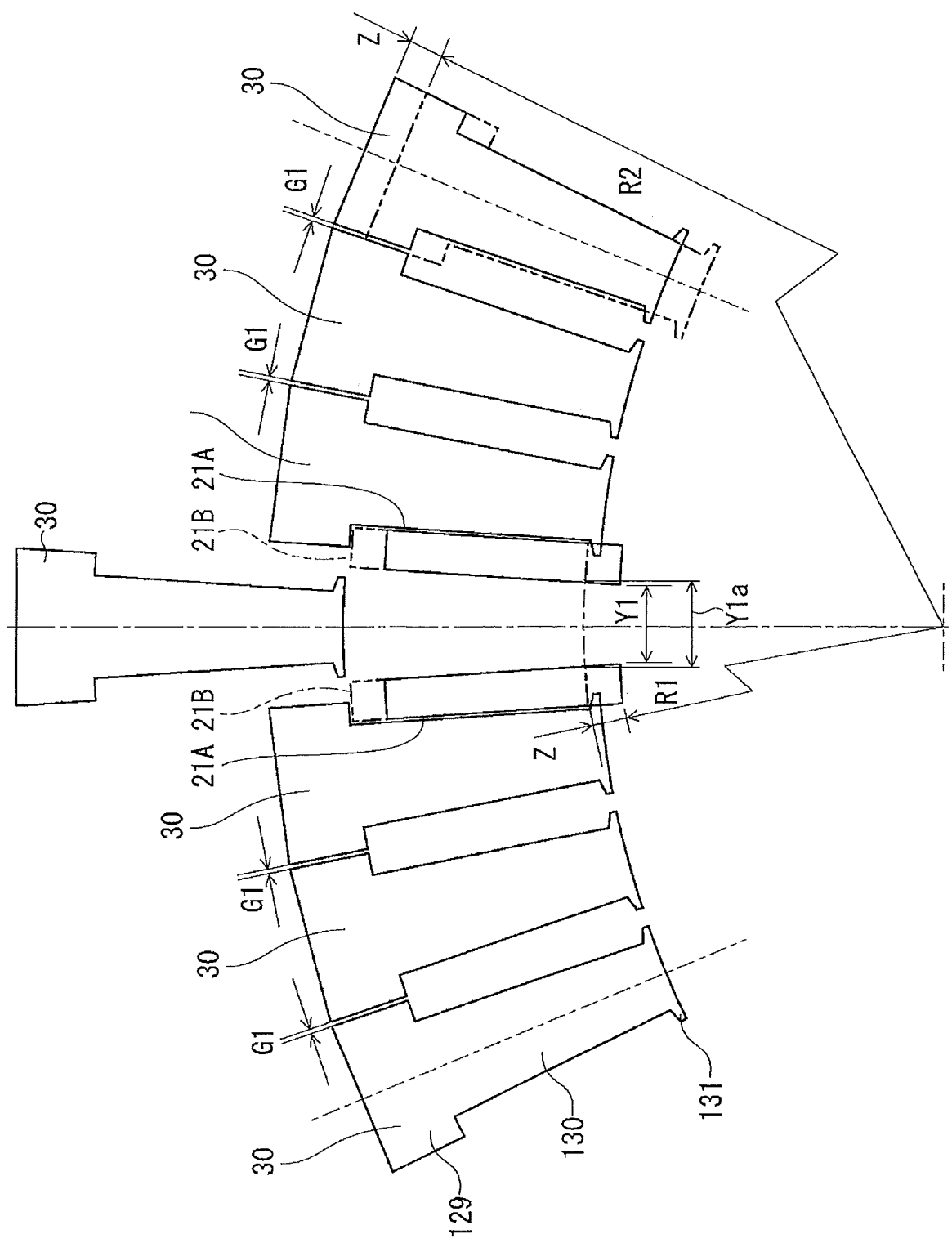
FIG. 18 is a schematic view illustrating the core insertion step according to embodiment 1 of the present invention.

FIG. 18 is a schematic view showing a dimensional relationship in the core insertion step. In the drawing, a radial-direction position 21B (core insertion time position 21B) of the slot portions S1 to S6 of the coil units 21 at the time of core insertion is shifted outward in the radial direction relative to a radial-direction position 21A (normal position 21A) of the slot portions S1 to S6 of the coil units 21 after completion of the armature (state in FIG. 15), and at the time of core insertion, the coil units 21 are retained at the core insertion time position 21B. Here, the distance between the inner circumferential part of the slot portion S1 at the normal position 21A and the center of the rotary electric machine is defined as R1, and an amount of shifting outward in the radial direction from the normal position 21A to the core insertion time position 21B is defined as a radial-direction movement amount Z. In this case, the circumferential-direction distance between the slot portions S1 and S1 that are adjacent in the circumferential direction and located on the radially innermost side increases from Y1 to Y1a. The amount of the increase at this time is represented by the following expression (1), using M as the number of slots.

$$Y1a-Y1=2\times\pi\times Z/M \qquad (1)$$

In this case, as shown in FIG. 46 described above, it is desirable that the circumferential-direction pitch P1 of the turn portions of the coil unit 21 is set, in advance, to be greater than the circumferential-direction pitch P2 of the turn portions after completion of the armature. Specifically, where the central angle of the circumferential-direction pitch of the turn portions after completion of the armature is denoted by Φ (degree), the coil unit 21 is formed such that the central angle of the circumferential-direction pitch of the turn portions in a state of being shifted by Z in the radial direction as described above is almost the same as the angle Φ. The angle Φ is represented by the following expression, using N1 as the number of poles.

$$\Phi=360/(2\times N1)$$

The amount of increase in the circumferential length of the turn portions when the coil unit is shaped, relative to the circumferential length after completion of the armature, is denoted by D1, and the amount of increase D1 is set to be almost the same as the right-hand side of the following expression.

$$D1=2\times\pi\times Z\times\Phi/360$$

Figure 47:
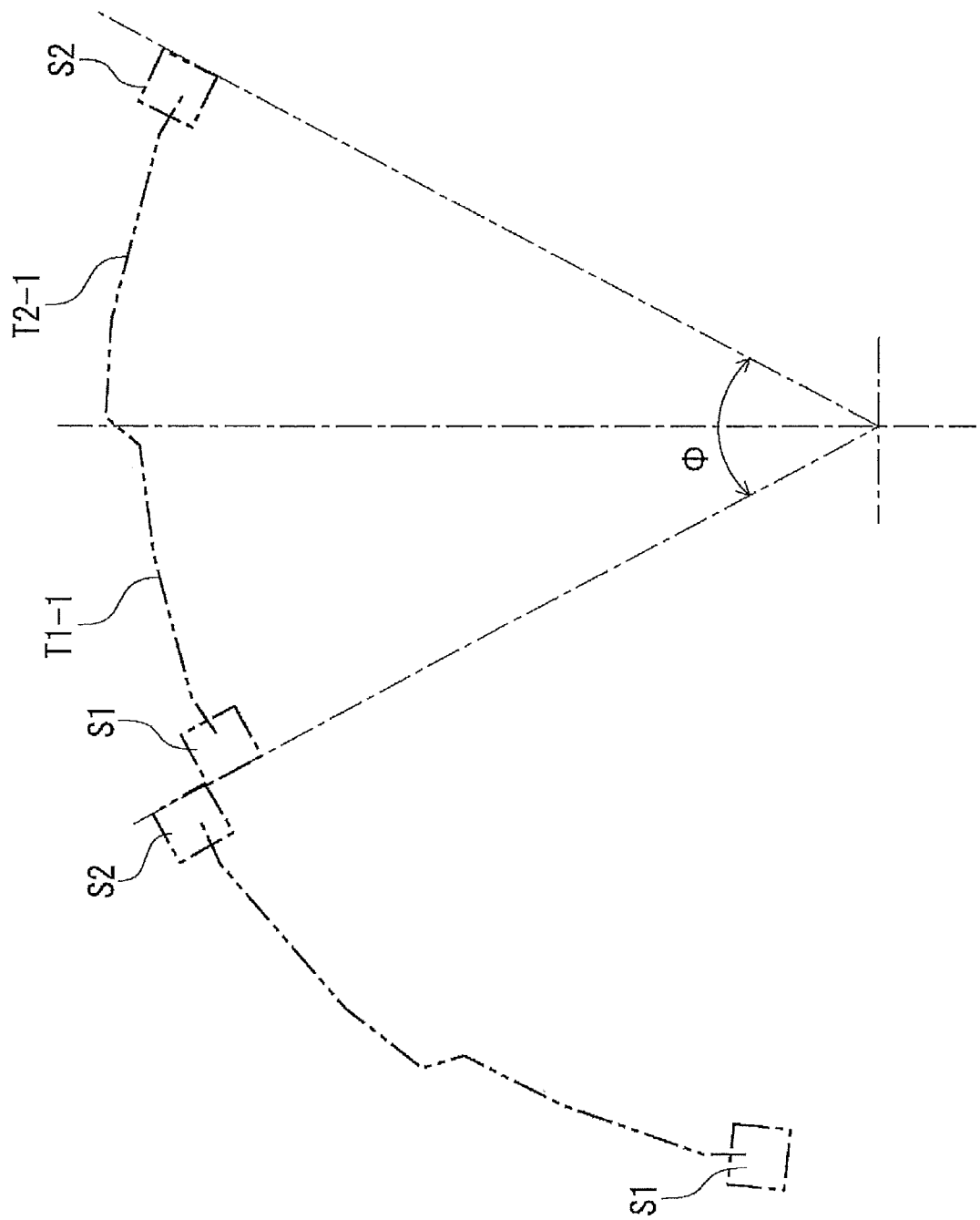
FIG. 47 is a schematic view showing the coil units retained in a state of being shifted outward in the radial direction, in the case where the coil units are shaped in advance into the shape after completion of the armature.
Figure 48:
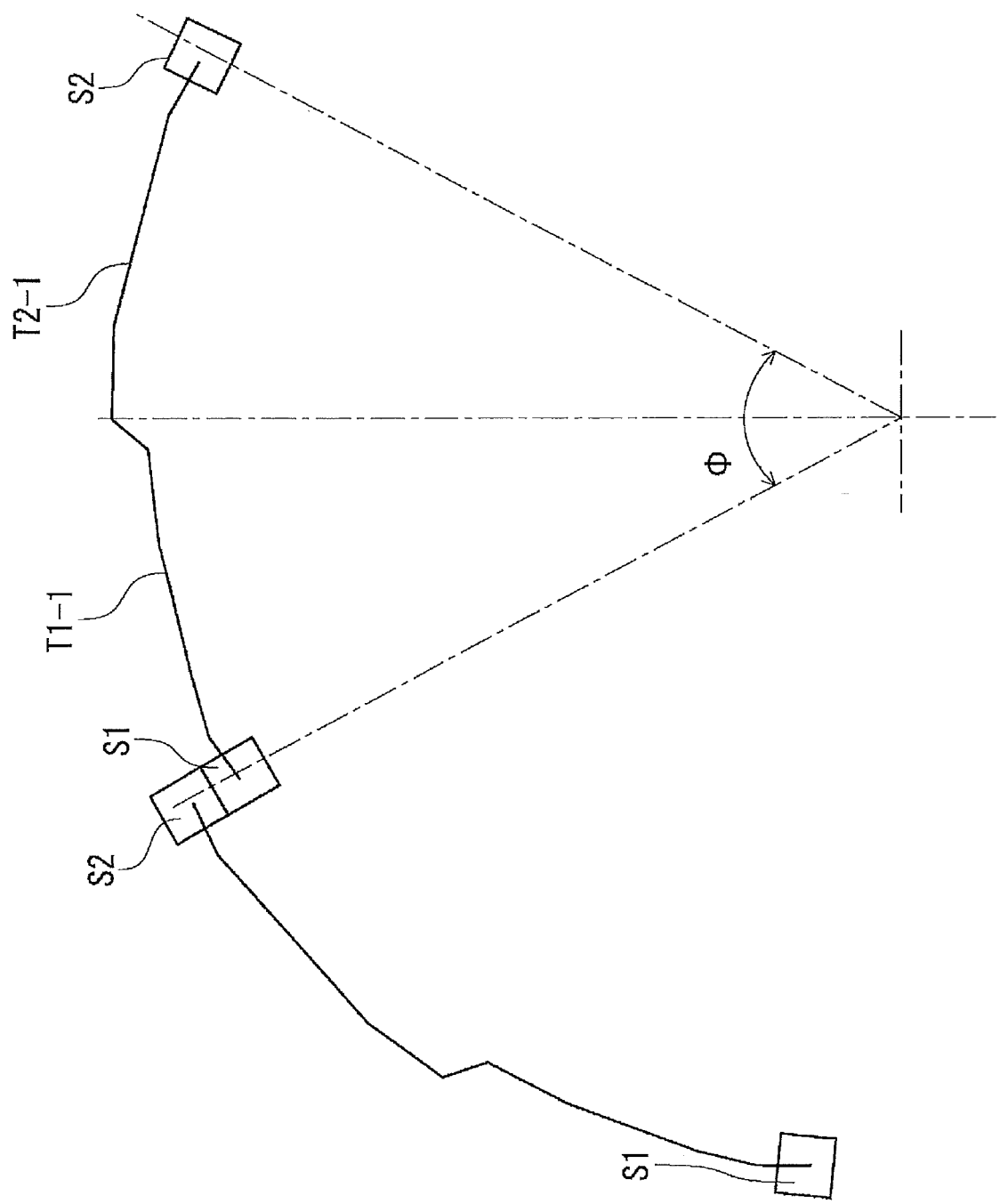
FIG. 48 is a schematic view showing the coil units retained in a state of being shifted outward in the radial direction, in the case where the circumferential-direction pitch of the turn portions is increased in advance.

In the case where the coil unit is formed in advance into the shape after completion of the armature, as shown in FIG. 47, the slot portions are not aligned on a straight line in the radial direction when the coil unit is retained in a state of being shifted outward in the radial direction relative to the shape after completion of the armature. Therefore, it is necessary to forcibly align the slot portions in the radial direction by elastically or plastically deforming the turn portions. On the other hand, in the case where, at the time of shaping the coil unit, the circumferential-direction pitch of the turn portions is expanded in advance with the amount of increase in the circumferential length of the turn portions set at D1, as shown in FIG. 48, the slot portions are aligned on a straight line in the radial direction even if the coil unit is retained in a state of being shifted outward in the radial direction relative to the shape after completion of the armature. Thus, insertion of the core 30 is facilitated and an effect of improving productivity is obtained. In addition, since it is not necessary to deform the turn portions, an effect of improving insulation property is obtained.

Next, regarding the radial-direction position of the inner core 30 at the time of core insertion, the distance from the axial center to the outer circumferential surface of the inner core 30 after completion of the armature is denoted by R2, and at the time of insertion of the inner core 30, the amount of shifting outward in the radial direction from the position after completion of the armature is defined as the radial-direction movement amount Z. In this case, when the inner cores 30 are arranged at an equal pitch in the circumferential direction, a distance G1 between the back yoke portions 129 of the inner cores 30 adjacent in the circumferential direction is represented by the following expression (2).

$$G1=2\times\pi\times Z/M \qquad (2)$$

Figure 19:
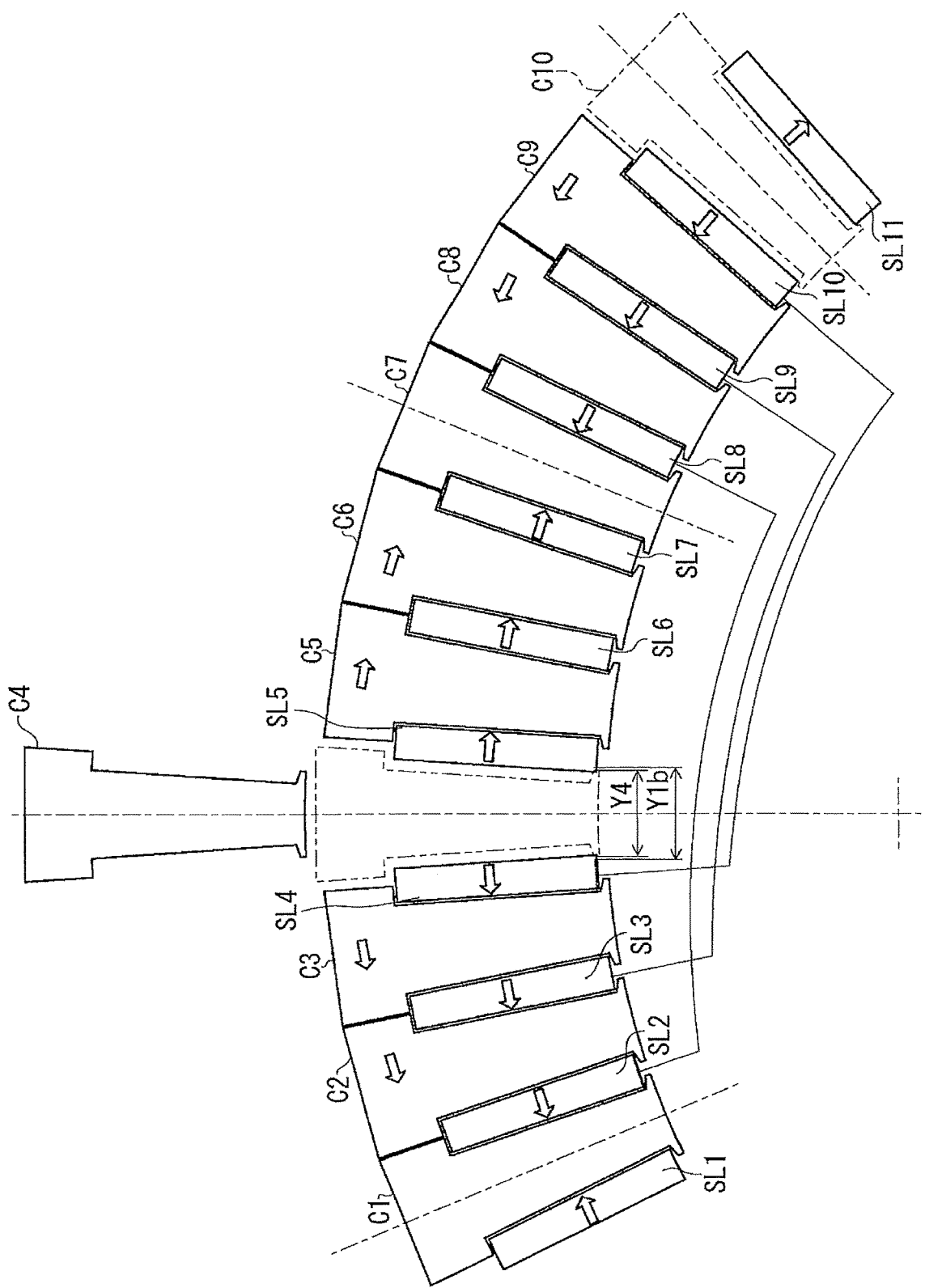
FIG. 19 is a schematic view illustrating the core insertion step according to embodiment 1 of the present invention.

Next, as shown in FIG. 19, in order to insert the inner core 30 into the coil basket 121, the slot portions S1 to S6 of the coil units 21 and the inner cores 30 are shifted in the circumferential direction. In FIG. 19, for convenience of description, ten inner cores 30 are shown as inner cores C1 to C10 from left toward right in the drawing, and the slot portions S1 to S6 stored in each identical slot is defined as slot portions SL1 to SL11 from left toward right in the drawing.

In FIG. 19, the case of inserting the inner core C4 and the inner core C10 into the coil basket 121 is assumed. It is noted that the inner cores C1 to C3 and C5 to C9 are already inserted. In this case, the inner cores C2, C3 and the slot portions SL2, SL3, SL4 are shifted in an arrow direction in the circumferential direction (leftward in the drawing) toward the inner core C1. In addition, the inner cores C5, C6 and the slot portions SL5, SL6, SL7 are shifted in an arrow direction in the circumferential direction (rightward in the drawing) toward the inner core C7. In addition, the inner cores C8, C9 and the slot portions SL8, SL9, SL10 are shifted in an arrow direction in the circumferential direction (leftward in the drawing) toward the inner core C7. It is noted that the inner cores and the slot portions on the right side of the inner core C10 in the drawing are also shifted in the same manner.

At this time, the inner core C2 can be moved in the circumferential direction (leftward in the drawing) by the distance G1 shown in FIG. 18. The inner core C3 can be moved in the circumferential direction (leftward in the drawing) by a distance (2×G1). The inner core C6 can be moved in the circumferential direction (rightward in the drawing) by the distance G1. The inner core C5 can be moved in the circumferential direction (rightward in the drawing) by a distance (2×G1). The inner core C8 can be moved in the circumferential direction (leftward in the drawing) by the distance G1. The inner core C9 can be moved in the circumferential direction (leftward in the drawing) by a distance (2×G1).

Figure 20:
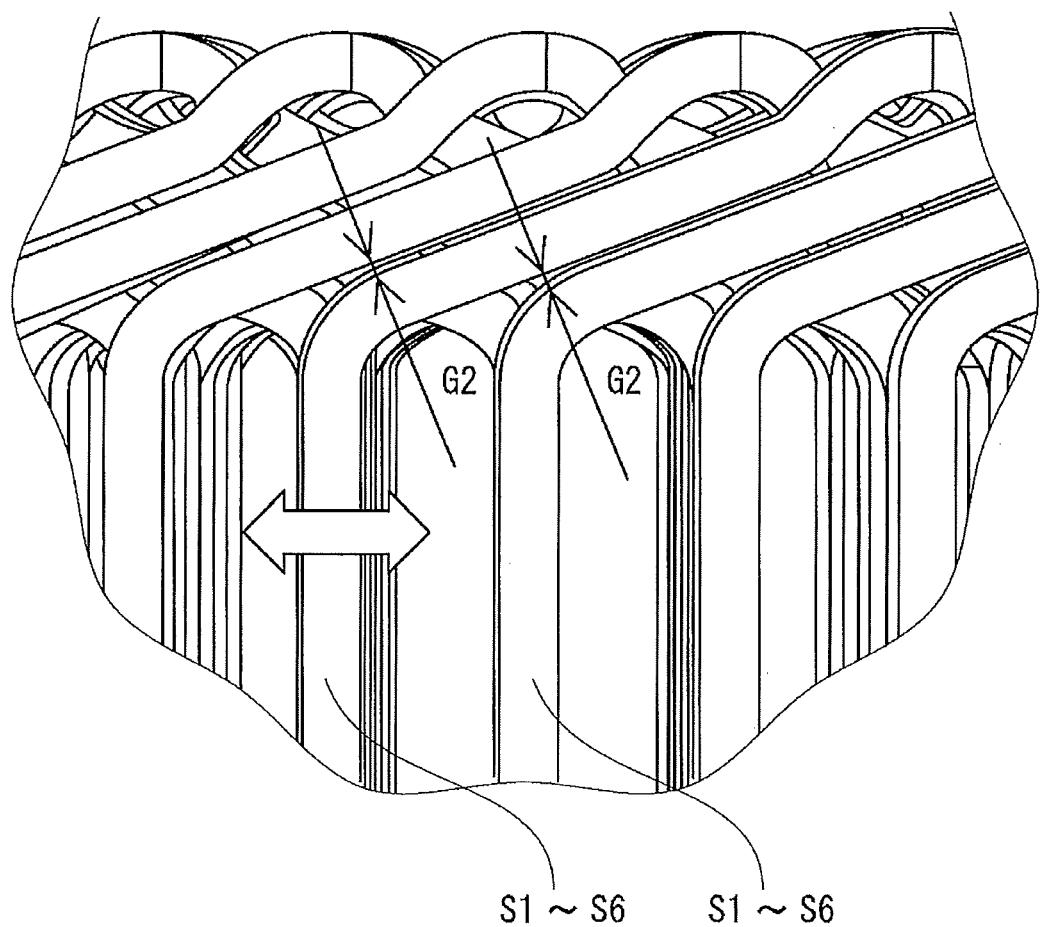
FIG. 20 is a schematic view illustrating the core insertion step according to embodiment 1 of the present invention.

Focusing on the slot portion SL2 and the slot portion SL8 of the coil units 21, the slot portions SL2 and SL8 are connected by the turn portions, and therefore can be moved in the same direction. Similarly, the slot portion SL3 and the slot portion SL9, and the slot portion SL4 and the slot portion SL10, are respectively connected by the turn portions, and therefore can be moved in the same direction. Here, as shown in FIG. 20, it is desirable to provide gaps G2 between the turn portions adjacent in the circumferential direction. By providing the gaps G2, movement in the circumferential direction can be performed without deforming the slot portions S1 to S6 of the coil units 21. Since assembly can be performed without deforming the slot portions S1 to S6 of the coil units 21, risk of damage to the coil coat is reduced and thus an effect of improving reliability is obtained.

In FIG. 19, in the case of inserting the inner core C4, it is necessary that a circumferential-direction distance Y1b between the slot portion SL4 and the slot portion SL5 on the radially innermost side is set to be greater than the circumferential-direction width Y4 of the circumferential-direction protrusion portion 131 of the inner core C4. At this time, the inner core C4 can be inserted in the radial direction without interfering with the slot portions SL4 and SL5. Here, the circumferential-direction distance Y1a (see FIG. 18) between the slot portions SL4 and SL5 before the inner cores C2, C3, C5, C6 and the slot portion SL2 to SL7 are moved in the circumferential direction, and the circumferential-direction distance Y1b between the slot portions SL4 and SL5 after the movement in the circumferential direction, are represented by the following expression (3).

$$Y1b-Y1a=2\times G1 \tag{3}$$

Figure 21:
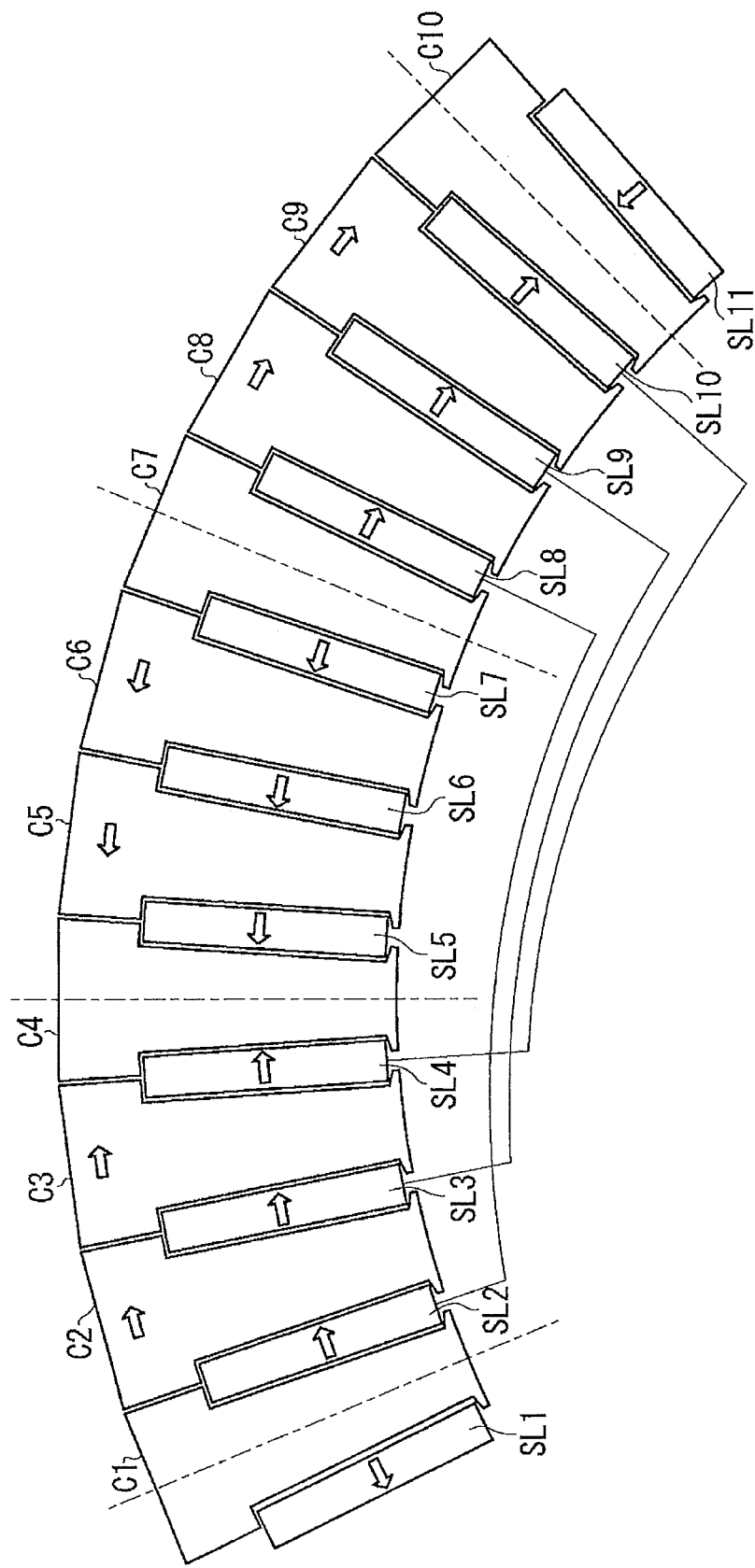
FIG. 21 is a schematic view illustrating the core insertion step according to embodiment 1 of the present invention.

Next, as shown in FIG. 21, after the inner core C4 is inserted between the slot portions SL4 and SL5 of the coil units 21, the inner cores C2, C3, C5, C6, C8, C9 and the slot portions SL1 to SL11 shifted in the circumferential direction in FIG. 19 are returned to be at equal intervals. Thus, the core insertion step in step 3 in FIG. 9 is completed.

Figure 22:
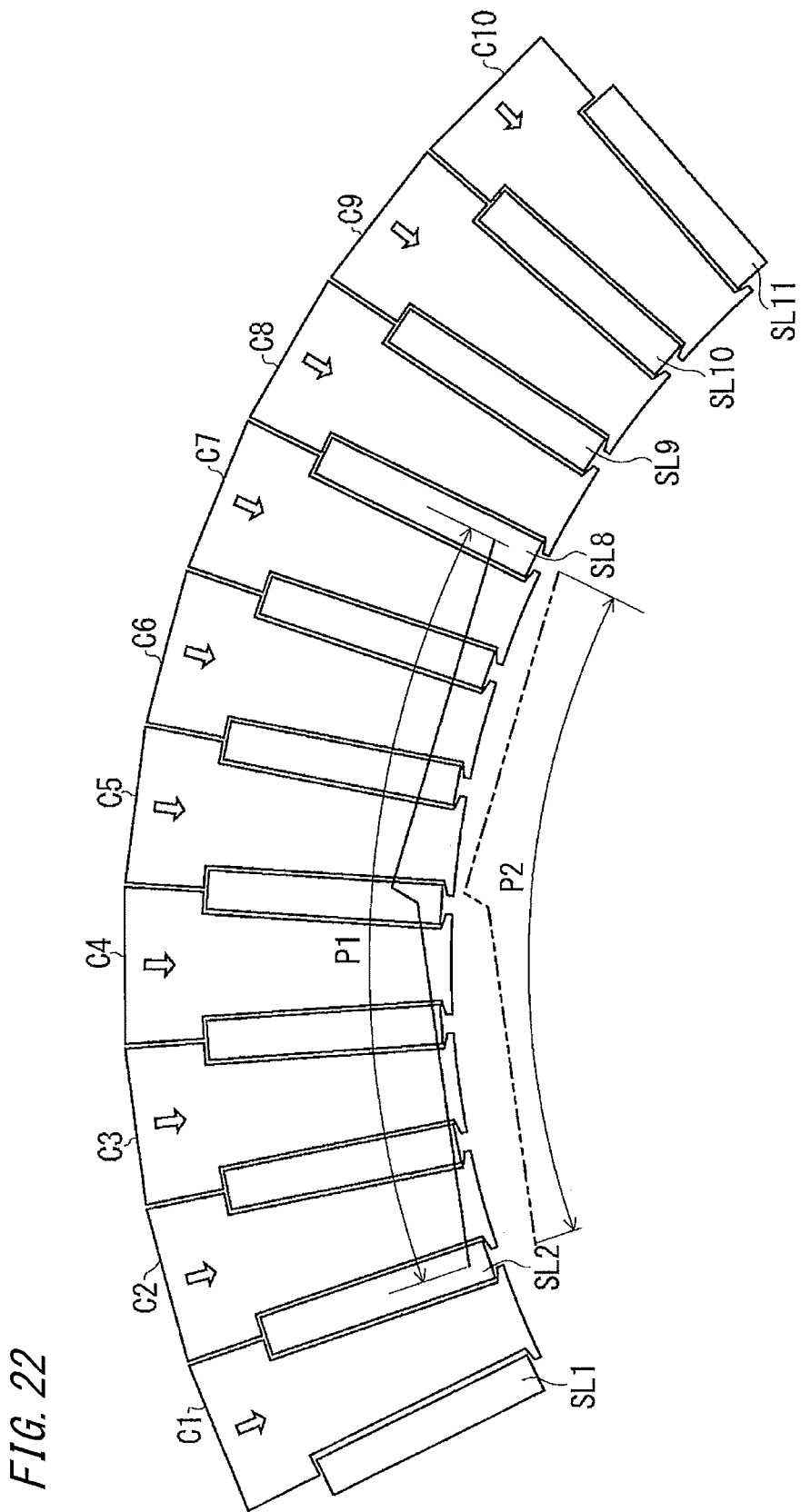
FIG. 22 is a schematic view illustrating the core insertion step according to embodiment 1 of the present invention.
Figure 23:
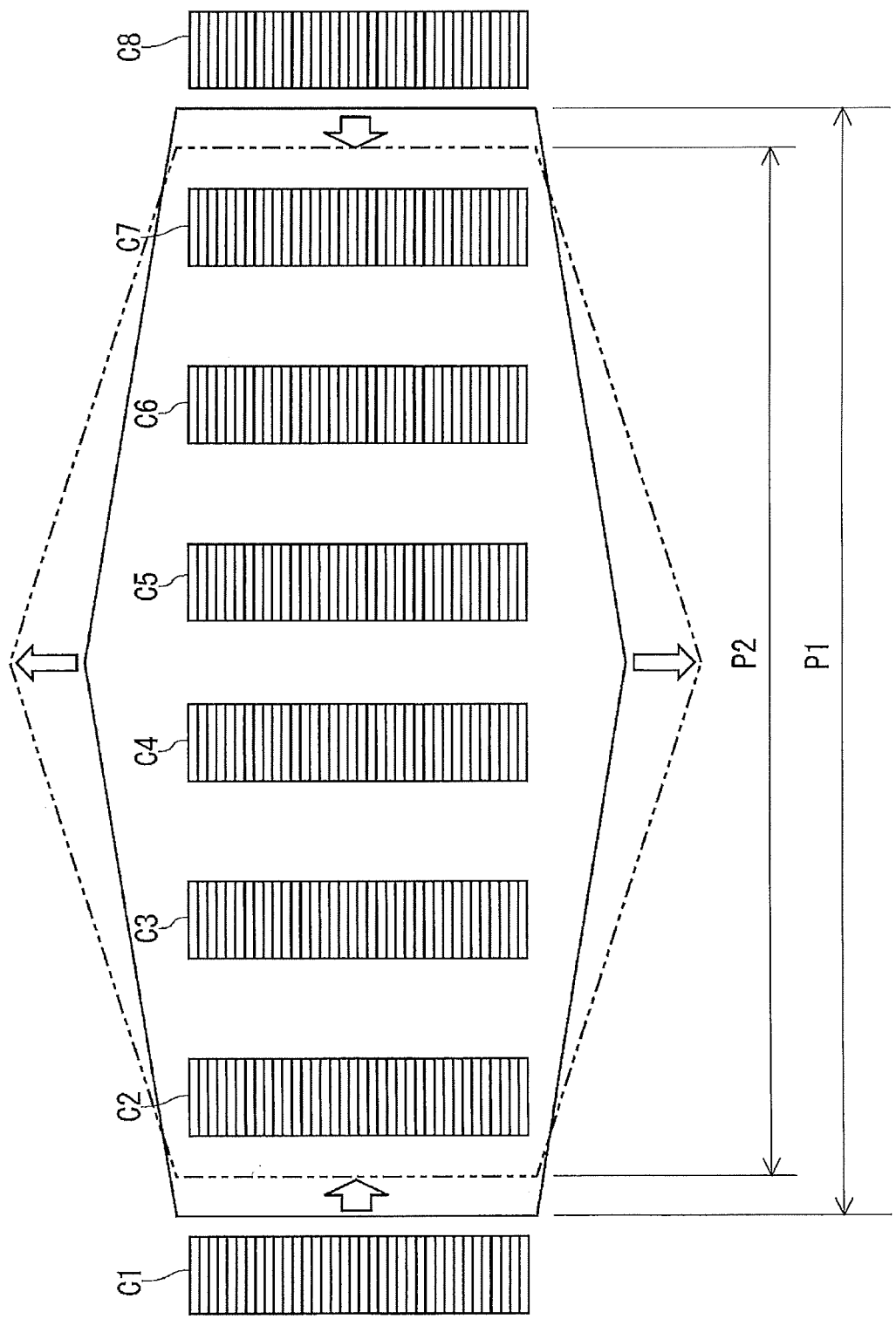
FIG. 23 is a schematic view illustrating the core insertion step according to embodiment 1 of the present invention.

Next, as shown in FIG. 22 and FIG. 23, the inner cores C1 to C10 and the slot portions SL1 to SL11 are shifted inward in the radial direction. At this time, the circumferential-direction pitch P of the turn portions connecting the slot portions SL1 to SL11 is decreased from P1 to P2. Then, the turn portions are deformed in the axial direction, whereby the radial-direction positions of the slot portions SL1 to SL11 move to the inner side.

As described above, it is preferable that the circumferential-direction pitch P1 of the turn portions after the coil unit 21 is shaped is greater than the circumferential-direction pitch P2 of the turn portions after completion of the armature.

In this case, in the core insertion step, the coil units 21 do not need to be regulated more than necessary. Thus, effects are obtained in which a force needed for regulating the coil units 21 can be reduced, the cost of the producing device for regulating the coil unit 21 can be decreased, and risk of damage to the coil coat caused by contact between the producing device and the coil unit 21 is reduced, whereby reliability is improved.

In addition, since the circumferential-direction pitch of the slot portions has been narrowed after the armature is completed, the turn portions are subjected to an elastic force in such a direction as to expand the circumferential-direction pitch, whereby the slot portions are pressed outward in the radial direction. Thus, heat resistance from the coil unit 21 to the inner core 30 is reduced, whereby an effect of improving heat dissipation is obtained. In addition, since the coil units 21 are stably shifted to only one side outward in the radial direction, the amount of a magnetic flux, occurring from the rotor 5, that passes through the coil units 21 is decreased, and eddy current loss of the coil units 21 is suppressed, whereby an effect of enhancing efficiency of the rotary electric machine is obtained.

Next, after the inner cores 30 are shifted inward in the radial direction, the outer core 40 is inserted in the axial direction, whereby the fixation member insertion step in step 4 in FIG. 9 is completed and the armature 10 can be obtained.

Here, a condition is derived which causes the circumferential-direction distance Y1b between the slot portion SL4 and the slot portion SL5 on the radially innermost side to be greater than the circumferential-direction width Y4 of the circumferential-direction protrusion portion 131 of the inner core C4. From the circumferential-direction distance Y1 between the adjacent slot portions located on the radially innermost side and the circumferential-direction width Y4 of the circumferential-direction protrusion portion 131 shown in FIG. 17, the dimensions that allow insertion of the inner cores 30 are represented by the following expression (4).

$$Y4-Y1\leq Y1b-Y1=3\times 2\times \pi \times Z/M \tag{4}$$

Here, expression (4) is arranged for the radial-direction movement amount Z, to obtain the following expression (5).

$$M\times(Y4-Y1)/(6\times \pi)\leq Z \tag{5}$$

When the radial-direction movement amount Z of each coil unit 21 satisfies expression (5), the inner core 30 can be inserted. On the other hand, in the case where the coil units 21 are expanded only in the radial direction without circumferential-direction movement of the coil units 21, the dimensions that allow insertion of the inner cores 30 are represented by the following expression (6).

$$Z\leq M\times(Y4-Y1)/(2\times \pi) \tag{6}$$

In the condition of the above expression (6), it is possible to insert the inner cores 30 by expanding the coil units 21 only in the radial direction. In this case, since circumferential-direction movement of the coil units 21 is not performed, all the inner cores 30 can be simultaneously inserted between the slot portions, and thus an effect of improving productivity is obtained.

Meanwhile, in the condition of expression (6), the radial-direction movement amount Z needs to be three times greater than in the case of expression (5). Therefore, it is desirable that the radial-direction movement amount Z of each coil unit 21 satisfies the following expression (7).

$$M \times (Y4-Y1)/(6 \times \pi) \leq Z < M \times (Y4-Y1)/(2 \times \pi) \quad (7)$$

If the radial-direction movement amount Z of each coil unit 21 satisfies the range of expression (7), the radial-direction movement amount of each coil unit 21 can be reduced to ⅓ at the minimum as compared to the case where the coil units 21 are moved only in the radial direction for insertion of the inner cores 30. Thus, when the inner cores 30 and the coil units 21 are shifted inward in the radial direction after core insertion, the amount of axial-direction deformation of the turn portions can be reduced, and thus an effect of reducing the size of the coil end is obtained. In addition, since the amount of deformation of the turn portions is small, risk of damage to the coil coat is reduced and thus an effect of improving insulation reliability is obtained.

A specific procedure of the core insertion step (step 3) in FIG. 9 will be described with reference to the flowchart in FIG. 10 and schematic views in FIG. 24A to FIG. 35B.

First, a step of shifting the slot portions at first core insertion parts in FIG. 10 in the circumferential direction (step 11) will be described.

Figure 24A:
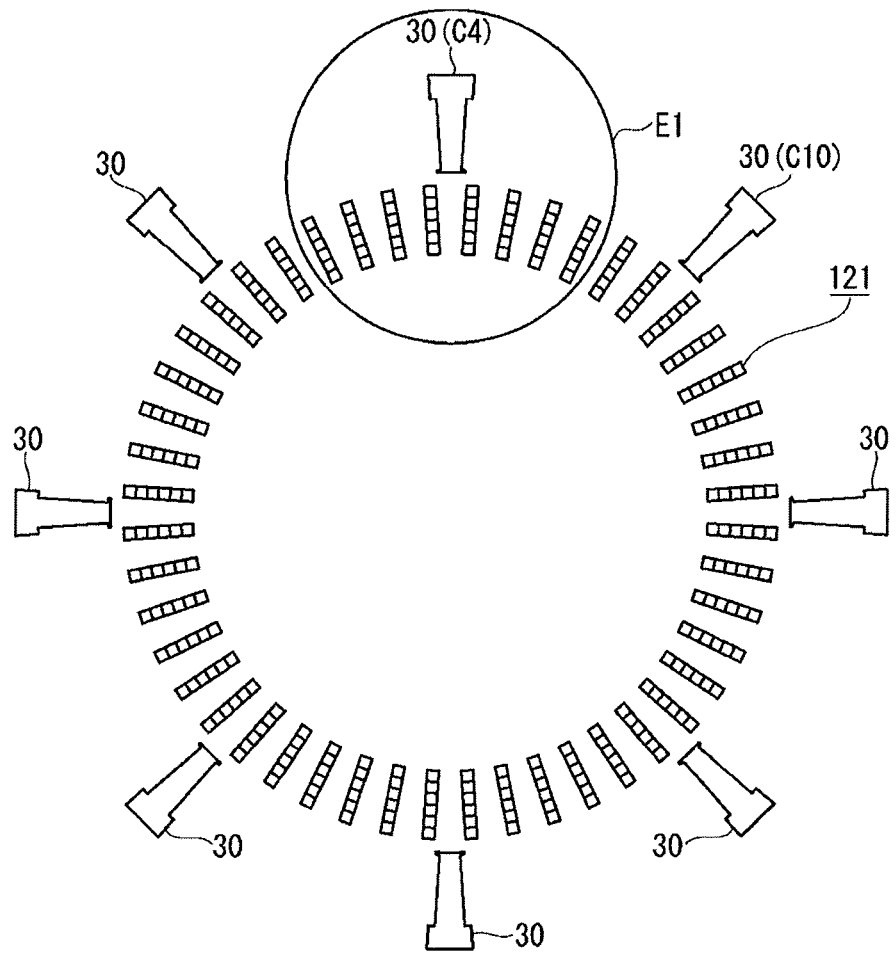
FIG. 24A is a schematic view showing the core insertion step.

First, as shown in FIG. 24A, the coil basket 121 is prepared which is assembled in a state of being shifted outward in the radial direction by the radial-direction movement amount Z from the normal radial-direction position of the coil basket to be stored in the armature core 11. Then, the inner cores 30 to be now inserted are arranged on the radially outer side of the coil basket 121. The inner cores 30 to be now inserted are the inner core C4 shown in FIG. 19 and a plurality of inner cores 30 (inner core C10, . . . ) sequentially separated by one magnetic pole pitch in the circumferential direction from the inner core C4. That is, in the present embodiment, a total of eight inner cores 30 separated from each other by one magnetic pole pitch in the circumferential direction, including the inner core C4, are simultaneously inserted between the slot portions.

Figure 24B:
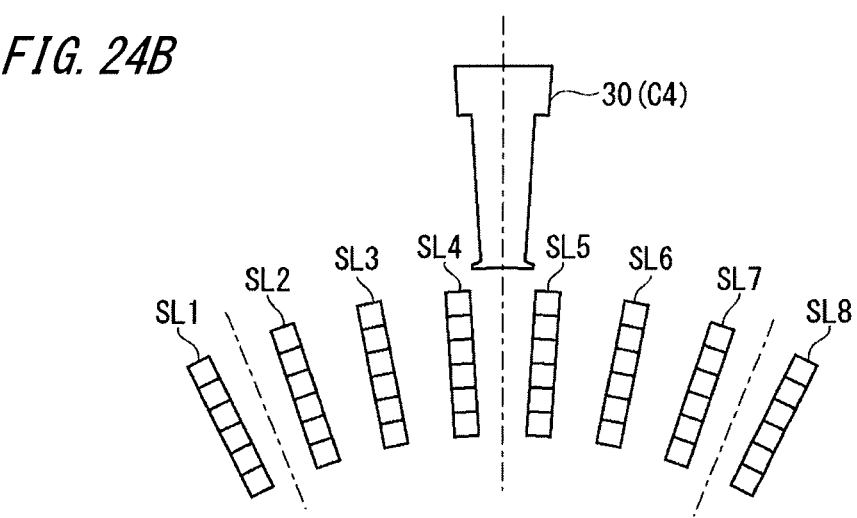
FIG. 24B is an enlarged view of part E1 of FIG. 24A, according to embodiment 1 of the present invention.

Here, as shown in FIG. 24B which is an enlarged view of part E1 in FIG. 24A, the case where, as the inner core 30, the inner core C4 shown in FIG. 19 is inserted between the slot portions SL4 and SL5 will be described. It is noted that insertion operations of the plurality of inner cores 30 (inner core C10, . . . ) sequentially separated by one magnetic pole pitch in the circumferential direction from the inner core C4 are also the same as insertion operation of the inner core C4.

Figure 25A:
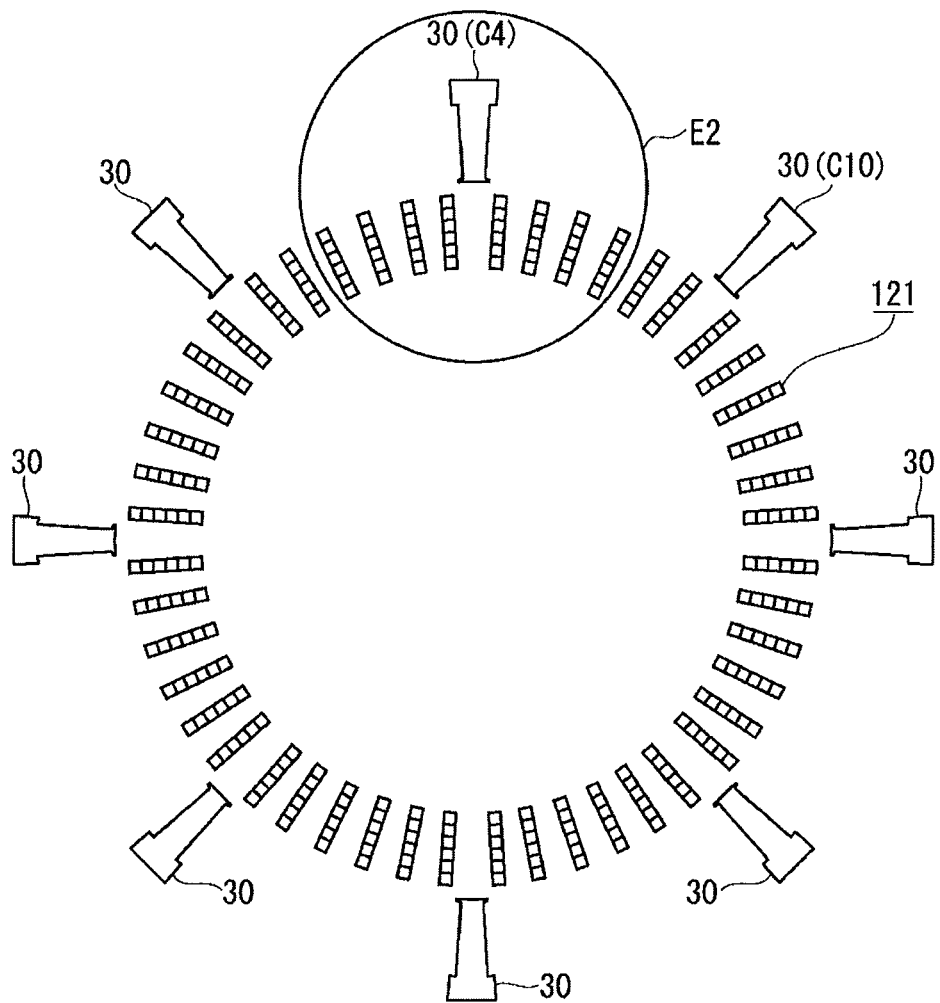
FIG. 25A is a schematic view showing the core insertion step.
Figure 25B:
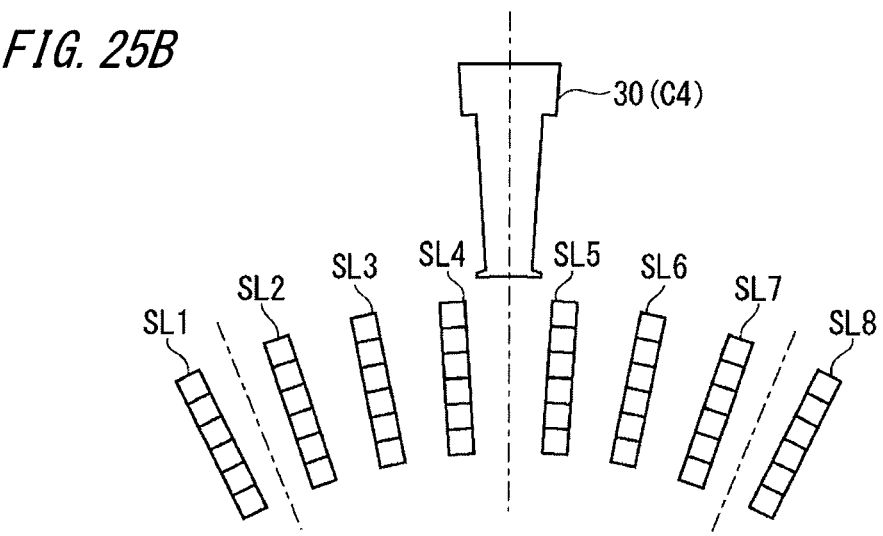
FIG. 25B is an enlarged view of part E2 of FIG. 25A, according to embodiment 1 of the present invention.

Next, as shown in FIG. 25A and FIG. 25B which is an enlarged view of part E2 in FIG. 25A, the slot portions SL4 and SL5 at the insertion target position for the inner core 30 (C4) are moved to be separated in the circumferential direction.

Figure 26:
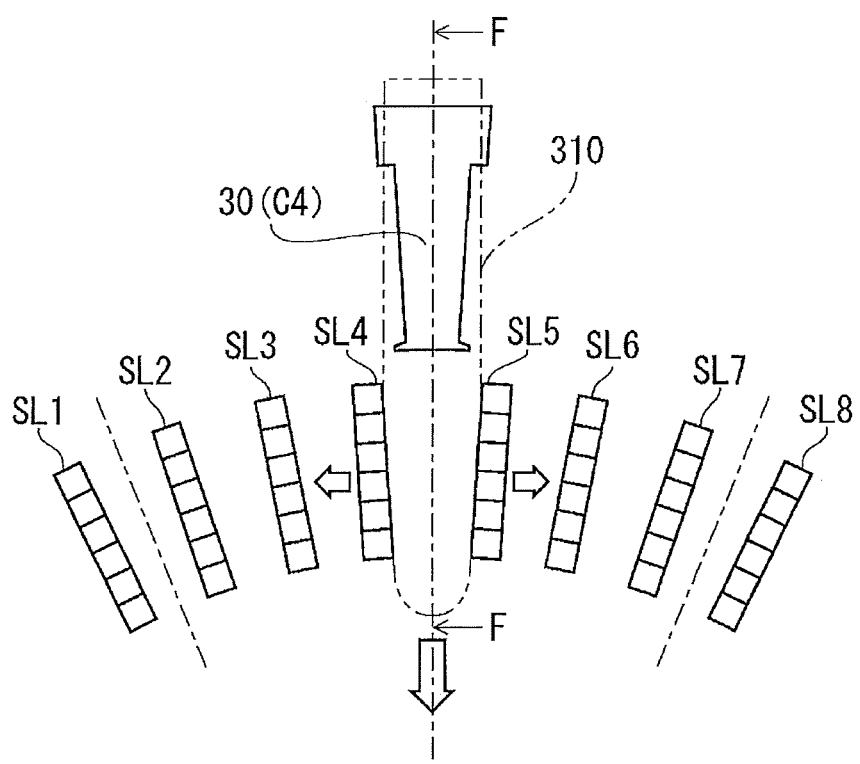
FIG. 26 is a schematic view showing a movement member used in the core insertion step according to embodiment 1 of the present invention.

In this case, as shown in FIG. 26, from the radially outer side, a movement member 310 is inserted between the slot portions SL4 and SL5 which are core insertion target portions, whereby the slot portions SL4 and SL5 are moved to be separated in the circumferential direction. The movement member 310 has such a wedge shape that the circumferential-direction width spreads toward the radially outer side.

Figure 27:
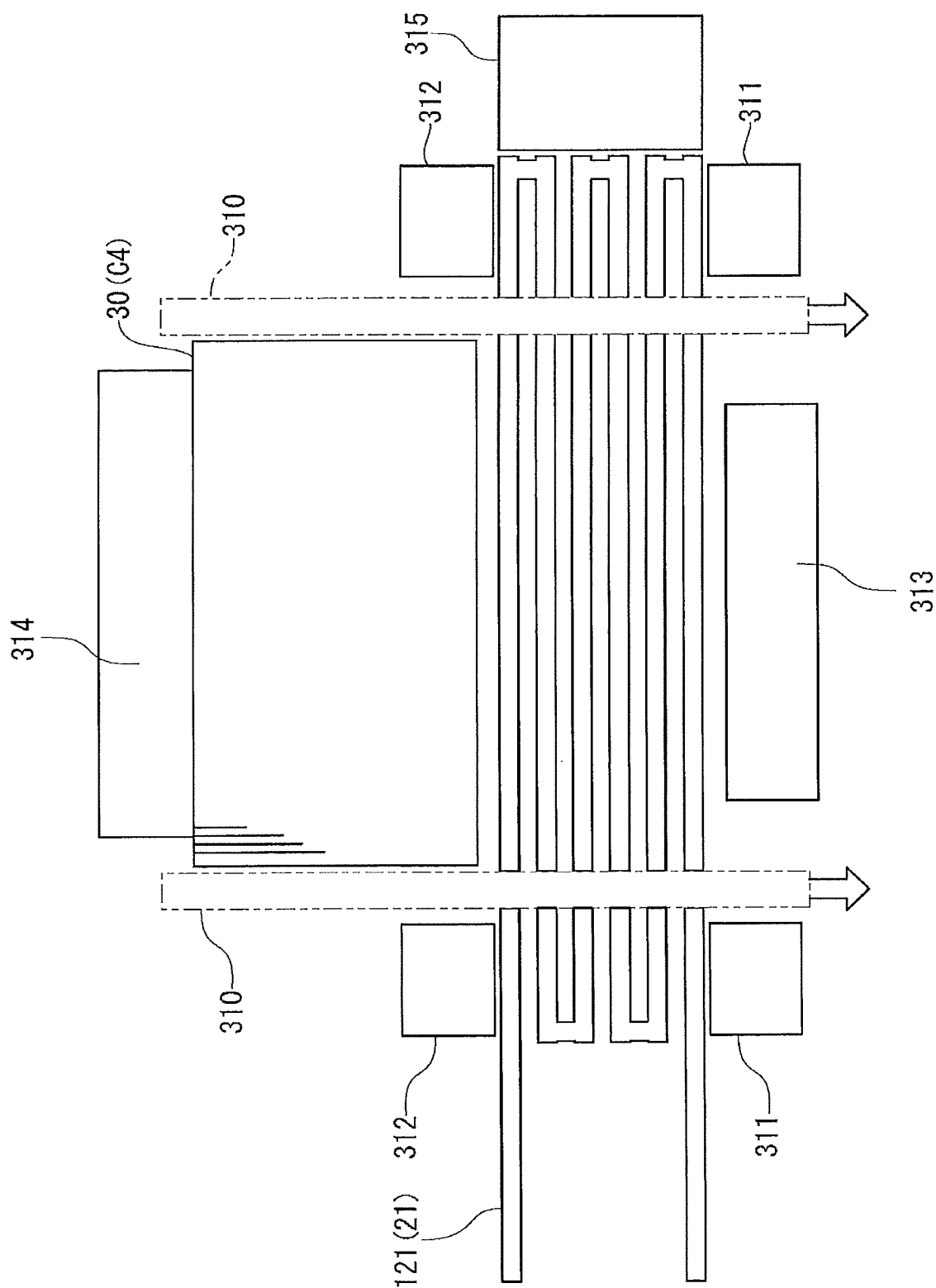
FIG. 27 is a schematic view showing an armature producing device used in the core insertion step according to embodiment 1 of the present invention.

FIG. 27 shows an armature producing device used in the core insertion step and is a schematic sectional view thereof as seen from F-F direction in FIG. 26. In FIG. 27, the wedge-shaped movement members 310 are arranged on both ends in the axial direction of the inner core 30 (C4), and are inserted between the slot portions SL4 and SL6 before the inner core 30 (C4) is inserted. The wedge-shaped movement members 310 are inserted and the slot portions SL4 and SL5 are moved to be separated in the circumferential direction, whereby a space for inserting the inner core 30 (C4), can be ensured to be obtained.

The armature producing device in FIG. 27 is provided with a coil inner-side regulating member 311 and a coil outer-side regulating member 312 that regulate the radially inner side and the radially outer side of the turn portions of the coil units 21, in order to regulate the radial-direction position of the coil basket 121. In claims, the coil inner-side regulating member 311 and the coil outer-side regulating member 312 are referred to as coil radial-direction position regulating member. In addition, a core inserting member 314 for moving the inner core 30 (C4) inward in the radial direction, and a core inner-side regulating member 313 for regulating the radially-inner-side position of the inner core 30 (C4), are provided. Further, a coil axial-direction position regulating member 315 for regulating the axial-direction position of the coil basket 121 is provided.

Next, a step of inserting the inner cores into the first core insertion parts in FIG. 10 in the radial direction (step 12) will be described.

Figure 28:
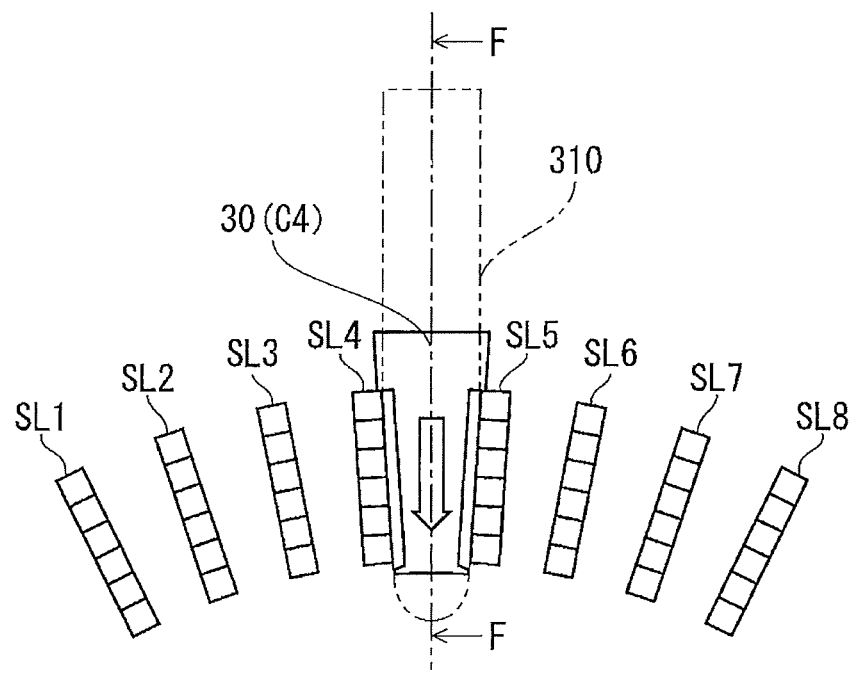
FIG. 28 is a schematic view showing the movement member used in the core insertion step according to embodiment 1 of the present invention.
Figure 29:
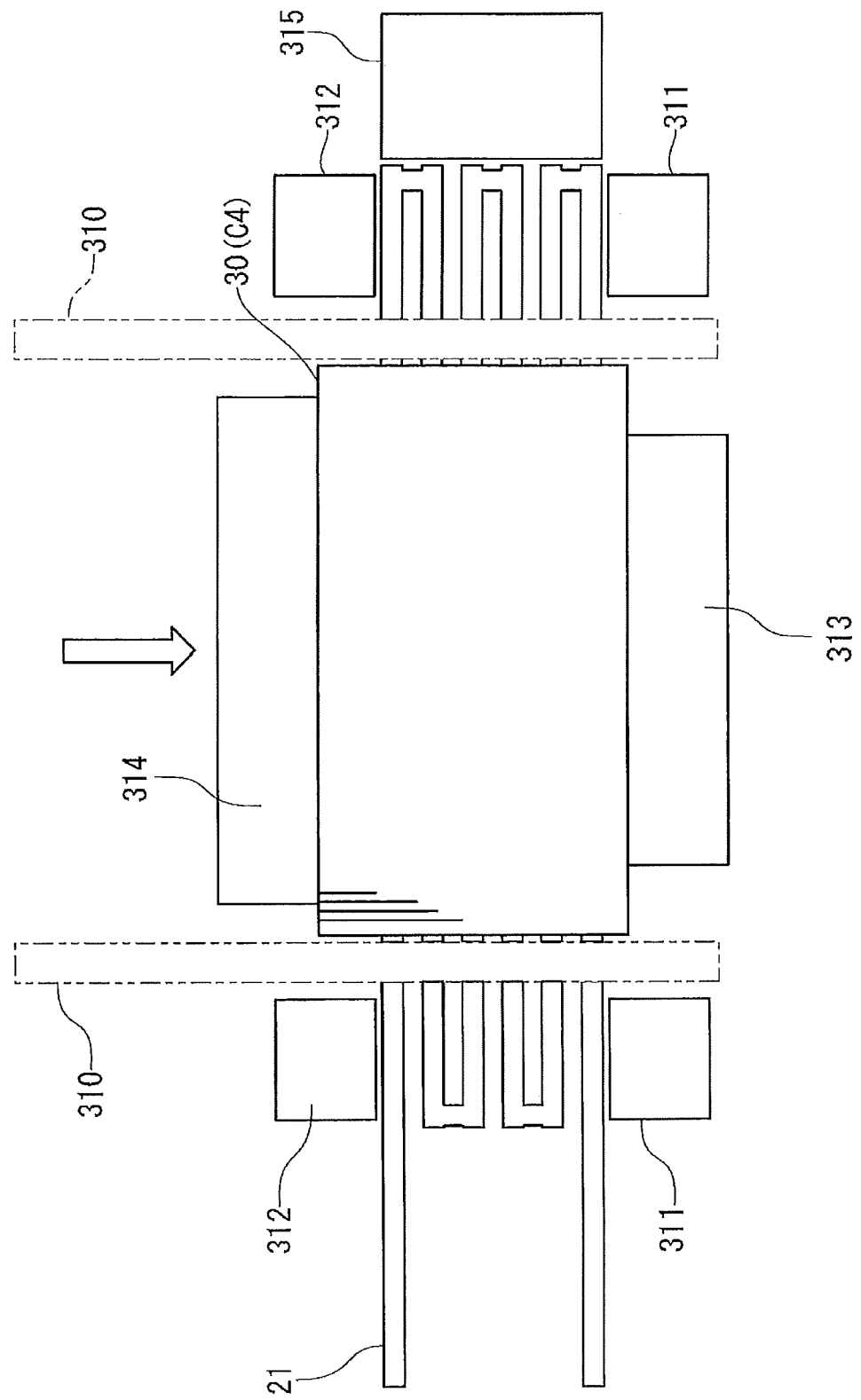
FIG. 29 is a schematic view showing the armature producing device used in the core insertion step according to embodiment 1 of the present invention.

FIG. 28 is a schematic view showing a state in which the inner core is inserted using the wedge-shaped movement member, and FIG. 29 is a schematic sectional view of the armature producing device used in the core insertion step, as seen from F-F direction in FIG. 28.

As shown in FIG. 28 and FIG. 29, in a state in which the wedge-shaped movement members 310 are inserted between the slot portions SL4 and SL5, the inner core 30 (C4) is moved inward in the radial direction by the core inserting member 314 so as to be inserted between the slot portions SL4 and SL5. Then, the inner core 30 (C4) is inserted to reach the core inner-side regulating member 313, whereby the step for inserting the inner core 30 (C4) is completed. At this time, it is desirable that the turn portions of the coil units 21 are regulated by the coil inner-side regulating members 311 and the coil outer-side regulating members 312, in order to regulate the radial-direction positions of the slot portions SL4, SL5. By inserting the inner core 30 (C4) in the radial direction in such a coil regulated state, the radial-direction positions of the slot portion SL4, SL5 and the inner core 30 (C4) relative to each other can be reliably retained, and the circumferential-direction protrusion portion 131 at the tooth portion end can be reliably inserted to a position radially inward of the radially-innermost slot portion S1. Thus, reliability of insertion of the inner core 30 (C4) increases, whereby an effect of improving productivity is obtained.

Figure 30A:
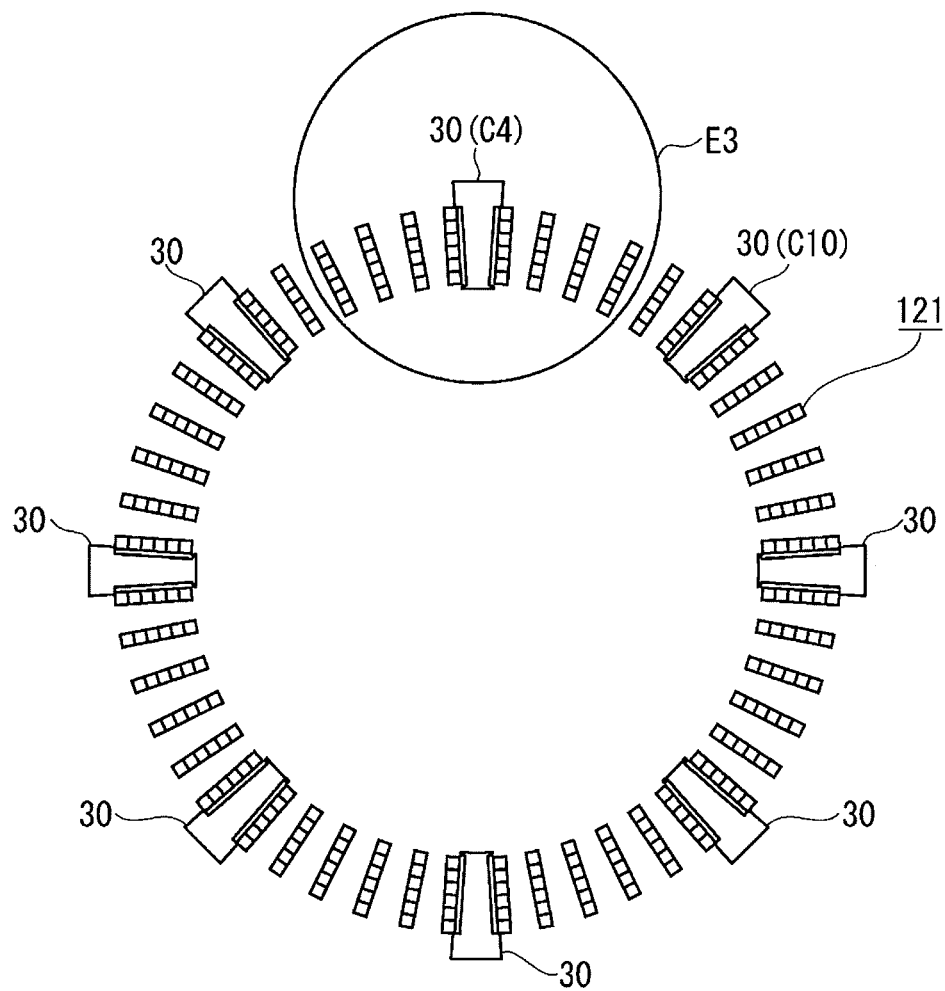
FIG. 30A is a schematic view showing the core insertion step.
Figure 30B:
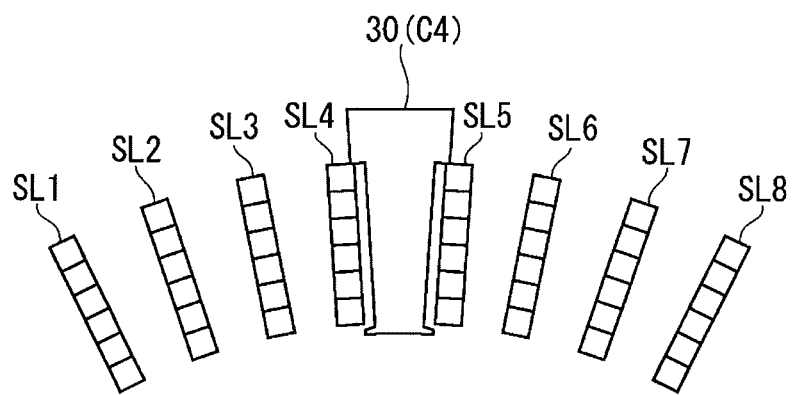
FIG. 30B is an enlarged view of part E3 of FIG. 30A, according to embodiment 1 of the present invention.
Figure 31A:
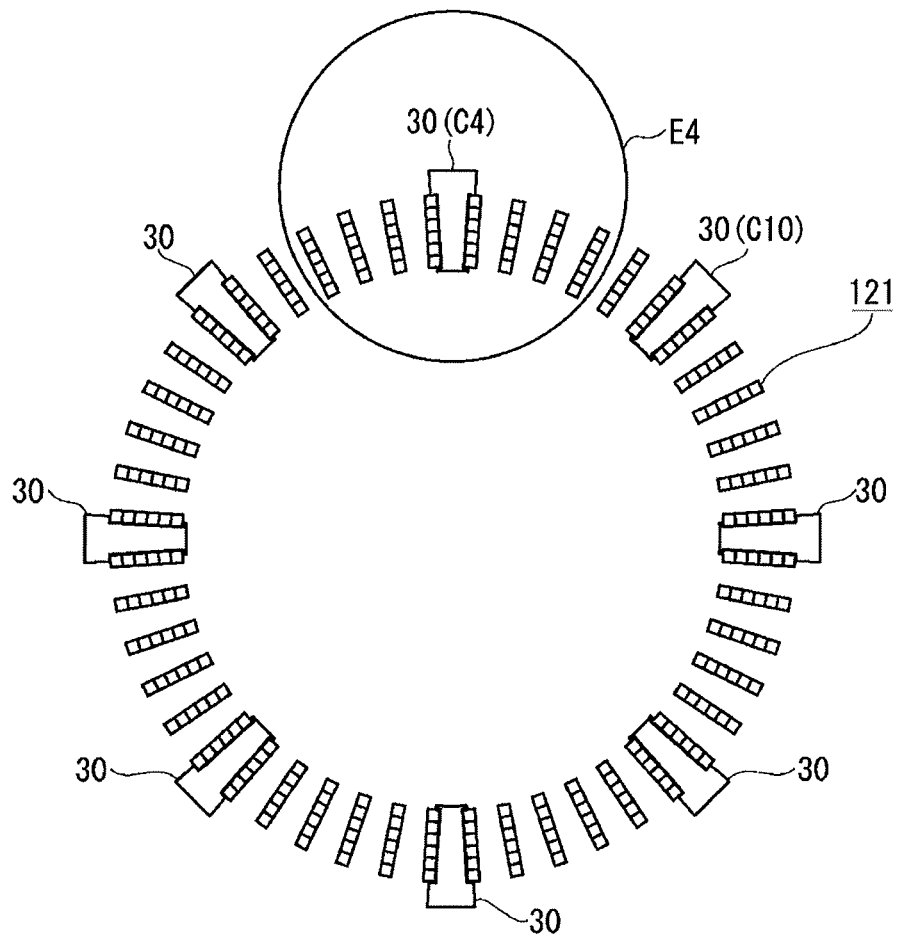
FIG. 31A is a schematic view showing the core insertion step.
Figure 31B:
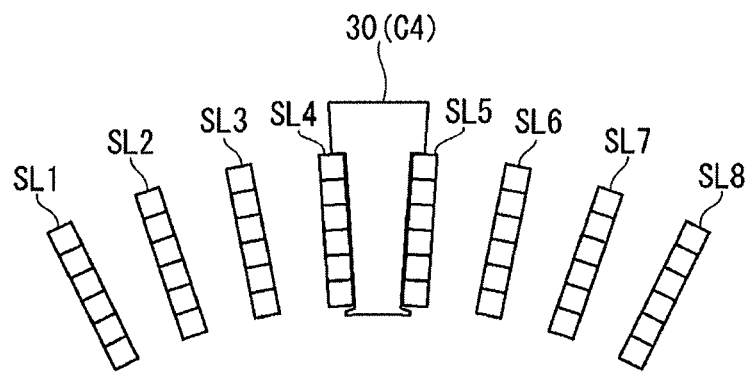
FIG. 31B is an enlarged view of part E4 of FIG. 31A, according to embodiment 1 of the present invention.

FIG. 30A and FIG. 30B which is an enlarged view of part E3 in FIG. 30A show a state in which the wedge-shaped movement members 310 are inserted between the slot portions SL4 and SL5 and insertion of the inner core 30 (C4) between the slot portions SL4 and SL5 is completed. FIG. 31A and FIG. 31B which is an enlarged view of part E4 in FIG. 31A show a state in which the wedge-shaped movement members 310 are extracted from between the slot portions SL4 and SL5 after insertion of the inner core 30 (C4) is completed. As shown in FIG. 31A and FIG. 31B, when the wedge-shaped movement members 310 are extracted from between the slot portions SL4 and SL5, the slot portions SL4 and SL5 are moved in the circumferential direction toward the inner core 30 (C4), so that the slot portions return to their original circumferential-direction positions so as to be arranged at equal pitches. At this point of time, the step of inserting the inner cores into the first core insertion parts in FIG. 10 (step 12) is completed.

Next, a step of shifting the slot portions at second core insertion parts in FIG. 10 in the circumferential direction (step 21) will be described.

Figure 32A:
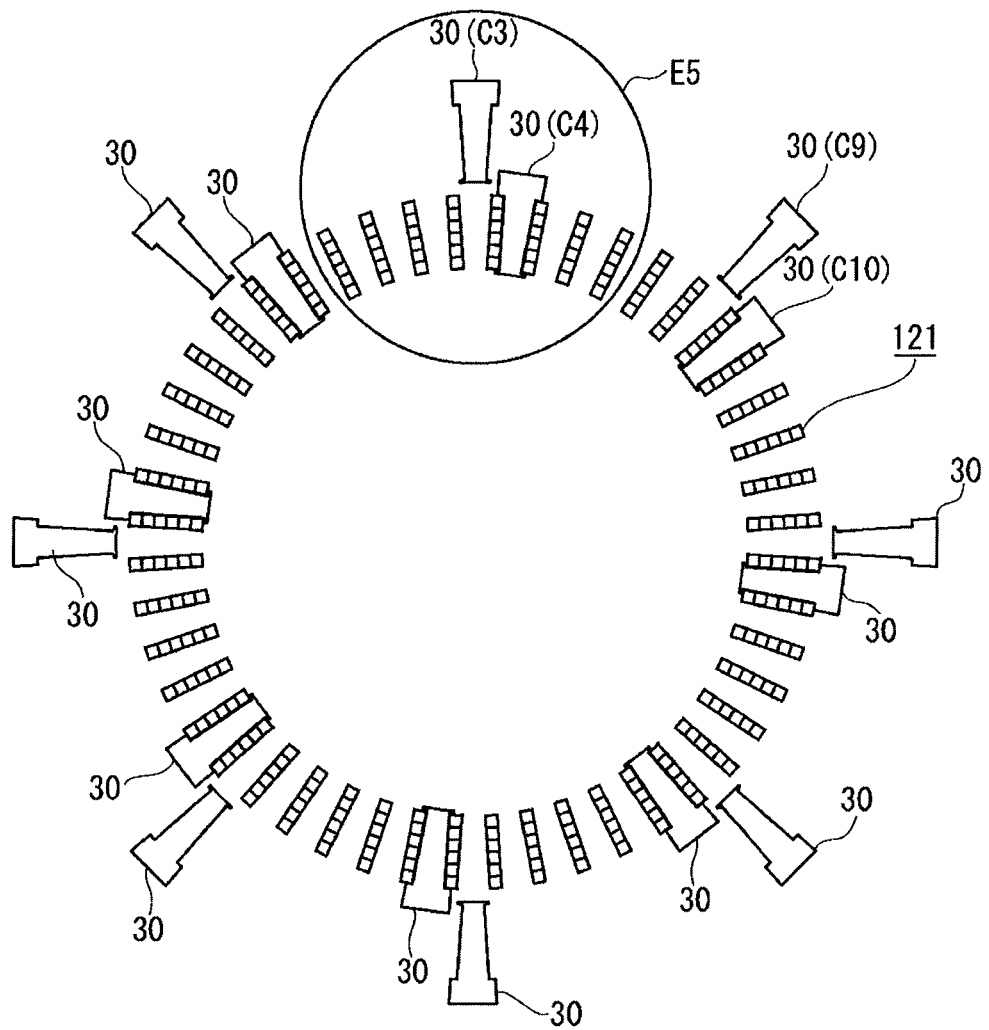
FIG. 32A is a schematic view showing the core insertion step.
Figure 32B:
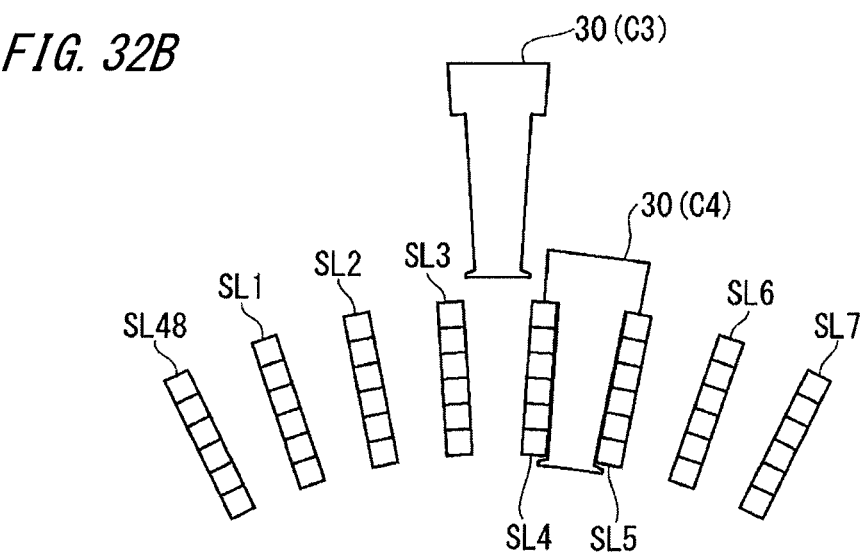
FIG. 32B is an enlarged view of part E5 of FIG. 32A, according to embodiment 1 of the present invention.

As shown in FIG. 32A and FIG. 32B which is an enlarged view of part E5 in FIG. 32A, the inner cores 30 to be now inserted are arranged on the radially outer side of the coil basket 121. The inner cores 30 to be now inserted are the inner core C3 shown in FIG. 19 and a plurality of inner cores 30 (inner core C9, . . . ) sequentially separated by one magnetic pole pitch in the circumferential direction from the inner core C3.

Figure 33A:
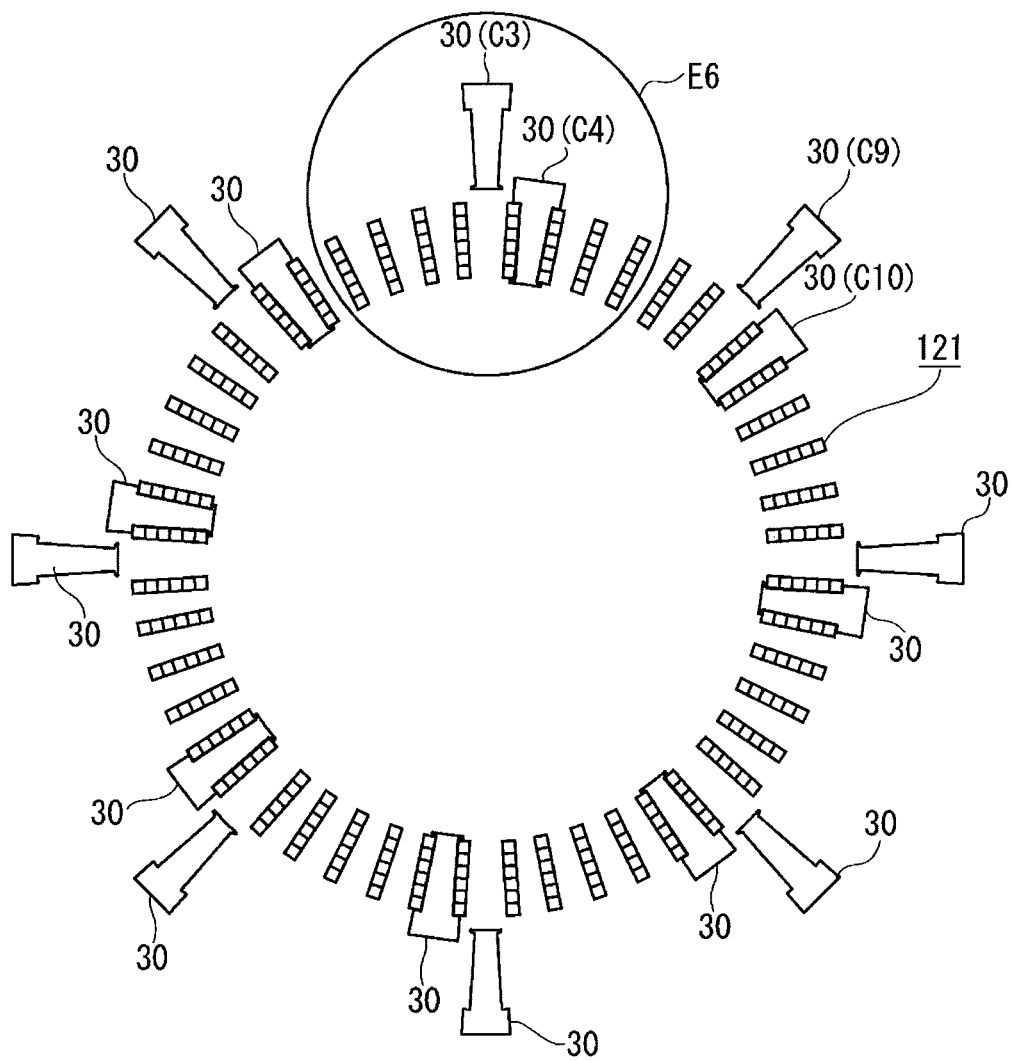
FIG. 33A is a schematic view showing the core insertion step.
Figure 33B:
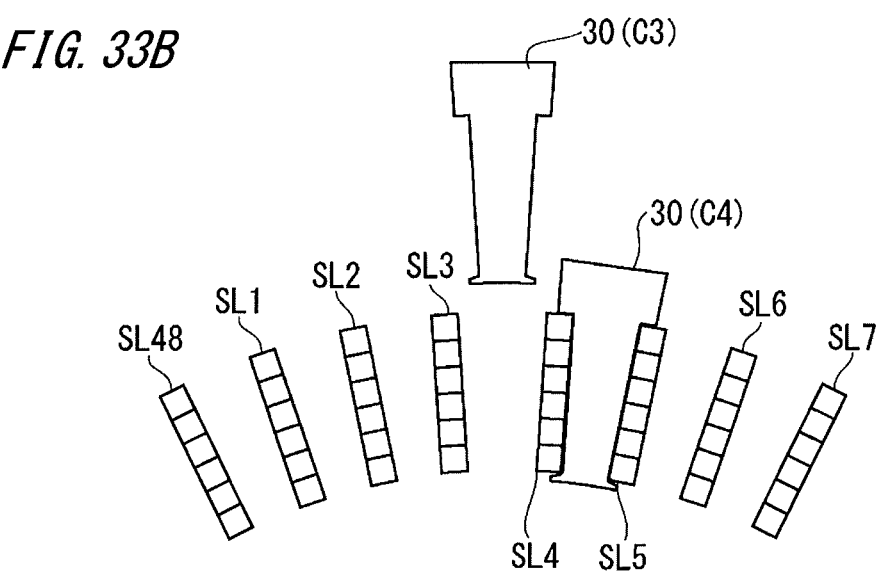
FIG. 33B is an enlarged view of part E6 of FIG. 33A, according to embodiment 1 of the present invention.

Next, as shown in FIG. 33A and FIG. 33B which is an enlarged view of part E6 in FIG. 33A, the slot portions SL3 and SL4 at the insertion target position for the inner core 30 (C3) are moved to be separated in the circumferential direction.

In this case, as in the case of FIG. 26, from the radially outer side, the wedge-shaped movement members 310 are inserted between the slot portions SL3 and SL4 which are core insertion target portions, whereby the slot portions SL3 and SL4 are moved to be separated in the circumferential direction.

Next, a step of inserting the inner cores into the second core insertion parts in FIG. 10 in the radial direction (step 22) will be described.

Figure 34A:
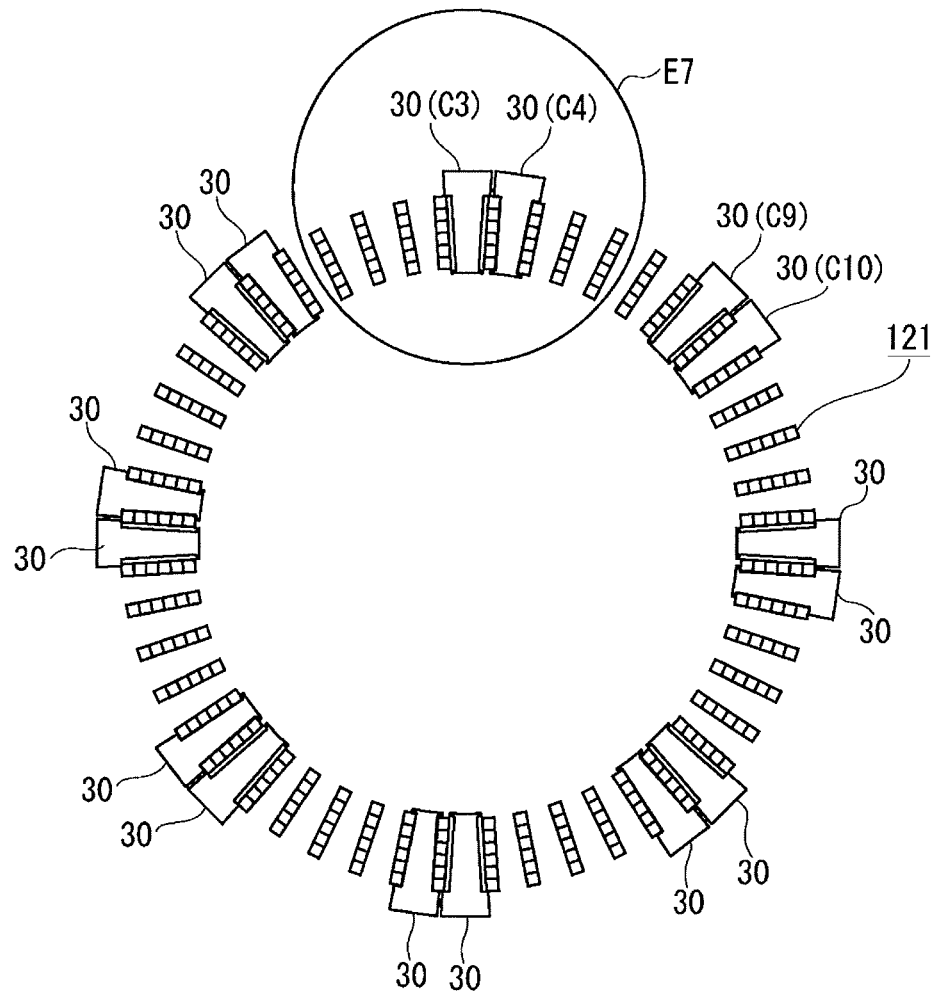
FIG. 34A is a schematic view showing the core insertion step.
Figure 34B:
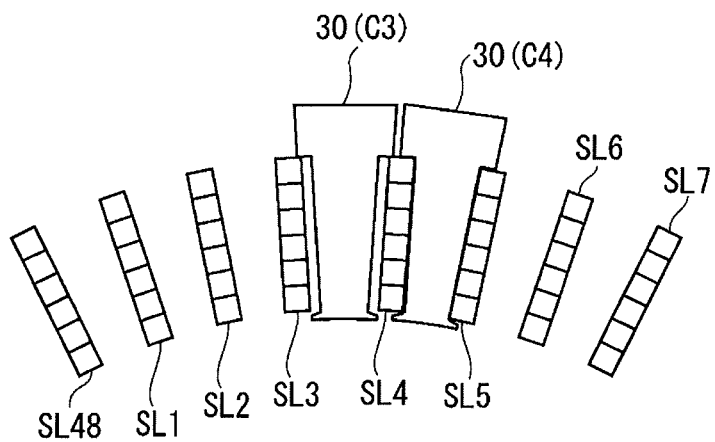
FIG. 34B is an enlarged view of part E7 of FIG. 34A, according to embodiment 1 of the present invention.

As shown in FIG. 34A and FIG. 34B which is an enlarged view of part E7 in FIG. 34A, in a state in which the wedge-shaped movement members 310 are inserted between the slot portions SL3 and SL4, the inner core 30 (C3) is moved inward in the radial direction by the core inserting member 314 so as to be inserted between the slot portions SL3 and SL4.

Figure 35A:
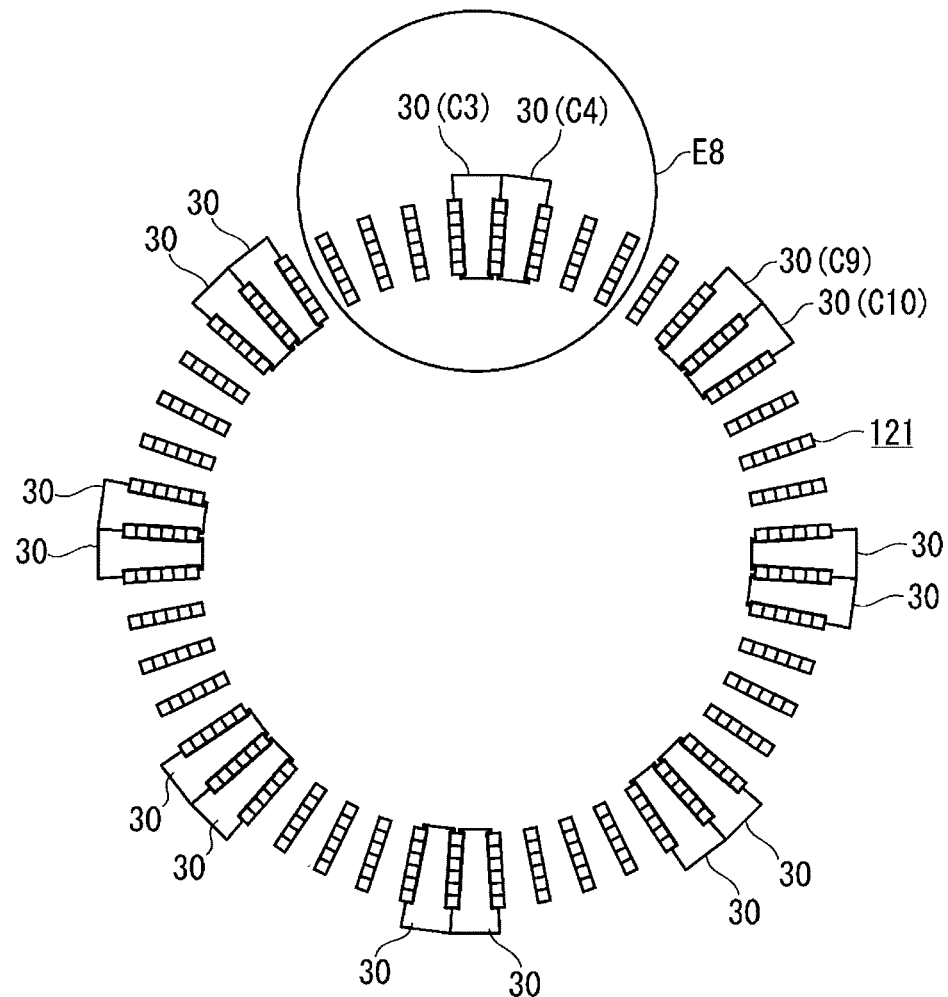
FIG. 35A is a schematic view showing the core insertion step.
Figure 35B:
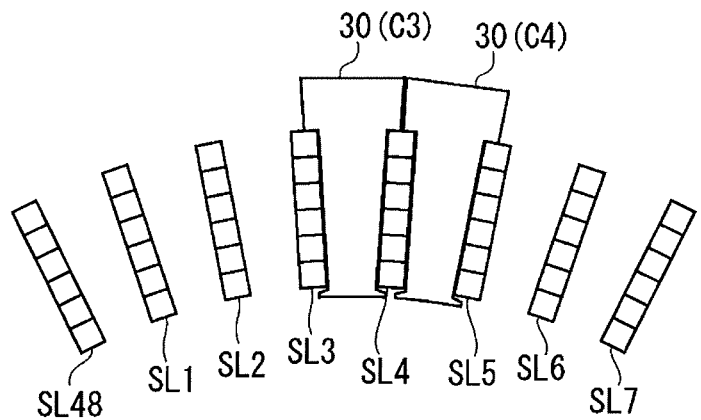
FIG. 35B is an enlarged view of part E8 of FIG. 35A, according to embodiment 1 of the present invention.

As shown in FIG. 35A and FIG. 35B which is an enlarged view of part E8 in FIG. 35A, when the wedge-shaped movement members 310 are extracted from between the slot portions SL3 and SL4 after insertion of the inner core 30 (C3) is completed, the slot portions SL3 and SL4 are moved in the circumferential direction toward the inner core 30 (C3), so that the slot portions return to their original circumferential-direction positions so as to be arranged at equal pitches. At this point of time, the step of inserting the inner cores into the second core insertion parts in FIG. 10 (step 22) is completed.

The above core insertion steps are repeated to reach the final steps (step N1, step N2) in the core insertion step in FIG. 10.

A step of shifting the slot portions at N-th core insertion parts in FIG. 10 in the circumferential direction (step N1) will be described. In the present embodiment, N is 6.

Figure 36A:
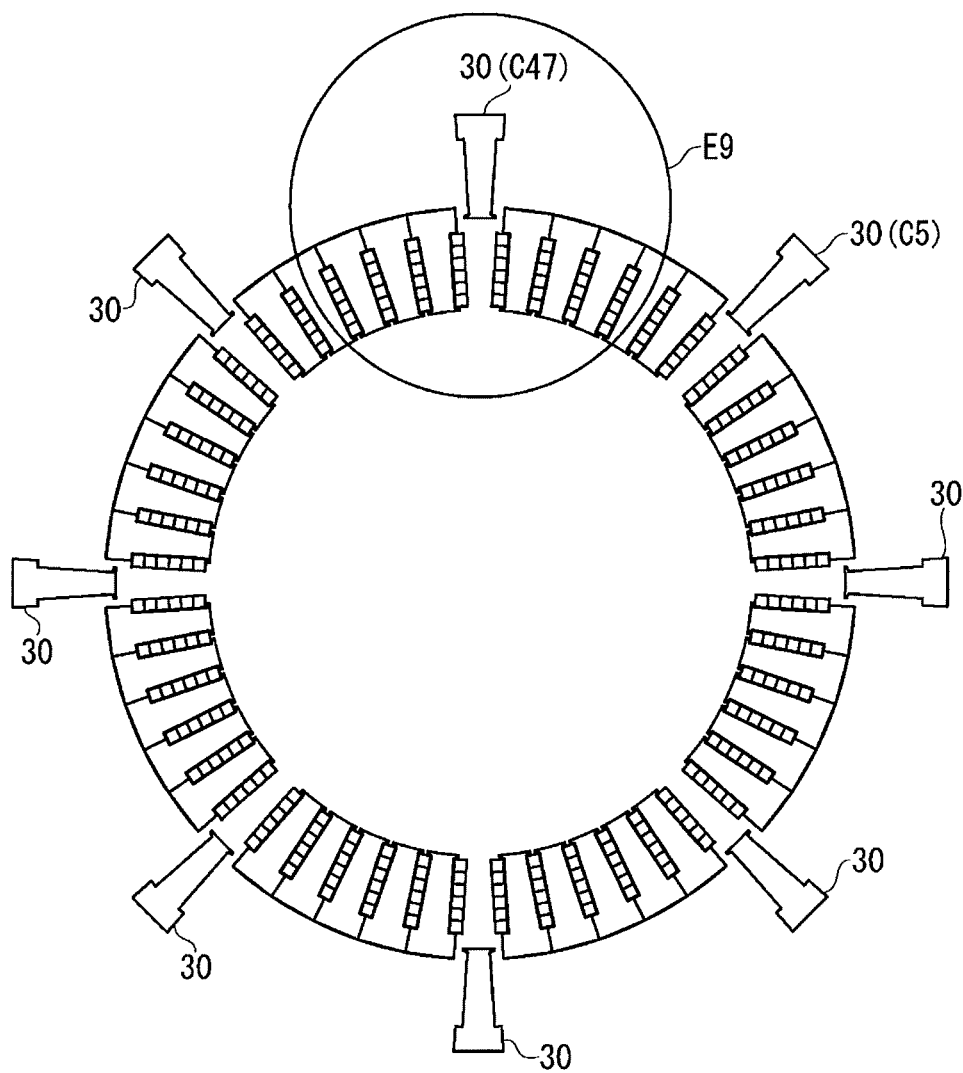
FIG. 36A is a schematic view showing the core insertion step.
Figure 36B:
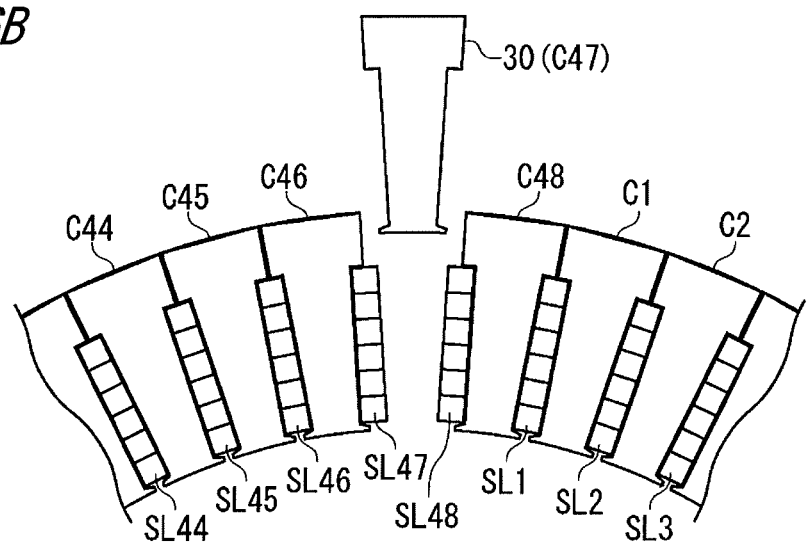
FIG. 36B is an enlarged view of part E9 of FIG. 36A, according to embodiment 1 of the present invention.

As shown in FIG. 36A and FIG. 36B which is an enlarged view of part E9 in FIG. 36A, the inner cores 30 to be now inserted are arranged on the radially outer side of the coil basket 121. The inner cores 30 to be now inserted are the inner core C47 and a plurality of inner cores 30 (inner core C5, . . . ) sequentially separated by one magnetic pole pitch in the circumferential direction from the inner core C47.

Figure 37A:
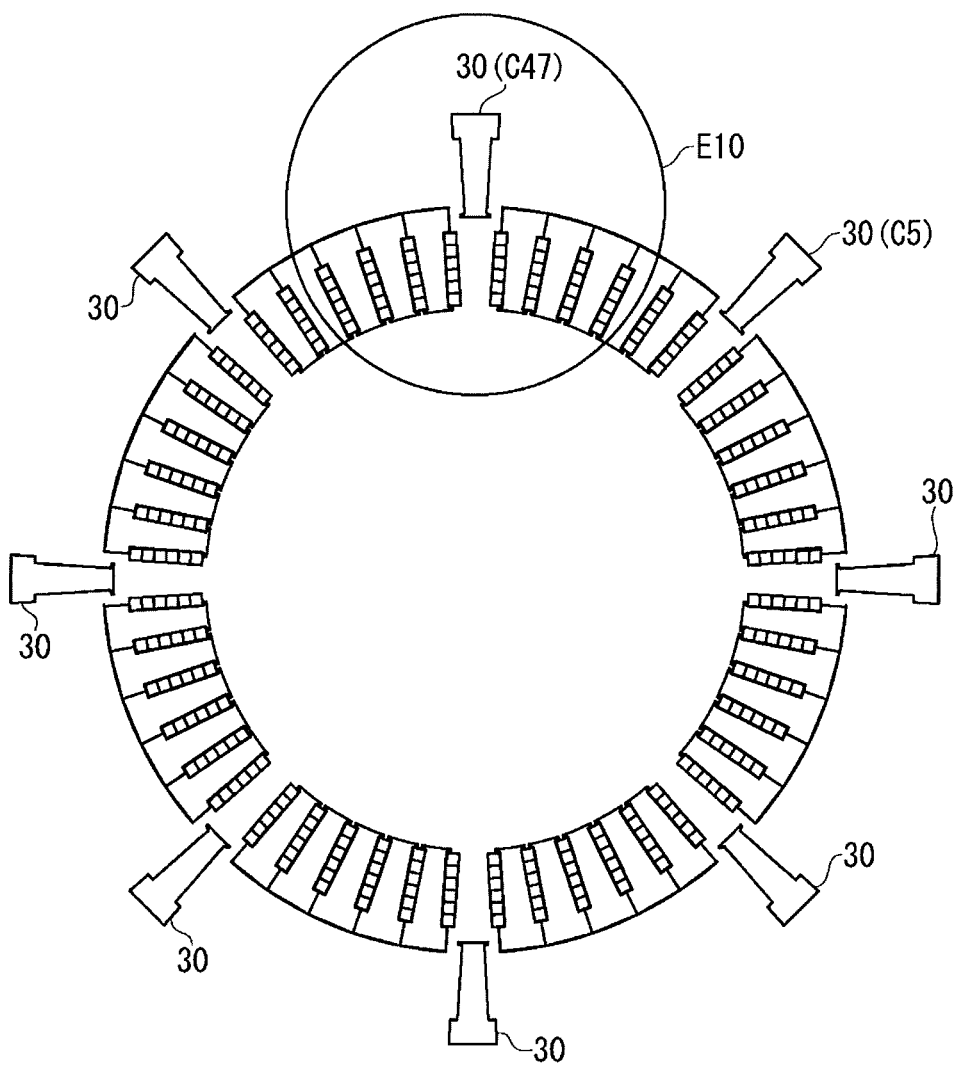
FIG. 37A is a schematic view showing the core insertion step.
Figure 37B:
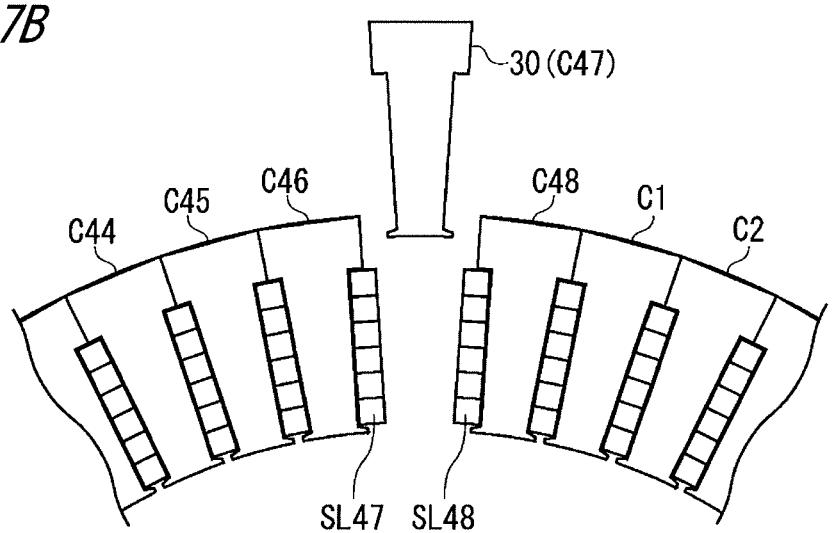
FIG. 37B is an enlarged view of part E10 of FIG. 37A, according to embodiment 1 of the present invention.

Next, as shown in FIG. 37A and FIG. 37B which is an enlarged view of part E10 in FIG. 37A, the slot portions SL47 and SL48 at the insertion target position for the inner core 30 (C47) are moved to be separated in the circumferential direction.

In this case, as in the case of FIG. 26, from the radially outer side, the wedge-shaped movement members 310 are inserted between the slot portions SL47 and SL48 which are core insertion target portions, whereby the slot portions SL47 and SL48 are moved to be separated in the circumferential direction.

Next, a step of inserting the inner cores into the N-th core insertion parts in FIG. 10 in the radial direction (step N2) will be described.

Figure 38A:
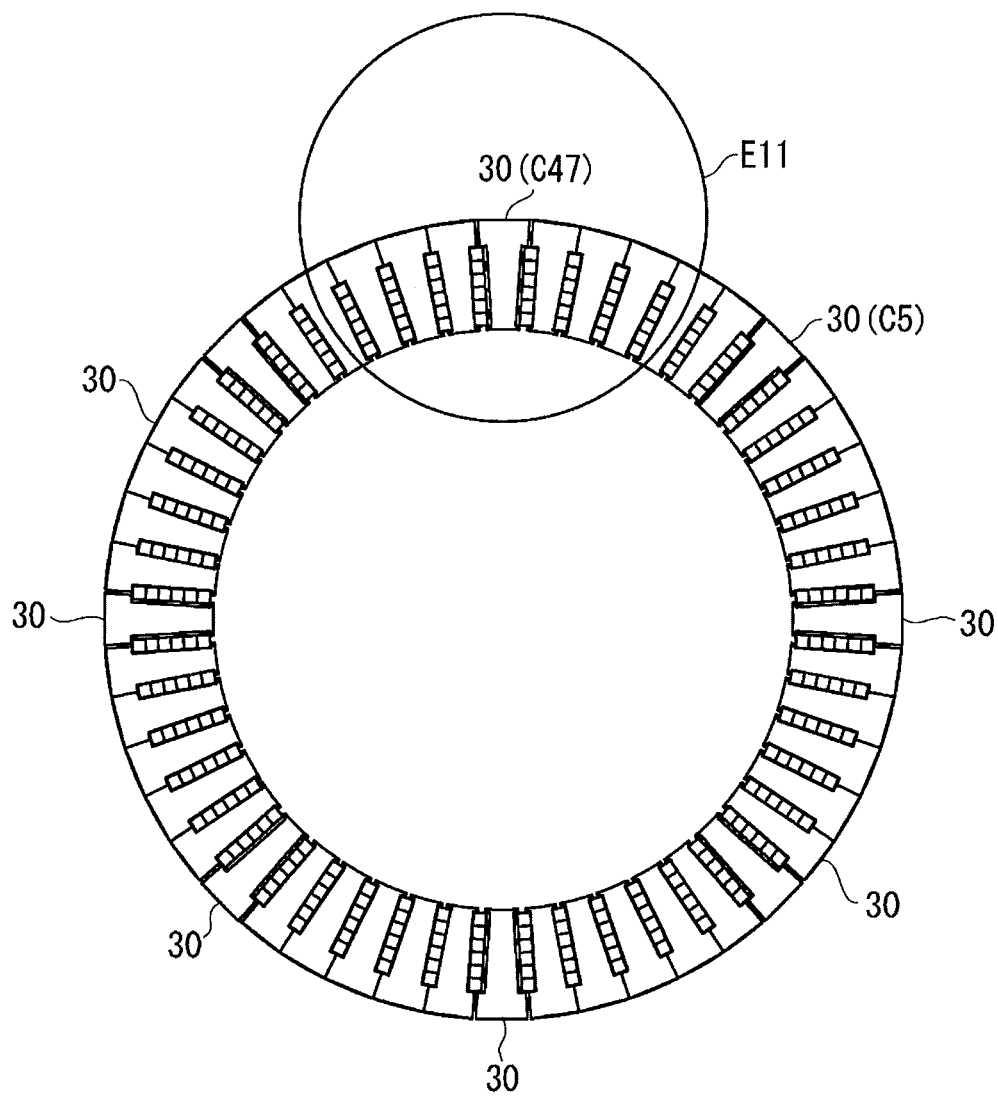
FIG. 38A is a schematic view showing the core insertion step.
Figure 38B:
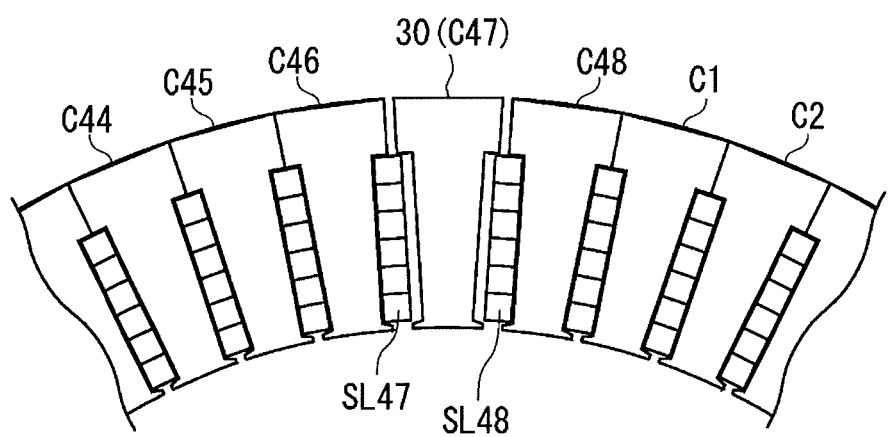
FIG. 38B is an enlarged view of part E11 of FIG. 38A, according to embodiment 1 of the present invention.

As shown in FIG. 38A and FIG. 38B which is an enlarged view of part E11 in FIG. 38A, in a state in which the wedge-shaped movement members 310 are inserted between the slot portions SL47 and SL48, the inner core 30 (C47) is moved inward in the radial direction by the core inserting member 314 so as to be inserted between the slot portions SL47 and SL48.

Figure 39A:
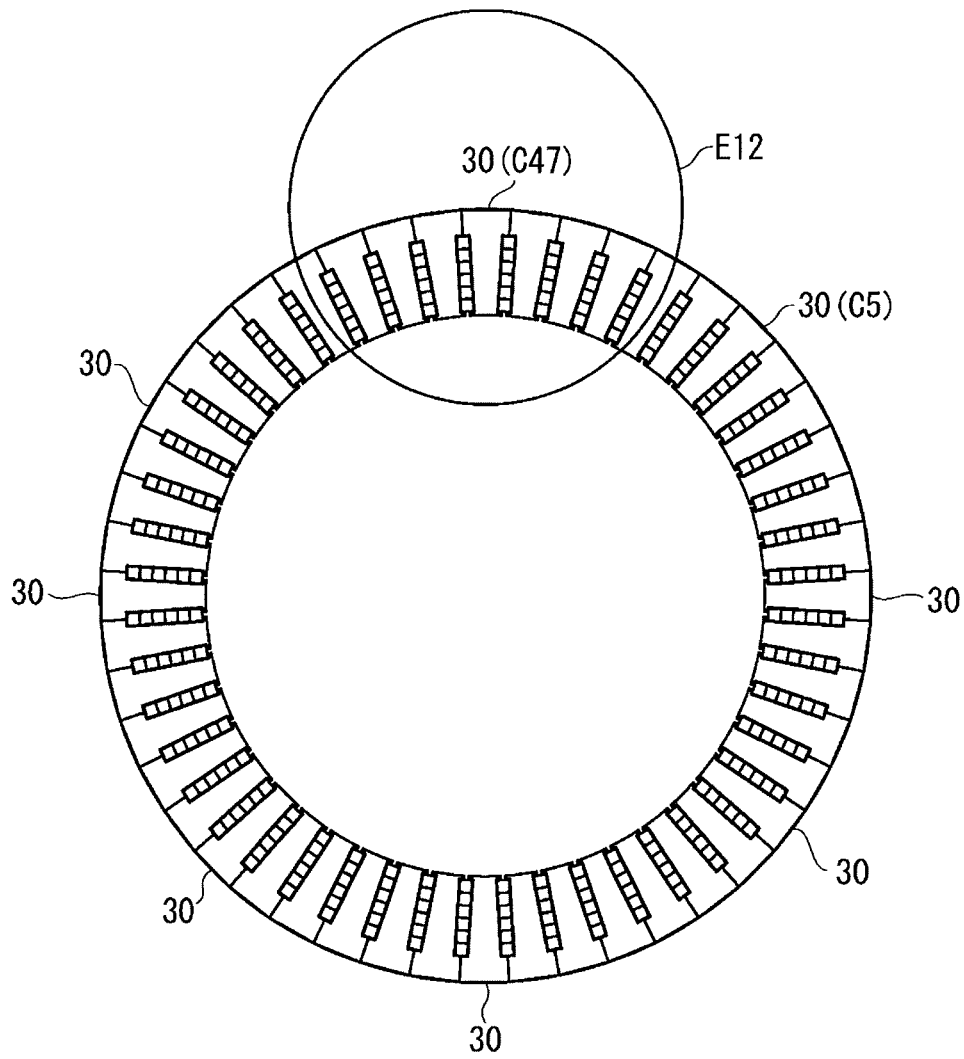
FIG. 39A is a schematic view showing the core insertion step.
Figure 39B:
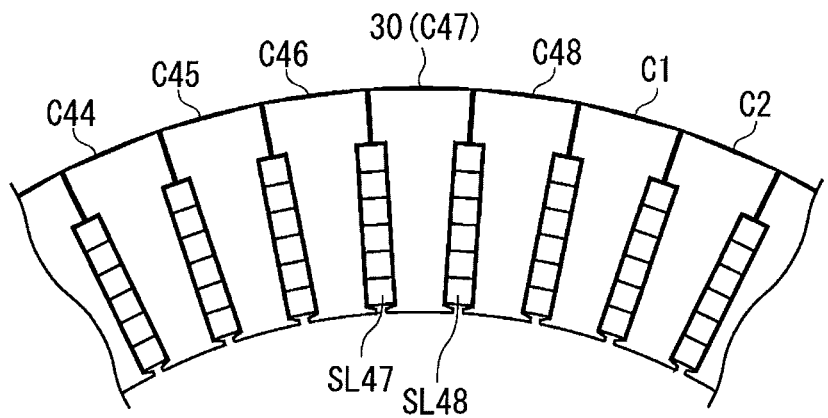
FIG. 39B is an enlarged view of part E12 of FIG. 39A, according to embodiment 1 of the present invention.

As shown in FIG. 39A and FIG. 39B which is an enlarged view of part E12 in FIG. 39A, when the wedge-shaped movement members 310 are extracted from between the slot portions SL47 and SL48 after insertion of the inner core 30 (C47) is completed, the slot portions SL47 and SL48 are moved in the circumferential direction toward the inner core 30 (C47), so that the slot portions return to their original circumferential-direction positions so as to be arranged at equal pitches. At this point of time, the step of inserting the inner cores into the N-th core insertion parts in FIG. 10 (step N2) is completed.

Finally, the fixation member insertion step (step 4) shown in FIG. 11 will be described.

Figure 40:
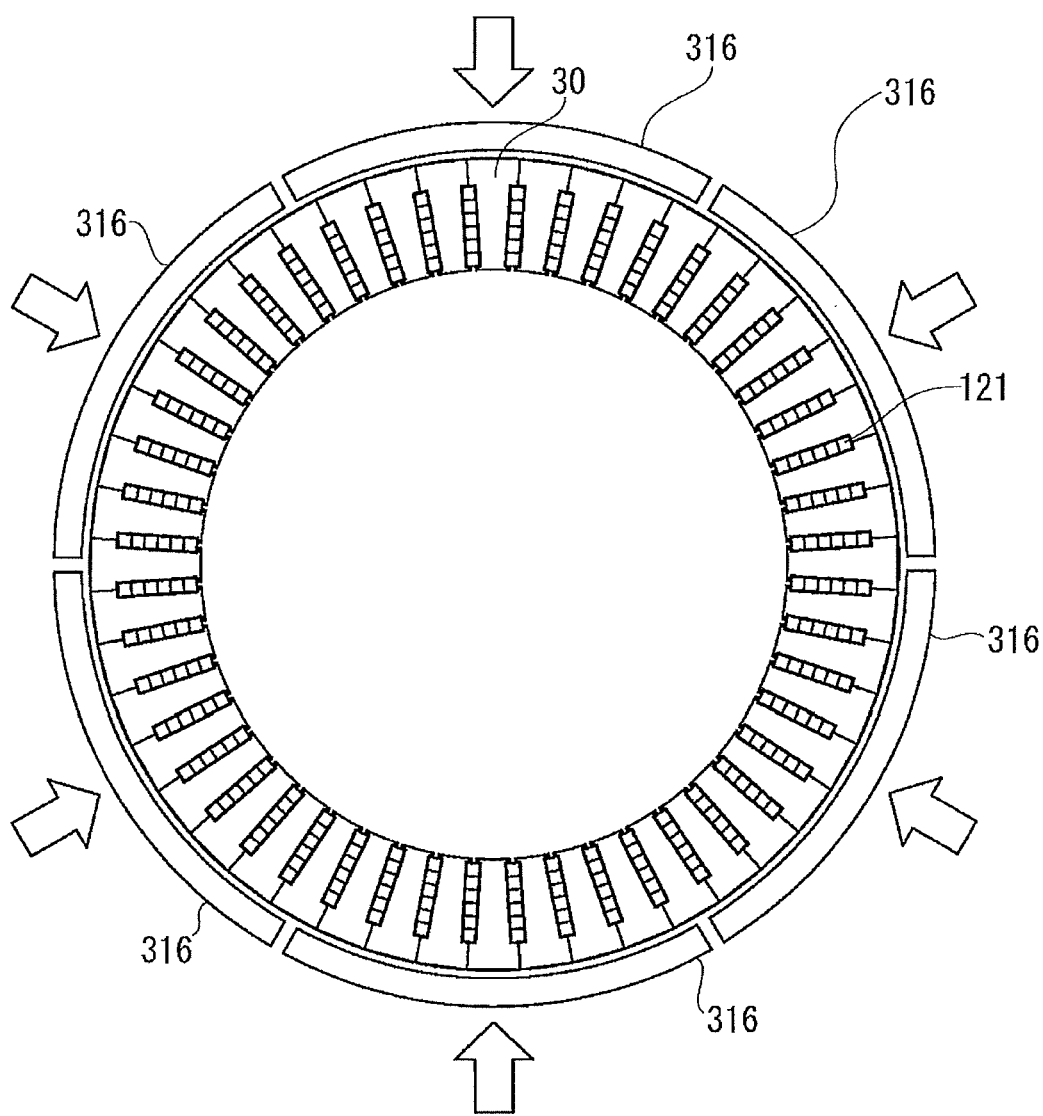
FIG. 40 is a schematic view showing the fixation member insertion step according to embodiment 1 of the present invention.

In step 41, as shown in FIG. 40, the outer circumference of the inner cores 30 is pressed inward in the radial direction by diameter reducing members 316, to reduce the diameter of the coil basket 121. Here, the diameter reduction means reducing the diameter of the coil basket 121. As described above, the coil basket 121 is assembled in a state of being shifted outward in the radial direction by the radial-direction movement amount Z from the normal radial-direction position. Therefore, when the diameter of the coil basket 121 is reduced inward in the radial direction by the radial-direction movement amount Z, the coil basket 121 comes to the normal radial-direction position. At this time, the inner cores 30 inserted in the coil basket 121 also come to the normal radial-direction position with their back yoke portions 129 brought into close contact with each other.

Figure 41:
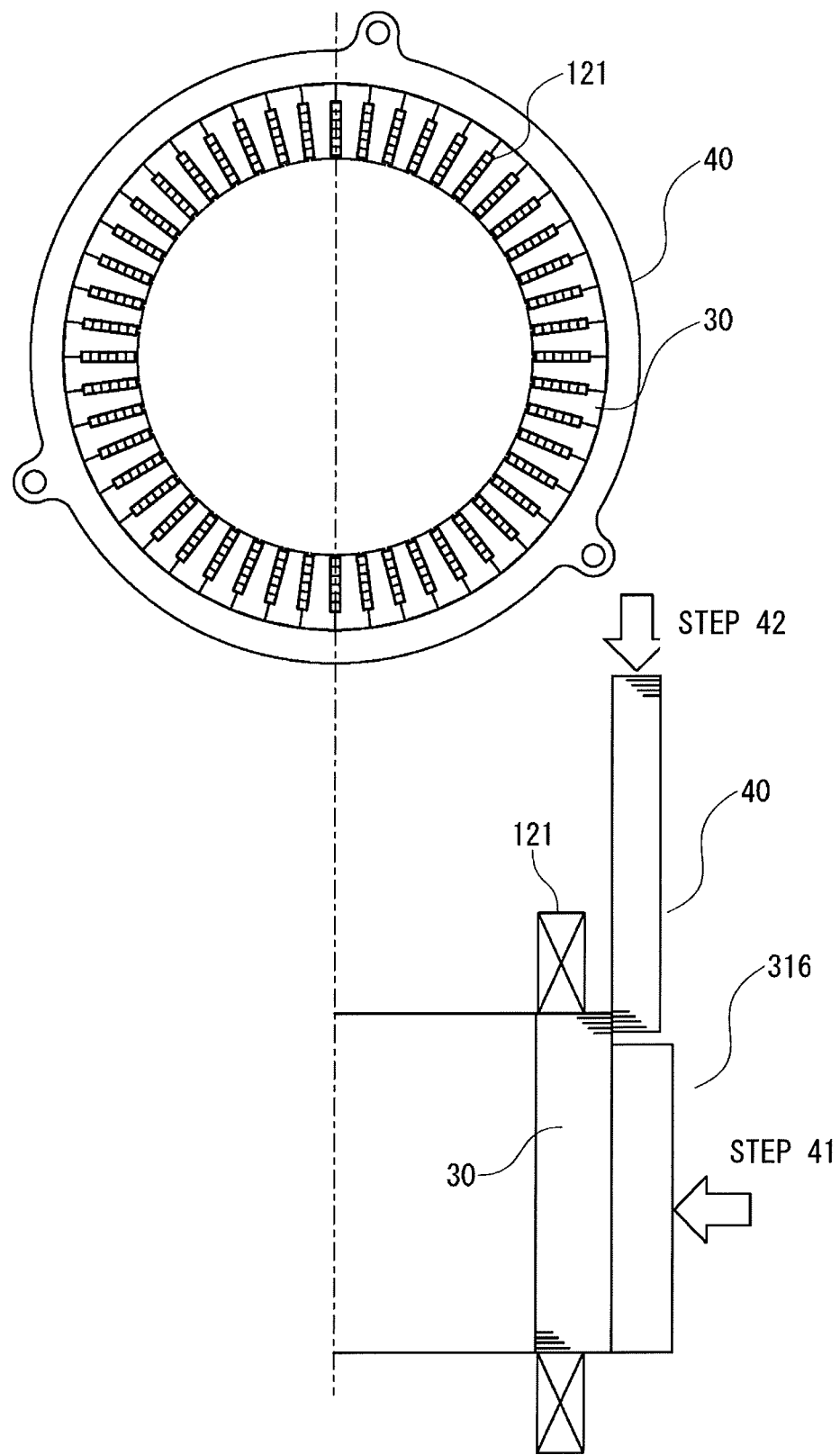
FIG. 41 is a schematic view showing the fixation member insertion step according to embodiment 1 of the present invention.

In step 42, as shown in FIG. 41, in a state in which the outer circumference of the inner cores 30 is pressed inward in the radial direction by the diameter reducing members 316, a part of the outer core 40 is inserted from one end side in the axial direction of the inner cores 30.

Figure 42:
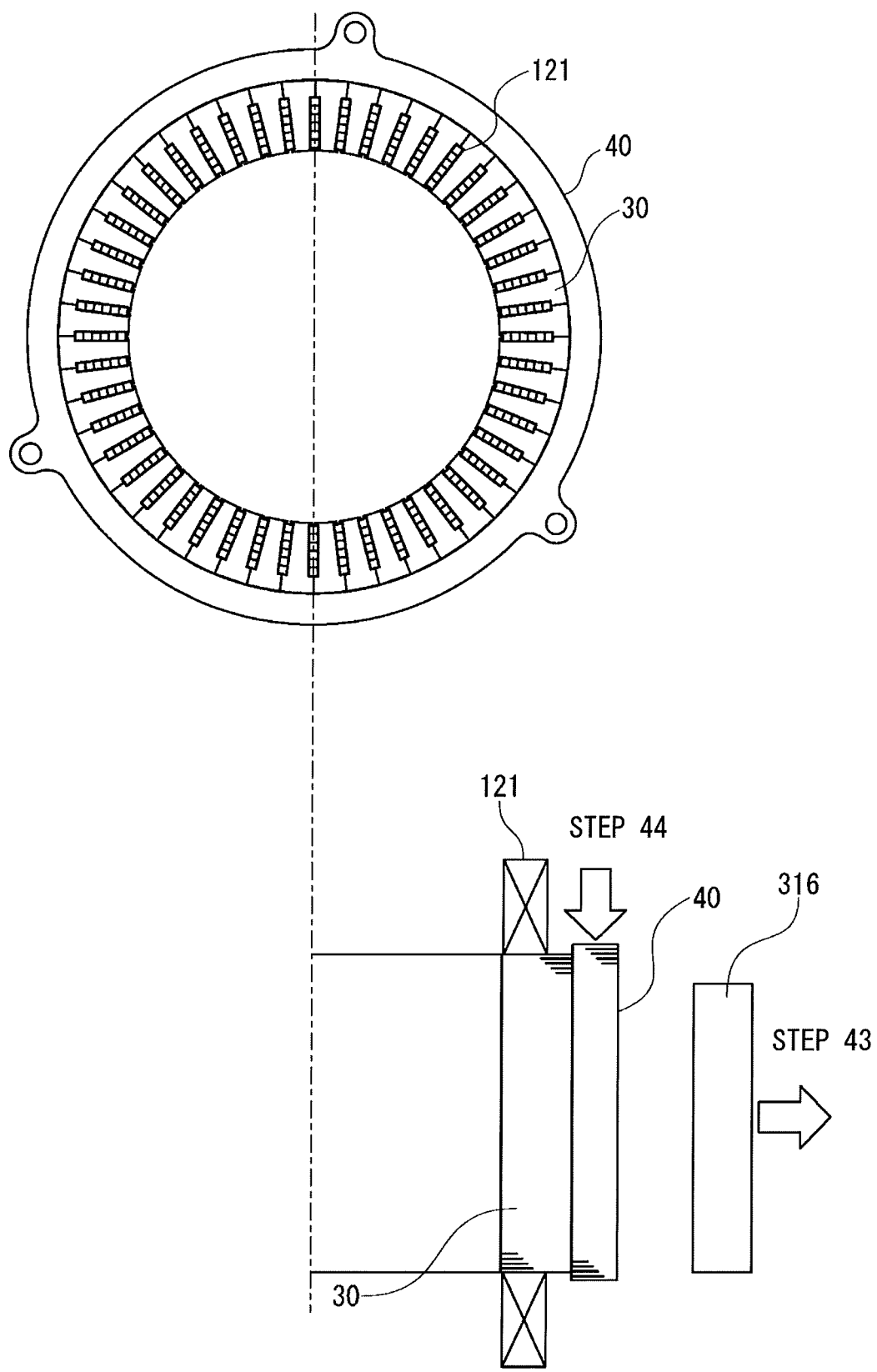
FIG. 42 is a schematic view showing the fixation member insertion step according to embodiment 1 of the present invention.

In step 43, as shown in FIG. 42, the diameter reducing members 316 are retracted from the outer circumference of the inner cores 30 outward in the radial direction.

In step 44, as shown in FIG. 42, the outer core 40 is inserted in the axial direction to the outer circumference of the inner core 30, whereby the fixation member insertion step (step 4) is finished.

Through the production process in the present embodiment as described above, the armature 10 of the present embodiment can be produced.

As described above, in the present embodiment, the production method includes: the coil assembly step of combining a plurality of the coil units to form an annular coil basket; the core insertion step of inserting the inner cores from the radially outer side of the coil basket; and the fixation member insertion step of inserting the fixation member to the outer circumference of the inner core, wherein, in the core insertion step, the radial-direction position of the coil basket is retained at the core insertion time position which is shifted outward in the radial direction relative to the normal position after completion of the armature, the inner cores are inserted from the radially outer side of the coil basket, and then, after the core insertion step, the radial-direction positions of the coil basket and the inner cores are moved inward in the radial direction to the normal position after completion of the armature. Therefore, the inner cores having the circumferential-direction protrusion portions at the ends of the tooth portions can be inserted from the radially outer side without interfering with the coil basket. Thus, it is possible to provide a rotary electric machine that is downsized, highly efficient, low in cost, and excellent in productivity.

That is, in the present embodiment, it is possible to provide an armature including: a plurality of inner cores arranged in an annular shape and each having a tooth portion protruding in the radial direction from a back yoke portion, and a circumferential-direction protrusion portion extending in the circumferential direction at the end of the tooth portion; a coil basket formed by combining a plurality of coil units in parallel at an equal pitch in the circumferential direction, each coil unit having at least three slot portions to be stored in slots between the tooth portions, and a turn portion connecting the slot portions with no connection parts; and an annular fixation member fixing the outer circumference of the plurality of inner cores, wherein, of each coil unit, at least the slot portions are formed of a rectangular conductive wire, the slot portions are arranged in each slot between the tooth portions, so as to be aligned in the radial direction, and in close contact with the inner cores via an insulation member having an equal thickness, and the inner circumferential surface of the circumferential-direction protrusion portion at the end of each tooth portion is formed in a smooth arc or straight shape.

Owing to the presence of the circumferential-direction protrusion portions at the ends of the tooth portions as described above, magnetic resistance between the rotor and the armature is reduced, whereby an effect of providing a rotary electric machine having high output is obtained. In addition, rotor iron loss is reduced by the circumferential-direction protrusion portions and thus an effect of enhancing efficiency is obtained. In addition, as compared to a conventional example, since there are no slits at the tooth end portions, increase in the magnetic resistance due to the slits can be avoided and thus an effect of increasing output is obtained. Further, as compared to a conventional example, since the tooth end portions are not plastically deformed, a magnetic characteristic is not deteriorated and thus effects of enhancing efficiency and increasing output are obtained.

It is necessary to provide clearances in the case of inserting coils into slots the dimensions of which are prescribed in advance as in conventional case. However, in the armature producing method of the present embodiment, the inner cores are inserted in a state in which the slot portions of the coil units are expanded, and therefore clearances are not needed. Further, by reducing the diameter of the coil units, the coils are pressed to each other and pressed to the inner cores, so that no gaps are formed between the coils and between the coil and the inner core. Thus, it is possible to obtain a rotary electric machine having an extremely high coil space factor.

As compared to the case of inserting straight-shape tooth portions from the radially inner side of the coil basket as in conventional case, there are no gaps in the circumferential direction and thus heat resistance from the coil basket to the armature core is reduced, whereby an effect of improving heat dissipation is obtained.

After core insertion, owing to the circumferential-direction protrusion portions at the ends of the tooth portions, the coil units are prevented from protruding inward in the radial direction of the armature. Thus, an effect of mechanically and reliably preventing the coil units from protruding inward in the radial direction without using fixation means such as adhesion, is obtained. In addition, an effect of improving the material yield is obtained as compared to a conventional case in which stamping is performed with protrusions of tooth end portions protruding inward in the radial direction, and after assembly, the protrusions protruding inward in the radial direction are bent in the circumferential direction.

The tooth portions are inserted into the already shaped and assembled coil units. Therefore, as compared to the case where turn portions with no connection parts are formed on only one side in the axial direction and assembly is performed by moving the coil in the axial direction toward a stator from the side opposite to the turn portions so as to be inserted to the stator, an effect of decreasing the number of welded parts and improving productivity is obtained because the turn portions with no connection parts can be continuously formed in the coil units.

In the core insertion step, when the inner cores are to be inserted from the radially outer side of the coil basket, the circumferential-direction distance between the slot portions to which each inner core is to be inserted is expanded. Thus, it becomes unnecessary to shift the radial-direction position of the coil basket outward in the radial direction more than necessary from the normal position after completion of the armature, and the amount of deformation of the turn portions can be decreased. In addition, since the circumferential-direction pitch of the turn portions is reduced, an effect of reducing the size of the coil end is obtained.

In the core insertion step, in a state in which the inner cores already inserted into the coil basket are shifted from the normal circumferential-direction position after completion of the armature, the inner cores that have not been inserted yet are inserted between the slot portions from the radially outer side. Therefore, the inner cores can be inserted from the radially outer side without interfering with the already assembled inner cores. Thus, an effect of improving productivity is obtained.

In the core insertion step, in a state in which the radial-direction position of the coil basket is regulated at the core insertion time position and the radial-direction positions of the already inserted inner cores are regulated, the inner cores that have not been inserted yet are inserted from the radially outer side. Thus, an effect of improving assuredness and reliability in the core insertion step is obtained.

The circumferential-direction pitch of the turn portions after each coil unit that forms the coil basket is shaped is designed to be greater than the circumferential-direction pitch of the turn portions after completion of the armature. Therefore, in the core insertion step, the coil units do not need to be regulated more than necessary. Thus, a force needed for regulating the coil units can be reduced and risk of damage to the coil coat caused by contact of the coil unit is reduced, whereby an effect of improving reliability is obtained. In addition, since the circumferential-direction pitch of the slot portions has been narrowed after completion of the armature, the turn portions are subjected to an elastic force in such a direction as to expand the circumferential-direction pitch, whereby the slot portions are pressed outward in the radial direction. Thus, heat resistance from the coil unit to the inner core is reduced, whereby an effect of improving heat dissipation is obtained. Further, since the coil units are stably shifted to only one side outward in the radial direction, the amount of a magnetic flux, occurring from the rotor, that passes through the coil units is decreased, and eddy current loss of the coil units is suppressed, whereby an effect of enhancing efficiency of the rotary electric machine is obtained.

Before the core insertion step, the insulating members for insulating the coil units and the inner cores from each other are attached to the inner cores. Therefore, it is not necessary to provide insulating members separately from the inner cores, and thus an effect of improving productivity is obtained.

The coil basket is formed by continuously arranging, in the circumferential direction, the coil units each having the slot portions to be stored at positions separated from each other by a predetermined slot angle in the circumferential direction, and in the core insertion step, plural groups of the inner cores are arranged on the radially outer side respectively at the same pitches as the predetermined slot angle, and each group of the inner cores are simultaneously inserted into the coil basket. Thus, the cycle time of the production equipment can be shortened, whereby an effect of improving productivity is obtained.

In the case where the circumferential-direction width of each circumferential-direction protrusion portion is Y4, the circumferential-direction distance between the adjacent slot portions located on the radially innermost side when the radial-direction positions and the circumferential-direction positions of the slot portions are the normal position after completion of the armature is Y1, and the number of the slots is M, the amount Z of radial-direction movement of each slot portion in the core insertion step, from the normal radial-direction position after completion of the armature, is set to satisfy "$Z<M\times(Y4-Y1)/(2\times\pi)$". In this case, as compared to the case of inserting the inner cores in the radial direction without interference by merely expanding the slot portions in the radial direction without changing the circumferential-direction positions of the slot portions, the amount of deformation of the turn portions can be decreased and thus insulation reliability can be improved. In addition, since the circumferential-direction pitch of the turn portions is reduced, the turn portions are prevented from being expanded in the axial direction and thus an effect of reducing the size of the coil end is obtained.

In addition, if "$M\times(Y4-Y1)/(6\times\pi)\leq Z$" is satisfied, it is possible to perform assembly by moving the slot portions in the radial direction and the circumferential direction without deforming the coil units at the time of core insertion. Thus, an effect of insulation reliability is obtained.

The coil units forming the coil basket before the core insertion step have gaps between the turn portions adjacent in the circumferential direction. Therefore, it is possible to move the coil units in the circumferential direction without deforming the coil units. Thus, risk of damage to the coil coat is reduced and an effect of improving reliability is obtained.

In the armature of the present embodiment, in the case where the circumferential-direction width of each slot portion of the coil units is X1 and the circumferential-direction distance between the circumferential-direction protrusion portions at the ends of the tooth portions is X2, X1>X2 is satisfied. Thus, the coil units can be reliably prevented from protruding inward in the radial direction.

In the case where the circumferential-direction distance between the adjacent slot portions located on the radially innermost side of each coil unit is Y1 and the circumferential-direction width of the back yoke portion of each inner core is Y3, Y3>Y1 is satisfied. Thus, in the fixation member insertion step, the coil units can be reliably prevented from protruding outward in the radial direction.

The armature producing device of the present embodiment includes: the coil radial-direction position regulating member for regulating the radial-direction position of the coil basket; the coil axial-direction position regulating member for regulating the axial-direction position of the coil basket; the movement member for, at the time of inserting each inner core from the radially outer side of the coil basket, expanding the circumferential-direction distance between the slot portions to which the inner core is to be inserted; the core inserting member for moving each inner core inward in the radial direction; and the core inner-side regulating member for regulating the radially-inner-side position of each inner core. Thus, insertion of the inner cores in the core insertion step can be reliably performed with simple equipment.

The movement member has such a wedge shape that the circumferential-direction width increases toward the radially outer side. Therefore, it is possible to expand the circumferential-direction distance between the slot portions to which each inner core is to be inserted, by merely moving the movement member inward in the radial direction, and the armature can be produced with simple and inexpensive equipment.

The diameter reducing member is provided which presses the outer circumference of the inner cores inward in the radial direction, to reduce the diameter of the coil basket. This allows the fixation member to be inserted to the outer circumference of the inner cores, and thus the armature can be produced with simple and inexpensive equipment.

Embodiment 2

Next, embodiment 2 of the present invention will be described with reference to FIG. 43 to FIG. 45. In embodiment 2, only points different from embodiment 1 will be described.

Figure 43:
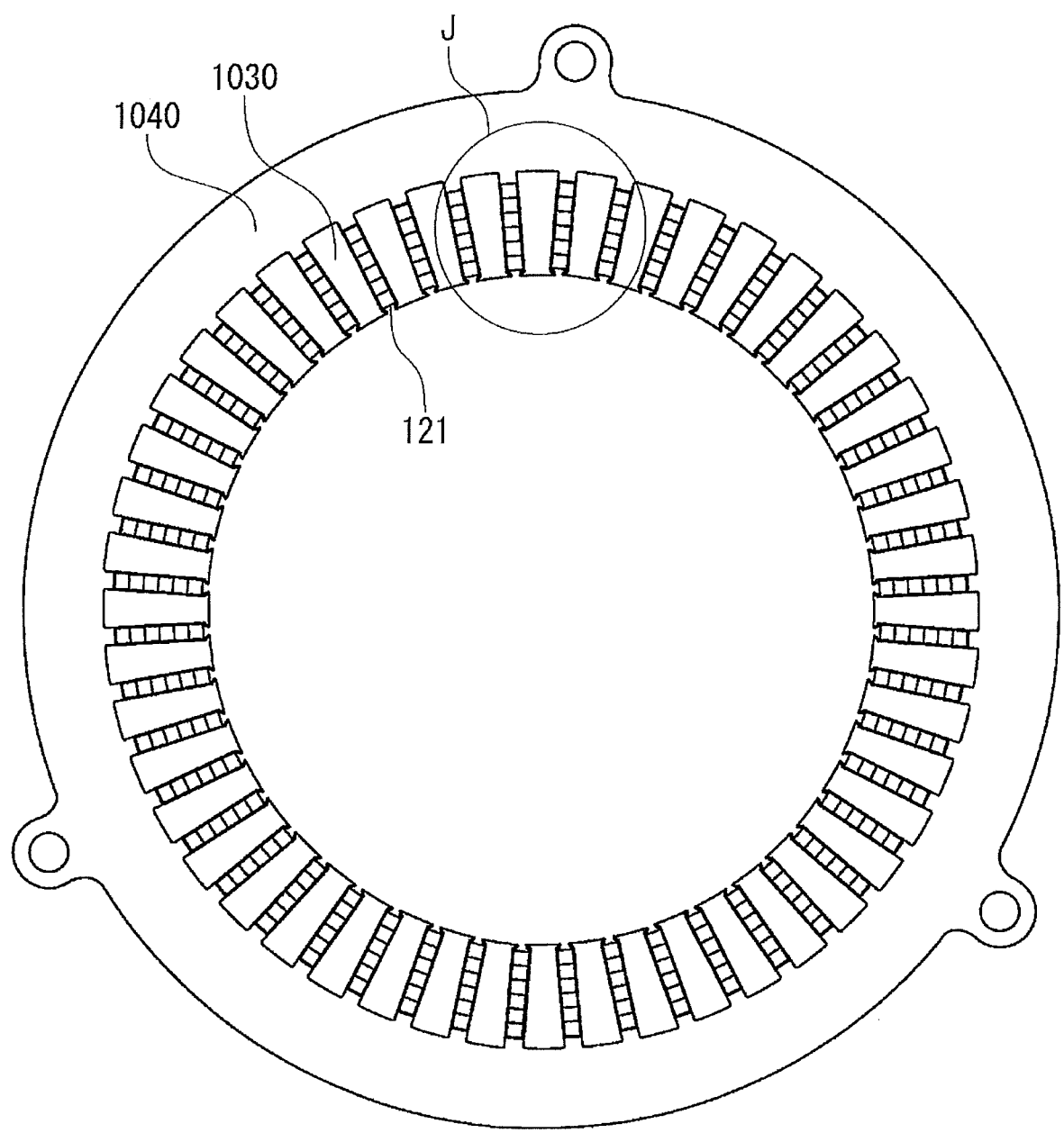
FIG. 43 is a plan sectional view showing an armature after an outer core is inserted according to embodiment 2 of the present invention.

FIG. 43 shows the armature after the outer core is inserted in embodiment 2 of the present invention, and is a plan sectional view corresponding to FIG. 16 in embodiment 1. FIG. 44 is a detailed sectional view of part J of the armature shown in FIG. 43, and corresponds to FIG. 17 in embodiment 1. FIG. 45 is a schematic view illustrating a core insertion step according to embodiment 2 of the present invention, and corresponds to FIG. 19 in embodiment 1.

As shown in FIG. 43, inner cores 1030 are arranged on the inner circumferential side of an outer core 1040. As shown in FIG. 44, fitting portions 1132 of the inner cores 1030 are fitted and fixed to grooves 1050 of the outer core 1040. At this time, a circumferential-direction width Y4 of a circumferential-direction protrusion 1131 at the end of a tooth portion 1130 of each inner core 1030 is greater than a circumferential-direction gap Y1 at the narrowest part between the slot portions after completion of the armature. It is noted that providing the circumferential-direction protrusions 1131 obtains the same effect as in embodiment 1. In FIG. 44, reference character 1013 denotes a slot, reference character 1014 denotes an insulating member, and reference characters S1 to S6 denote the slot portions of the same coil unit 21 as in embodiment 1.

A width Y3 at the greatest-width part in the circumferential direction on the back yoke side of each inner core 1030 is greater than the circumferential-direction gap Y1 at the narrowest part between the slot portions after completion of the armature. Such a configuration provides effects of improving the space factor of the coil and increasing output of the rotary electric machine, as compared to the case where the width Y3 is set to be equal to or smaller than the circumferential-direction gap Y1. In addition, since the gap between the side surface of each tooth portion 1130 and the coil can be reduced, heat resistance from the coil to the inner core 1030 is reduced and heat dissipation is improved, whereby an effect of increasing output is obtained.

Figure 45:
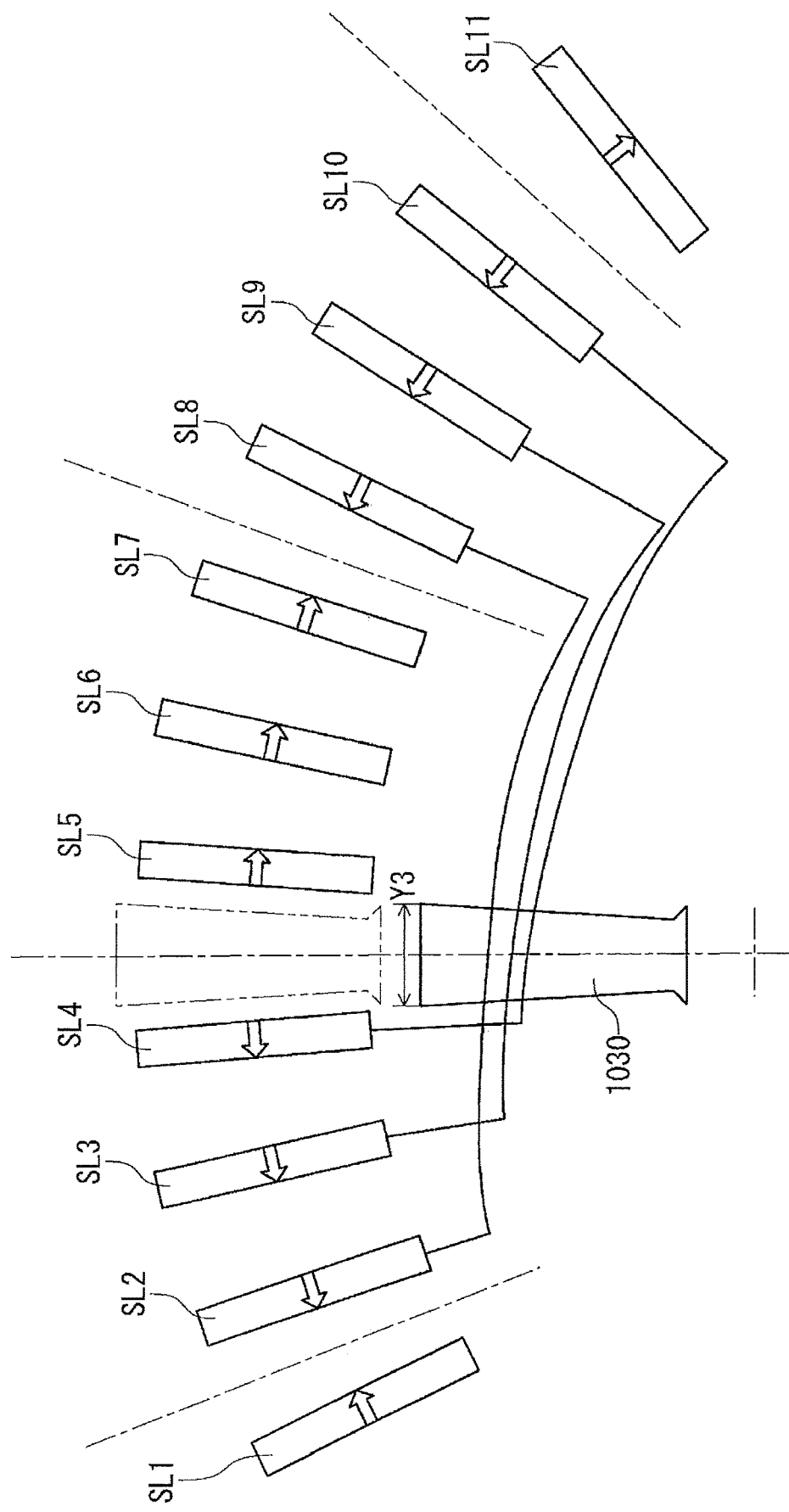
FIG. 45 is a schematic view illustrating the core insertion step according to embodiment 2 of the present invention.

In embodiment 2 of the present invention, as shown in FIG. 45, the inner cores 1030 are inserted into the coil basket 121 formed by the same coil units 21 as in embodiment 1 from the inner circumferential side toward the outer circumferential side. In this case, the insertion procedure for the inner cores 1030 and the method for avoiding interference between the slot portions S1 to S6 and the inner cores 1030 are the same as those in embodiment 1 except that the inner cores 1030 are "inserted from the inner circumferential side to the outer circumferential side" instead of being "inserted from the outer circumferential side to the inner circumferential side". In FIG. 45, for convenience of description, the slot portions S1 to S6 stored in each identical slot are indicated as slot portions SL1 to SL11 from left toward right in the drawing.

A specific method for avoiding interference between the slot portions and the inner cores 1030 is as follows. In expression (6), the width Y4 of the circumferential-direction protrusion portion 131 is replaced with the width Y3 at the greatest Y3 width part in the circumferential direction on the back yoke side of the inner core 1030 in FIG. 44, whereby a condition for allowing the cores to be inserted with only radial-direction movement is derived. That is, replacing Y4 in expression (6) with Y3 obtains expression (8).

$$Z \leq M \times (Y3-Y1)/(2 \times \pi) \quad (8)$$

With the condition of the above expression (8), the inner cores 1030 are allowed to be inserted from the inner circumferential side to the outer circumferential side. Since movement in the circumferential direction is not performed, all the inner cores 1030 can be simultaneously inserted and thus an effect of improving productivity is obtained.

Figure 44:
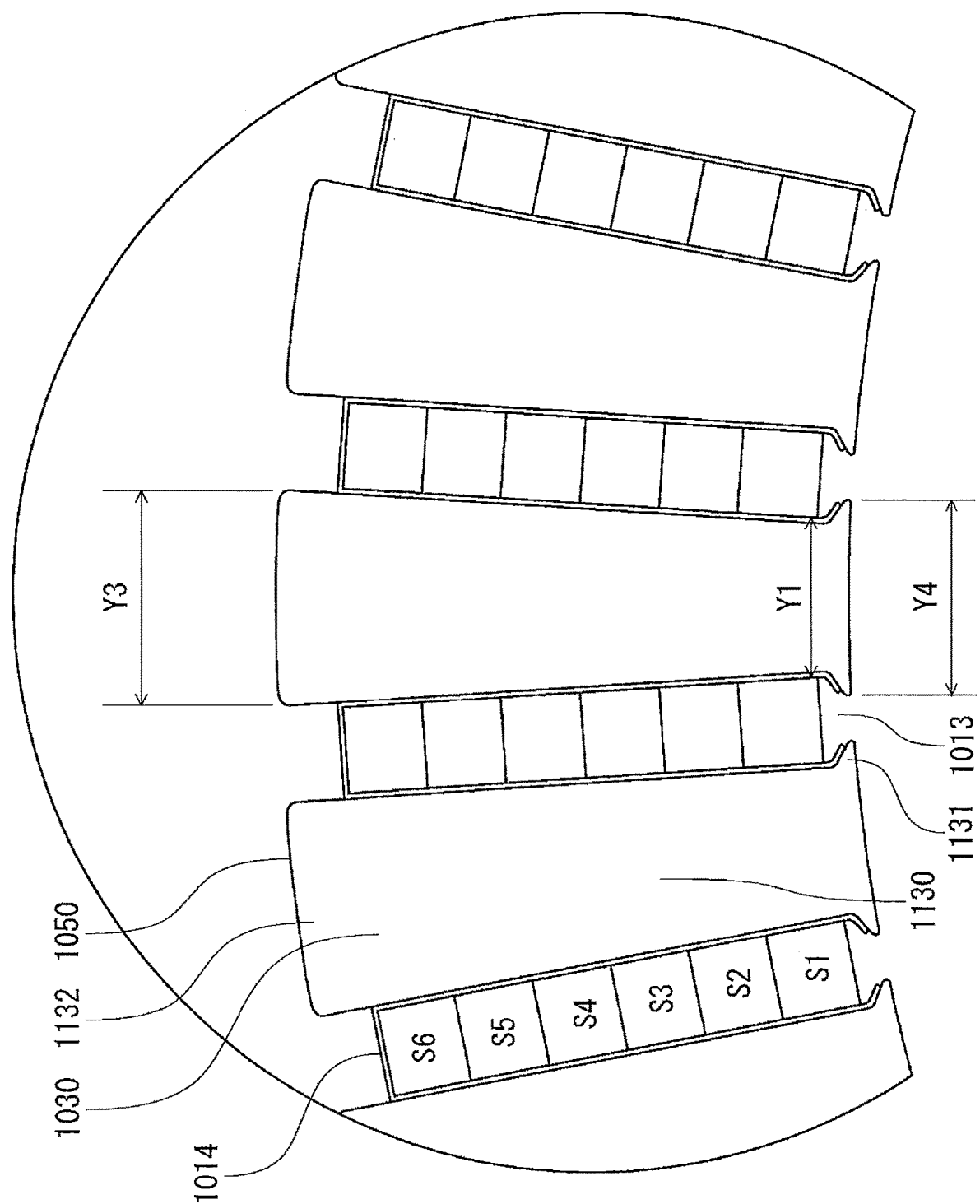
FIG. 44 is a detailed sectional view of part J of the armature shown in FIG. 43.

In expression (7), the width Y4 of the circumferential-direction protrusion is replaced with the width Y3 at the greatest-width part in the circumferential direction on the back yoke side of the inner core 1030 in FIG. 44, whereby a condition for allowing the cores to be inserted with circumferential-direction movement as well as radial-direction movement is derived. That is, replacing Y4 in expression (7) with Y3 obtains expression (9).

$$M \times (Y3-Y1)/(6 \times \pi) \leq Z < M \times (Y3-Y1)/(2 \times \pi) \quad (9)$$

With the condition of the above expression (9), the inner cores 1030 are allowed to be inserted from the inner circumferential side to the outer circumferential side. The radial-direction movement amount of each coil unit 21 can be reduced to ⅓ at the minimum as compared to the case where the coil units 21 are moved only in the radial direction for insertion of the inner cores 1030. Thus, when the inner cores 1030 and the coil units 21 are shifted inward in the radial direction after core insertion, the amount of axial-direction deformation of the turn portions can be reduced. As a result, an effect of reducing the size of the coil end is obtained. In addition, since the amount of deformation of the turn portions is small, risk of damage to the coil coat is reduced and thus an effect of improving insulation reliability is obtained.

It is noted that, within the scope of the present invention, the above embodiments may be freely combined with each other, or each of the above embodiments may be modified or simplified as appropriate.

The invention claimed is:

1. A method for producing an armature including:
a plurality of inner cores arranged in an annular shape, and each having a tooth portion protruding in a radial direction from a back yoke portion, and a circumferential-direction protrusion portion extending in a circumferential direction at an end of the tooth portion;
a coil basket formed by combining a plurality of coil units each having slot portions to be stored in slots between the tooth portions, and a turn portion connecting the slot portions; and
a fixation member having an annular shape and fixing an outer circumference of the plurality of inner cores,
the slot portions of the coil units being arranged in each slot between the tooth portions so as to be aligned in the radial direction, the method comprising:
a coil assembly step of combining the plurality of coil units to form the coil basket having an annular shape;
a core insertion step of inserting the inner cores in the radial direction to the coil basket; and
a fixation member insertion step of inserting the fixation member to the outer circumference of the inner cores, wherein
in the core insertion step, in a state in which the slot portions of the coil units are kept being aligned in the circumferential direction, a radial-direction position of the coil basket is retained at a core insertion time position shifted outward in the radial direction relative to a normal position after completion of the armature, and the inner cores are inserted in the radial direction to the coil basket, and
after the core insertion step, radial-direction positions of the coil basket and the inner cores are moved in the radial direction to the normal position after completion of the armature.

2. The method for producing the armature according to claim 1, wherein
the coil basket is formed by combining a plurality of coil units in parallel at an equal pitch in the circumferential direction, the coil units each having at least three slot portions to be stored in slots between the tooth portions, and a turn portion connecting the slot portions with no connection parts.

3. The method for producing the armature according to claim 1, wherein
in the core insertion step, at a time of inserting each inner core in the radial direction to the coil basket, a circumferential-direction distance between the slot portions to which the inner core is to be inserted is expanded.

4. The method for producing the armature according to claim 3, wherein
in the core insertion step, in a state in which the inner cores already inserted into the coil basket are shifted from a normal circumferential-direction position after completion of the armature, each inner core that has not been inserted yet is inserted in the radial direction between the slot portions.

5. The method for producing the armature according to claim 1, wherein
in the core insertion step, in a state in which the radial-direction position of the coil basket is regulated at the core insertion time position and radial-direction positions of the inner cores already inserted are regulated, each inner core that has not been inserted yet is inserted in the radial direction.

6. The method for producing the armature according to claim 1, wherein
a circumferential-direction pitch of the turn portion after each coil unit that forms the coil basket is shaped is greater than a circumferential-direction pitch of the turn portion after completion of the armature.

7. The method for producing the armature according to claim 6, wherein
an amount D1 of increase in a circumferential length of the turn portion after the coil unit is shaped is set to be substantially equal to $2 \times \pi \times Z \times \phi/360$,
where Z is an amount of radial-direction movement of each slot portion in the core insertion step from a normal radial-direction position after completion of the armature, and $\phi$ is a central angle of the circumferential-direction pitch of the turn portion after completion of the armature.

8. The method for producing the armature according to claim 1, wherein
before the core insertion step, insulating members for insulating the coil units and the inner cores from each other are attached to the inner cores.

9. The method for producing the armature according to claim 1, wherein
the coil basket is formed by continuously arranging, in the circumferential direction, the coil units each having the slot portions to be stored at positions separated from each other by a predetermined slot angle in the circumferential direction, and
in the core insertion step, plural groups of the inner cores are arranged on the radially different position respectively at the same pitches as the predetermined slot angle, and each group of the inner cores are simultaneously inserted into the coil basket.

10. The method for producing the armature according to claim 3, wherein
in the core insertion step, in a case of inserting the inner cores from the radially outer side of the coil basket, an amount Z of radial-direction movement of each slot portion from a normal radial-direction position after completion of the armature is set to satisfy the following range:

$M \times (Y4 - Y1)/(6 \times \pi) \leq Z < M \times (Y4 - Y1)/(2 \times \pi)$, where Y4 is a circumferential-direction width of each circumferential-direction protrusion portion, Y1 is a circumferential-direction distance between the adjacent slot portions located on a radially innermost side when radial-direction positions and circumferential-direction positions of the slot portions are the normal position after completion of the armature, and M is a number of the slots.

11. The method for producing the armature according to claim 3, wherein
in the core insertion step, in a case of inserting the inner cores from the radially inner side of the coil basket, an amount Z of radial-direction movement of each slot portion from a normal radial-direction position after completion of the armature is set to satisfy the following range:

$M \times (Y3 - Y1)/(6 \times \pi) \leq Z < M \times (Y3 - Y1)/(2 \times \pi)$, where Y3 is a width at a greatest-width part in the circumferential direction on a back yoke side of each inner core, Y1 is a circumferential-direction distance between the adjacent slot portions located on a radially innermost side when radial-direction positions and circumferential-direction positions of the slot portions are the normal position after completion of the armature, and M is a number of the slots.

12. The method for producing the armature according to claim 1, wherein
the coil units forming the coil basket before the core insertion step have gaps between the turn portions adjacent in the circumferential direction.

13. The method for producing the armature according to claim 1, wherein
in the fixation member insertion step, in a state in which the outer circumference of the inner cores is pressed inward in the radial direction by a diameter reducing member, a part of the fixation member is inserted from one end side in the axial direction of the inner cores, the diameter reducing member is retracted from the outer circumference of the inner cores, and then the fixation member is entirely inserted to the outer circumference of the inner cores.

14. A method for producing a rotary electric machine, the method comprising:
rotatably providing a rotor fixed to a rotary shaft, on an inner circumferential side of the armature produced by the method for producing the armature according to claim 1.

15. An armature comprising:
a plurality of inner cores arranged in an annular shape, and each having a tooth portion protruding in a radial direction from a back yoke portion, and a circumferential-direction protrusion portion extending in a circumferential direction at an end of the tooth portion wherein facing side walls of adjacent yoke portions are planar from an outermost circumferential end to the tooth portion;
a coil basket formed by combining a plurality of coil units in parallel at an equal pitch in the circumferential direction, the coil units each having at least three slot portions to be stored in slots between the tooth portions, and a turn portion connecting the slot portions with no connection parts; and
a fixation member having an annular shape and fixing an outer circumference of the plurality of inner cores, wherein
each coil unit is formed by bending one rectangular conductive wire having a substantially rectangular sectional shape,
the slot portions are arranged in each slot between adjacent tooth portions, so as to be aligned in the radial direction, and in close contact with the inner cores via an insulating member having an equal thickness,
an inner circumferential surface of the circumferential-direction protrusion portion at the end of each tooth portion is smoothly formed,
where X1 is a circumferential-direction width of each slot portion of the coil units and X2 is a circumferential-direction distance between the circumferential-direction protrusion portions at the ends of the tooth portions, X1>X2 is satisfied, and
where Y1 is a circumferential-direction distance between the adjacent slot portions located on a radially innermost side of the coil units and Y3 is a circumferential-direction width of the back yoke portion of each inner core, Y3>Y1 is satisfied.

16. A rotary electric machine comprising:
the armature according to claim 15; and
a rotor fixed to a rotary shaft and rotatably provided on an inner circumferential side of the armature.

17. A device for producing an armature including:
a plurality of inner cores arranged in an annular shape, and each having a tooth portion protruding in a radial direction from a back yoke portion, and a circumferential-direction protrusion portion extending in a circumferential direction at an end of the tooth portion;
a coil basket formed by combining a plurality of coil units each having slot portions to be stored in slots between the tooth portions, and a turn portion connecting the slot portions; and
a fixation member having an annular shape and fixing an outer circumference of the plurality of inner cores,
the slot portions of the coil units being arranged in each slot between the tooth portions so as to be aligned in the radial direction, the device comprising:
a coil radial-direction position regulating member for regulating a radial-direction position of the coil basket;
a coil axial-direction position regulating member for regulating an axial-direction position of the coil basket;
a movement member for, at a time of inserting each inner core from a radially outer side of the coil basket, expanding a circumferential-direction distance between the slot portions to which the inner core is to be inserted;
a core inserting member for moving the inner core inward in the radial direction; and
a core inner-side regulating member for regulating a radially-inner-side position of the inner core, wherein
the movement member has such a wedge shape that a circumferential-direction width thereof increases toward a radially outer side.

18. The device for producing the armature according to claim 17, further comprising a diameter reducing member for pressing an outer circumference of the inner core inward in the radial direction, to reduce a diameter of the coil basket.

19. The method for producing the armature according to claim 2, wherein
in the core insertion step, at a time of inserting each inner core in the radial direction to the coil basket, a circumferential-direction distance between the slot portions to which the inner core is to be inserted is expanded.

20. The method for producing the armature according to claim 2, wherein
in the core insertion step, in a state in which the radial-direction position of the coil basket is regulated at the core insertion time position and radial-direction positions of the inner cores already inserted are regulated, each inner core that has not been inserted yet is inserted in the radial direction.

* * * * *